US012238573B2

(12) United States Patent
Yang et al.

(10) Patent No.: US 12,238,573 B2
(45) Date of Patent: Feb. 25, 2025

(54) CODE BLOCK GROUP-BASED RETRANSMISSION AND FEEDBACK FOR SEMI-PERSISTENT SCHEDULING COMMUNICATIONS

(71) Applicant: QUALCOMM Incorporated, San Diego, CA (US)

(72) Inventors: Wei Yang, San Diego, CA (US); Wanshi Chen, San Diego, CA (US); Huilin Xu, Temecula, CA (US); Yuchul Kim, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 17/733,789

(22) Filed: Apr. 29, 2022

(65) Prior Publication Data

US 2023/0354336 A1    Nov. 2, 2023

(51) Int. Cl.
*H04L 1/1829* (2023.01)
*H04L 1/1867* (2023.01)
(Continued)

(52) U.S. Cl.
CPC .......... *H04W 28/04* (2013.01); *H04L 1/1864* (2013.01); *H04L 1/1896* (2013.01);
(Continued)

(58) Field of Classification Search
CPC . H04L 1/0001–248; H04L 5/0001–26; H04W 24/02–10; H04W 28/02–26;
(Continued)

(56) References Cited

U.S. PATENT DOCUMENTS

2021/0050950 A1    2/2021  Zhou et al.
2021/0258998 A1*   8/2021  Khoshnevisan ...... H04W 28/04
(Continued)

FOREIGN PATENT DOCUMENTS

WO    WO-2019160483 A1    8/2019
WO    WO-2021146702 A1    7/2021

OTHER PUBLICATIONS

International Search Report and Written Opinion—PCT/US2023/018610—ISA/EPO—Sep. 4, 2023.
(Continued)

*Primary Examiner* — Timothy J Weidner
(74) *Attorney, Agent, or Firm* — Holland & Hart LLP

(57) ABSTRACT

Methods, systems, and devices for wireless communications are described. A first device may obtain information indicative of a configuration to provide code block group (CBG)-based feedback for one or more semi-persistent scheduling (SPS) communications scheduled for the first device. The first device may then monitor for the one or more SPS communications in one or more CBGs of a TB in accordance with one or more SPS communication configurations. Based on the monitoring of the semi-persistent scheduling communications, the first device may generate one or more feedback bits associated with the one or more SPS communications, and may communicate, with a second device, the one or more feedback bits associated with the one or more SPS communications in accordance with the configuration to provide CBG-based feedback.

29 Claims, 25 Drawing Sheets

(51) Int. Cl.
  *H04W 28/02* (2009.01)
  *H04W 28/04* (2009.01)
  *H04W 72/11* (2023.01)
  *H04W 72/1263* (2023.01)
  *H04W 72/20* (2023.01)
  *H04W 72/23* (2023.01)
  *H04W 84/02* (2009.01)
  *H04W 88/02* (2009.01)
  *H04W 88/08* (2009.01)
  *H04W 92/02* (2009.01)
  *H04W 92/10* (2009.01)

(52) U.S. Cl.
  CPC ........ *H04W 28/0273* (2013.01); *H04W 72/11* (2023.01); *H04W 72/1263* (2013.01); *H04W 72/20* (2023.01); *H04W 72/23* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
  CPC . H04W 72/02–569; H04W 84/005–22; H04W 88/005–188; H04W 92/02–22
  See application file for complete search history.

(56) References Cited

U.S. PATENT DOCUMENTS

2022/0166541 A1* 5/2022 Takeda .................. H04W 28/04
2023/0092206 A1* 3/2023 Bae ....................... H04W 28/04

OTHER PUBLICATIONS

Partial International Search Report—PCT/US2023/018610—ISA/EPO—Jul. 14, 2023.

* cited by examiner

CODE BLOCK GROUP-BASED RETRANSMISSION AND FEEDBACK FOR SEMI-PERSISTENT SCHEDULING COMMUNICATIONS

INTRODUCTION

The following relates to wireless communications, including techniques for implementing code block group (CBG)-based feedback procedures for periodically scheduled communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

A method for wireless communications at a first device is described. The method may include obtaining information indicative of a configuration for the first device to provide CBG-based feedback for one or more SPS communications scheduled for the first device. In some examples, the first device may monitor for the one or more SPS communications in one or more CBGs of a transport block in accordance with one or more SPS configurations and generate one or more feedback bits associated with the one or more SPS communications based on the monitoring. The first device may communicate, with a second device, the one or more feedback bits associated with the one or more SPS communications in accordance with the configuration for the first device to provide CBG-based feedback.

An apparatus for wireless communications at a first device is described. The apparatus may include a processor, memory coupled with the processor, and instructions stored in the memory. The instructions may be executable by the processor to cause the apparatus to obtain information indicative of a configuration for the first device to provide CBG-based feedback for one or more SPS communications scheduled for the first device. The first device may monitor for the one or more SPS communications in one or more CBGs of a transport block in accordance with one or more SPS configurations and generate one or more feedback bits associated with the one or more SPS communications based on the monitoring. In some examples, the first device may communicate, with a second device, the one or more feedback bits associated with the one or more SPS communications in accordance with the configuration for the first device to provide CBG-based feedback.

Another apparatus for wireless communications at a first device is described. The apparatus may include means for obtaining information indicative of a configuration for the first device to provide CBG-based feedback for one or more SPS communications scheduled for the first device, and means for monitoring for the one or more SPS communications in one or more CBGs of a transport block in accordance with one or more SPS configurations. The apparatus may include means for generating one or more feedback bits associated with the one or more SPS communications based on the monitoring, and means for communicating, with a second device, the one or more feedback bits associated with the one or more SPS communications in accordance with the configuration for the first device to provide CBG-based feedback.

A non-transitory computer-readable medium storing code for wireless communications at a first device is described. The code may include instructions executable by a processor to obtain information indicative of a configuration for the first device to provide CBG-based feedback for one or more SPS communications scheduled for the first device, monitor for the one or more SPS communications in one or more CBGs of a transport block in accordance with one or more SPS configurations. The code may include instructions executable by a processor to generate one or more feedback bits associated with the one or more SPS communications based on the monitoring, and communicate, with a second device, the one or more feedback bits associated with the one or more SPS communications in accordance with the configuration for the first device to provide CBG-based feedback.

In some examples of the method, apparatuses, and non-transitory computer-readable medium described herein, generating the one or more feedback bits may include operations, features, means, or instructions for determining separate configurations for CBG-based feedback for respective SPS configurations of the one or more SPS configurations, and for generating the one or more feedback bits for the separate SPS configurations based on the separate configurations for providing CBG-based feedback.

Some examples of the method, apparatuses, and non-transitory computer-readable medium described herein may further include operations, features, means, or instructions for identifying, from the one or more SPS configurations, different SPS configurations on different serving cells, the different SPS configurations configured for CBG-based feedback corresponding to one or more dynamic grants and providing CBG-based feedback for the one or more SPS communications on the different serving cells configured for CBG-based feedback corresponding to the one or more dynamic grants.

Some examples of the method, apparatuses, and non-transitory computer-readable medium described herein may further include operations, features, means, or instructions for identifying one or more parameters for activating each SPS configuration of the one or more SPS configurations and activating each of the one or more SPS configurations in accordance with the one or more parameters.

Some examples of the method, apparatuses, and non-transitory computer-readable medium described herein may further include operations, features, means, or instructions for determining a threshold number of CBGs of the one or more CBGs per transport block that may be configured to communicate CBG-based feedback based on the information indicative of the configuration for the first device to provide CBG-based feedback for the one or more SPS communications.

In some examples of the method, apparatuses, and non-transitory computer-readable medium described herein, the threshold number of CBGs may be equal to a number of CBGs configured to communicate CBG-based feedback scheduled by one or more dynamic grants associated with a same serving cell as the one or more SPS communications.

In some examples of the method, apparatuses, and non-transitory computer-readable medium described herein, generating the one or more feedback bits may include operations, features, means, or instructions for determining an ordering for concatenating the one or more feedback bits based on a serving cell index, a SPS index, a slot index in which the one or more SPS communications terminate, or any combination thereof. In some examples of the method, apparatuses, and non-transitory computer-readable medium described herein, generating the one or more feedback bits may include operations, features, means, or instructions for concatenating the one or more feedback bits to generate a hybrid automatic repeat request acknowledgement (HARQ) codebook for the one or more SPS communications in accordance with the ordering.

Some examples of the method, apparatuses, and non-transitory computer-readable medium described herein may further include operations, features, means, or instructions for concatenating the one or more feedback bits to generate the HARQ codebook for different serving cells, the different serving cells including at least a first set of cells that may have CBG-based feedback enabled and a second set of cells that may have CBG-based feedback disabled.

Some examples of the method, apparatuses, and non-transitory computer-readable medium described herein may further include operations, features, means, or instructions for concatenating the one or more feedback bits jointly across the different serving cells.

Some examples of the method, apparatuses, and non-transitory computer-readable medium described herein may further include operations, features, means, or instructions for concatenating the one or more feedback bits separately for the different serving cells in accordance with a cell index, where the concatenation orders a first HARQ sub-codebook associated with the first set of cells after a second HARQ sub-codebook associated with the second set of cells.

Some examples of the method, apparatuses, and non-transitory computer-readable medium described herein may further include operations, features, means, or instructions for concatenating a first set of the one or more feedback bits for the one or more SPS configurations having CBG-based feedback enabled and concatenating a second set of the one or more feedback bits for the one or more SPS configurations having CBG-based feedback disabled.

Some examples of the method, apparatuses, and non-transitory computer-readable medium described herein may further include operations, features, means, or instructions for generating the one or more feedback bits based on a number of CBGs used for the one or more SPS communications.

Some examples of the method, apparatuses, and non-transitory computer-readable medium described herein may further include operations, features, means, or instructions for generating the one or more feedback bits based on a maximum number of CBGs associated with a SPS configuration of the one or more SPS configurations.

Some examples of the method, apparatuses, and non-transitory computer-readable medium described herein may further include operations, features, means, or instructions for generating the one or more feedback bits based on a maximum number of CBGs associated with each of the one or more SPS configurations, one or more dynamic grant communications, or both.

Some examples of the method, apparatuses, and non-transitory computer-readable medium described herein may further include operations, features, means, or instructions for generating one or more repetitions of the one or more feedback bits based on the one or more SPS configurations being configured for providing CBG-based feedback.

Some examples of the method, apparatuses, and non-transitory computer-readable medium described herein may further include operations, features, means, or instructions for generating the one or more feedback bits based on a maximum number of CBGs associated with each of the one or more SPS configurations, one or more dynamic grant communications, or both, in a serving cell and multiplexing the one or more feedback bits associated with the one or more SPS communications and the one or more dynamic grant communications in accordance with the generating.

Some examples of the method, apparatuses, and non-transitory computer-readable medium described herein may further include operations, features, means, or instructions for concatenating the one or more feedback bits to generate a dynamic HARQ codebook, where the concatenation combines a first HARQ sub-codebook associated with one or more dynamic grant communications and a second HARQ sub-codebook associated with the one or more SPS communications.

Some examples of the method, apparatuses, and non-transitory computer-readable medium described herein may further include operations, features, means, or instructions for concatenating the one or more feedback bits to generate the dynamic HARQ codebook for different serving cells, the different serving cells including at least a first set of cells that may have CBG-based feedback enabled for the one or more dynamic grant communications and a second set of cells that may have CBG-based feedback disabled for the one or more SPS communications.

Some examples of the method, apparatuses, and non-transitory computer-readable medium described herein may further include operations, features, means, or instructions for determining an activation of the configuration for the first device to provide CBG-based feedback for the one or more SPS communications based on a format of a control information message.

In some examples of the method, apparatuses, and non-transitory computer-readable medium described herein, the control information message may have a first scheduling format which indicates that CBG-based feedback may be enabled or disabled for one or more SPS communications.

Some examples of the method, apparatuses, and non-transitory computer-readable medium described herein may further include operations, features, means, or instructions for obtaining a control information message scheduling one or more retransmissions for the one or more SPS communications, the control information message indicative of whether CBG-based feedback may be enabled or disabled for one or more SPS communications and communicating the one or more retransmissions of the one or more SPS communications in the one or more CBGs in accordance with the scheduling.

In some examples of the method, apparatuses, and non-transitory computer-readable medium described herein, the control information message further includes one or more CBG indices indicative of the one or more CBGs that may be scheduled for retransmission.

Some examples of the method, apparatuses, and non-transitory computer-readable medium described herein may further include operations, features, means, or instructions for obtaining a control information message scheduling the one or more SPS communications. In some examples of the method, apparatuses, and non-transitory computer-readable medium described herein, generating the one or more feedback bits may include operations, features, means, or instructions for validating an activation or a deactivation of the one or more SPS configurations for providing CBG-based feedback based on one or more fields in the control information message, the one or more fields including a CBG transmission information field, a CBG flushing out information field, or both.

In some examples of the method, apparatuses, and non-transitory computer-readable medium described herein, the one or more SPS configurations include one or more downlink SPS configurations, one or more sidelink SPS configurations, or both.

In some examples of the method, apparatuses, and non-transitory computer-readable medium described herein, the information indicative of the configuration for the first device to provide CBG-based feedback for the one or more SPS communications includes downlink control information, sidelink control information, or both.

In some examples of the method, apparatuses, and non-transitory computer-readable medium described herein, the threshold number of CBGs is different from a number of CBGs configured for communications of CBG-based feedback scheduled by one or more dynamic grants associated with a same serving cell as the one or more SPS communications.

In some examples of the method, apparatuses, and non-transitory computer-readable medium described herein, a bit width of a field in control information scheduling one or more retransmissions corresponding to the CBG-based feedback may be based on the threshold number of CBGs being greater than the number of CBGs configured for communications of CBG-based feedback scheduled by the one or more dynamic grants.

A method for wireless communication at a second device is described. The method may include communicating information indicative of a configuration for a first device to provide CBG-based feedback for one or more SPS communications scheduled for the first device, communicating one or more SPS communications in one or more CBGs of a transport block in accordance with one or more SPS configurations, and obtaining one or more feedback bits associated with the one or more SPS communications in accordance with the configuration for the first device to provide CBG-based feedback.

An apparatus for wireless communication at a second device is described. The apparatus may include a processor, memory coupled with the processor, and instructions stored in the memory. The instructions may be executable by the processor to cause the apparatus to communicate information indicative of a configuration for a first device to provide CBG-based feedback for one or more SPS communications scheduled for the first device, communicate one or more SPS communications in one or more CBGs of a transport block in accordance with one or more SPS configurations, and obtain one or more feedback bits associated with the one or more SPS communications in accordance with the configuration for the first device to provide CBG-based feedback.

Another apparatus for wireless communication at a second device is described. The apparatus may include means for communicating information indicative of a configuration for a first device to provide CBG-based feedback for one or more SPS communications scheduled for the first device, means for communicating one or more SPS communications in one or more CBGs of a transport block in accordance with one or more SPS configurations, and means for obtaining one or more feedback bits associated with the one or more SPS communications in accordance with the configuration for the first device to provide CBG-based feedback.

A non-transitory computer-readable medium storing code for wireless communication at a second device is described. The code may include instructions executable by a processor to communicate information indicative of a configuration for a first device to provide CBG-based feedback for one or more SPS communications scheduled for the first device, communicate one or more SPS communications in one or more CBGs of a transport block in accordance with one or more SPS configurations, and obtain one or more feedback bits associated with the one or more SPS communications in accordance with the configuration for the first device to provide CBG-based feedback.

Some examples of the method, apparatuses, and non-transitory computer-readable medium described herein may further include operations, features, means, or instructions for communicating one or more feedback bits for the one or more SPS configurations, the one or more feedback bits corresponding to respective CBGs of the one or more CBGs.

Some examples of the method, apparatuses, and non-transitory computer-readable medium described herein may further include operations, features, means, or instructions for communicating one or more control parameters for activating each SPS configuration of the one or more SPS configurations and obtaining the CBG-based feedback in accordance with the one or more control parameters.

Some examples of the method, apparatuses, and non-transitory computer-readable medium described herein may further include operations, features, means, or instructions for communicating a control information message scheduling one or more retransmissions for the one or more SPS communications, the control information message indicative of whether CBG-based feedback may be enabled or disabled for one or more SPS communications and communicating the one or more retransmissions of the one or more SPS communications in the one or more CBGs in accordance with the scheduling.

Some examples of the method, apparatuses, and non-transitory computer-readable medium described herein may further include operations, features, means, or instructions for communicating a control information message scheduling the one or more SPS communications, one or more fields in the control information message indicative of an activation or a deactivation of the one or more SPS configurations for providing CBG-based feedback based feedback, the one or more fields including a CBG transmission information field, a CBG flushing out information field, or both.

In some examples of the method, apparatuses, and non-transitory computer-readable medium described herein, the first device and the second device include an antenna, an antenna panel, or both.

BRIEF DESCRIPTION OF THE DRAWINGS

FIGS. 6 through 8A & 8B illustrate examples of feedback generation configurations that support CBG-based retransmission and feedback for SPS in accordance with one or more aspects of the present disclosure.

DETAILED DESCRIPTION

Figure 1:
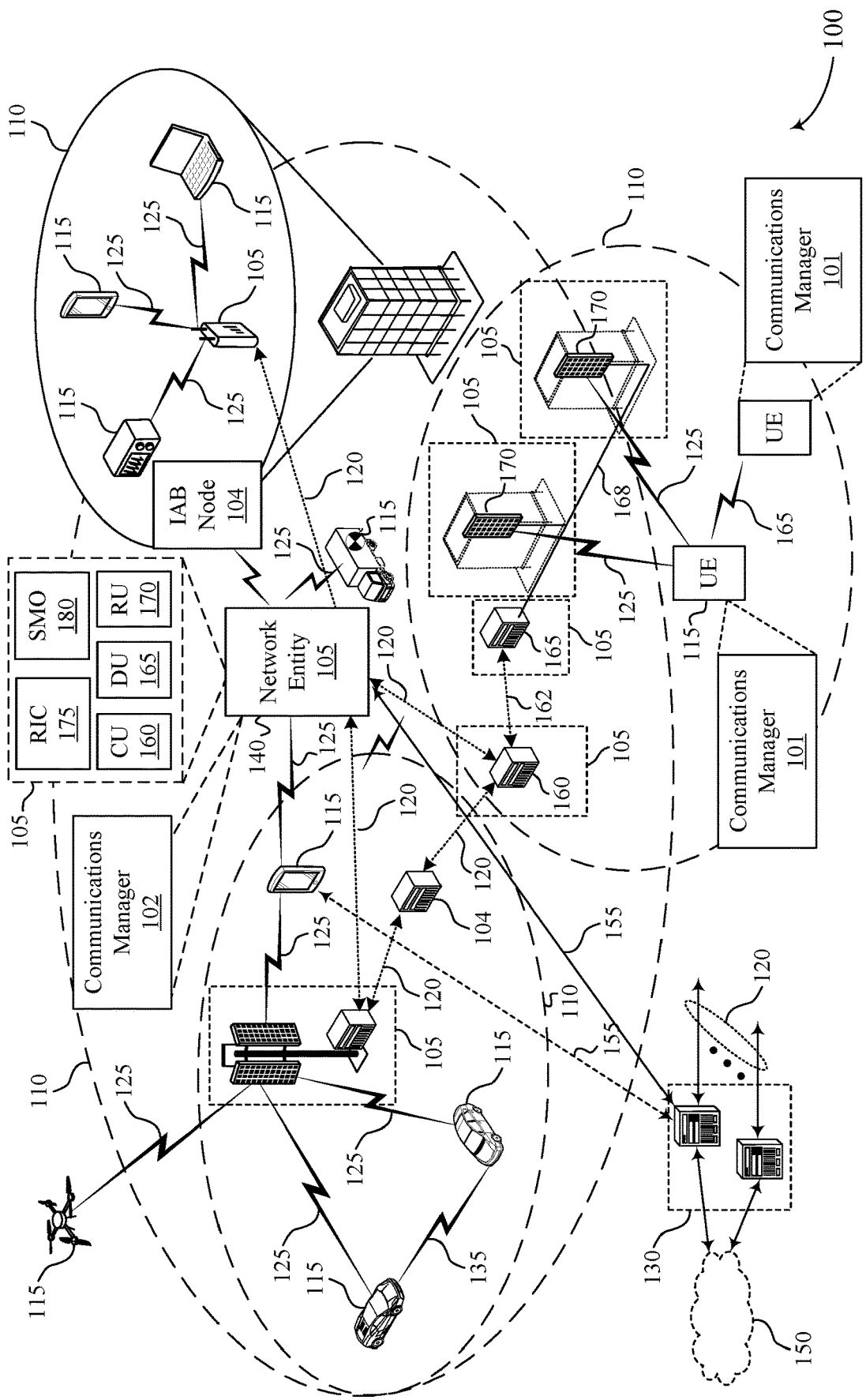
FIGS. 1 and 2 illustrate examples of wireless communications systems that support CBG-based retransmission and feedback for SPS in accordance with one or more aspects of the present disclosure.

In some wireless communications systems, devices may implement feedback and retransmission procedures such as hybrid-automatic repeat request-acknowledgement (HARQ-ACK) to provide feedback for semi-persistently scheduled (SPS) communications where a device is provided with a scheduling decision or communications grant and an indication to monitor for downlink or sidelink data every n subframes, or dynamically granted data, where the device receives control information for each received communication. In some examples, the device may provide acknowledgement or non-acknowledgement for downlink or sidelink data received using the semi-persistently scheduled or dynamically scheduled data to inform another device whether the communications were successfully received.

In some examples, a first device such as a UE may support transport block (TB)-based feedback, and may use one bit to report feedback for receipt of information communicated by a TB. In some other examples, the first device may support CBG-based HARQ feedback to reduce control signaling overhead. For example, each TB may include multiple code blocks (CBs), and one or more CBs may be further grouped together to form a CBG within the TB. In such examples, the first device may provide HARQ feedback for each CBG included within a TB (e.g., the UE may provide one bit of HARQ feedback per CBG in the TB, rather than a single bit for the full TB). Such CBG-based feedback may implement dynamic grant-based scheduling, where scheduling information for the first device to transmit feedback or retransmissions is included in a downlink grant provided to the first device by a second device. In some cases, however, the first device may be semi-persistently scheduled (e.g., the first device is configured to receive communications using a set of scheduled resources) rather than dynamically scheduled (e.g., the first device may receive a grant for each communication it receives), and may use periodic grants (e.g., SPS communications that are configured via control signaling) to communicate with the second device or with the network.

In some cases, the first device may receive information for transmitting CBG-based HARQ-ACK feedback in control information received for the dynamic grant communications. For example, the first device may receive a dynamic grant for each communication it receives, and each dynamic grant may also include information for the first device to use to transmit CBG-based HARQ-ACK information related to the received communication. In some other cases, however, when the first device is configured to receive SPS communications, the first device may not receive grants for each communication it receives, and thus may implement different techniques to determine the associated information for sending CBG-based HARQ-ACK for the SPS communications.

The first device may implement a number of different techniques to support CBG-based HARQ-ACK feedback for SPS communications. The first device may receive information (e.g., control information such as downlink control information (DCI) or sidelink control information (SCI), radio resource control (RRC) signaling) that is indicative of a configuration (e.g., a feedback configuration) for providing CBG-based feedback for one or more SPS communications. For example, in some examples, the UE may monitor for the one or more SPS communications (e.g., downlink SPS communications or sidelink SPS communications) in one or more CBGs of a TB in accordance with respective SPS communication configurations that are enabled or disabled for the SPS communications. In some cases, the first device may be configured to generate feedback bits (e.g., HARQ-ACK bits) to send for the one or more SPS communications associated with each CBG of the TB.

In some examples, CBG-based HARQ-ACK feedback and retransmission may be configured by a network entity for each SPS physical downlink shared channel (PDSCH) configuration separately such that if the dynamic PDSCH is configured with CBG-based feedback, then the SPS communications configurations on the same cell will also be configured for CBG-based feedback. In some examples, the first device may determine a threshold number of CBGs (e.g., a maximum number of CBGs associated with the respective TB) for reporting SPS PDSCH. In addition to determining how to send the HARQ-ACK feedback for the SPS communications, the first device may determine how to generate a HARQ-ACK codebook for the SPS PDSCH transmissions by concatenating or combining the HARQ-ACK information bits for different SPS PDSCH transmissions according to different orderings, different HARQ-ACK codebook types, or based on different activation or deactivation of SPS communications configurations.

In some examples, the techniques described herein supporting CBG-based retransmission and feedback for SPS communications may increase reliability of communications through the transmission of CBG-based feedback and retransmissions. For example, using CBG-based feedback may allow a device to send feedback more frequently (e.g., for multiple occasions or CBGs per TB rather than once per TB). Additionally or alternatively, the device may provide more granular or up-to-date feedback by transmitting HARQ-ACK for each CBG in a TB rather than waiting to the end of a TB to transmit feedback. In some other examples, utilizing CBG-based retransmission and feedback for SPS communications may reduce latency associated with sending feedback to support low latency applications such as ultra-reliable low latency communications (URLLC) and extended reality (XR) applications. For example, the device may be able to send a bit of feedback after each CBG, rather than waiting for the completion of a full TB to send feedback. In some other examples, the techniques described herein may reduce signaling overhead based on the use of SPS communications (relative to dynamically scheduled communications), because the SPS communications may use relatively less control signaling for scheduling the CBG-based communications and feedback.

Aspects of the disclosure are initially described in the context of wireless communications systems. Aspects of the disclosure are further illustrated by and described with reference to apparatus diagrams, system diagrams, SPS communications configurations, a process flow, and flowcharts that relate to CBG-based retransmission and feedback for SPS communications.

FIG. 1 illustrates an example of a wireless communications system 100 that supports CBG-based retransmission and feedback for SPS communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140). A UE 115 or a network entity 105 may communicate with the core network 130 through a communication link 155.

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support CBG-based retransmission and feedback for SPS communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some examples, a UE 115 may also be able to communicate directly with other UEs 115 over a D2D communication link 135. In some cases, a communication link 135 may be referred to as a sidelink communication link and may be used for sidelink communications between UEs 115. In some cases, a sidelink communication link as described herein may additionally or alternatively represent an example of a relay link 165, where the relay link 165 may be used to relay information (e.g., data, control information) from a first UE 115 to a second UE 115. In some cases, the relay link may additionally or alternatively be an example of a communication link 135. In some examples, one or more of the operations performed by the sidelink UEs 115 may be performed by a UE communications manager 101, which may be an example of a communications manager described herein.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

As described herein, a node, which may be referred to as a node, a network node, a network entity, or a wireless node, may be a base station (e.g., any base station described herein), a UE (e.g., any UE 115 described herein), a network controller, an apparatus, a device, a computing system, one or more components, and/or another suitable processing entity configured to perform any of the techniques described herein. For example, a network node may be a UE 115. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples.

Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

UEs 115 may include a UE communications manager 101 and network entity 105 may include a communications manager 102 that may each support CBG-based feedback and retransmissions for SPS communications. The UE communications manager 101 may be an example of aspects of a communications manager as described in FIGS. 11 through 14. The network entity communications manager 102 may be an example of aspects of a communications manager as described in FIGS. 15 through 18.

Wireless communications system 100 may support downlink SPS communications for communicating periodic traffic to reduce DCI overhead and downlink scheduling latency. For example, downlink SPS communications may reduce latency associated with sending HARQ-ACK feedback to support communications that have low latency applications and are scheduled using a periodic pattern (e.g., industrial IoT applications or other periodic traffic). For example, a first device may transmit feedback for each CBG of a TB rather than waiting to send feedback for an entire TB. Some systems may include a single active downlink SPS communications configuration per PUCCH group (e.g., a group of serving cells configured by RRC that use the same serving cell in the group for transmission of a PUCCH), with a periodicity of 10 ms. In such systems, a first device may generate 1 bit of HARQ-ACK feedback for downlink SPS communications per slot. Some other systems may support multiple active downlink SPS communications configurations per PUCCH group with a reduced periodicity of 1 slot. In these systems, however, HARQ-ACK feedback and HARQ retransmission may in some cases may be TB-based such that the device provides 1 bit of HARQ-ACK per TB, and if any code blocks of the TB is not successfully received or decoded, a second device retransmits the whole TB. Accordingly, a single TB is supported for each downlink SPS communication, and in some cases, if a SPS PDSCH associated with the single TB is deactivated, this may cause joint deactivation of multiple SPS PDSCHs on the TB. In some other systems, SPS HARQ-ACK communications may conflict with semi-static or TDD DL symbols, for example, those associated with URLLC or IIoT applications, and a device may implement deferred SPS HARQ-ACK communications, to defer a HARQ-ACK feedback when it collides with semi-static or TDD DL symbols.

Some other systems may support CBG-based HARQ-ACK feedback and retransmission techniques to more efficiently and accurately convey information to the network, and to better serve low latency applications (e.g., URLLC, IIoT and extended reality (XR) traffic). For example, to support low latency applications, the device may send CBG-based feedback more frequently than for TB-based feedback for SPS communications, which may reduce the amount of time the network waits to receive feedback. Additionally or alternatively, CBG-based HARQ-ACK feedback may support high throughput applications by supporting a relatively greater number of communications between devices using SPS communications, without the relatively high signaling overhead that may be associated with dynamically scheduled communications. CBG based HARQ-ACK feedback and retransmission for SPS communications (e.g., downlink SPS communications, sidelink SPS communications, or both) may support the periodic and latency sensitive characteristics of low latency communications.

In some wireless communications systems, devices may implement feedback and retransmission procedures such as HARQ-ACK procedures to provide feedback for scheduled communications, for example, to provide acknowledgement or non-acknowledgement for downlink or sidelink data. In some examples, a first device such as a UE 115 may support TB-based feedback or CBG-based HARQ feedback, such that the first device may provide HARQ feedback either per-TB or per-CBG included within a TB (e.g., the UE may provide one bit of HARQ feedback per CBG in the TB, or a single bit for the full TB). In some cases, however, the first device may be semi-persistently scheduled rather than dynamically scheduled, and may use periodic grants to communicate with the second device or with the network entity 105. Accordingly, the first device may implement a number of different techniques to determine how to send CBG-based feedback for the SPS communications.

The first device may receive control information (e.g., DCI, SCI RRC signaling) that is indicative of a configuration for providing CBG-based feedback for one or more SPS communications. For example, in some implementations, the UE may monitor for the one or more SPS communications in one or more CBGs of a TB in accordance with respective SPS communication configurations that are enabled or disabled for the SPS communications. In some cases, the first device may be configured to generate feedback bits (e.g., HARQ-ACK bits) to send for the one or more SPS communications for each CBG.

In some examples, CBG-based HARQ-ACK feedback and retransmission may be configured for each SPS communication configuration (e.g., SPS PDSCH configuration, SPS sidelink communication configuration) separately such that if the dynamic PDSCH on a serving cell is configured with CBG-based feedback reporting, then the SPS communication configurations on the same serving cell will also be configured with CBG-based feedback reporting (e.g., if a serving cell supports CBG-based feedback for dynamically scheduled communications, the network may jointly configure the serving cell with CBG-based feedback for SPS communications). In some examples, the first device may determine a threshold (e.g., a maximum) number of CBGs for reporting SPS PDSCH. For example, the threshold number of CBGs may be the total number of CBGs that are included in a TB transmitted by the network or by another device. In addition to determining how to send the HARQ-ACK feedback for the SPS communications, the first device may determine how to generate a HARQ-ACK codebook for the SPS PDSCH communications by concatenating or combining the HARQ-ACK information bits for different SPS PDSCH transmissions.

Figure 2:
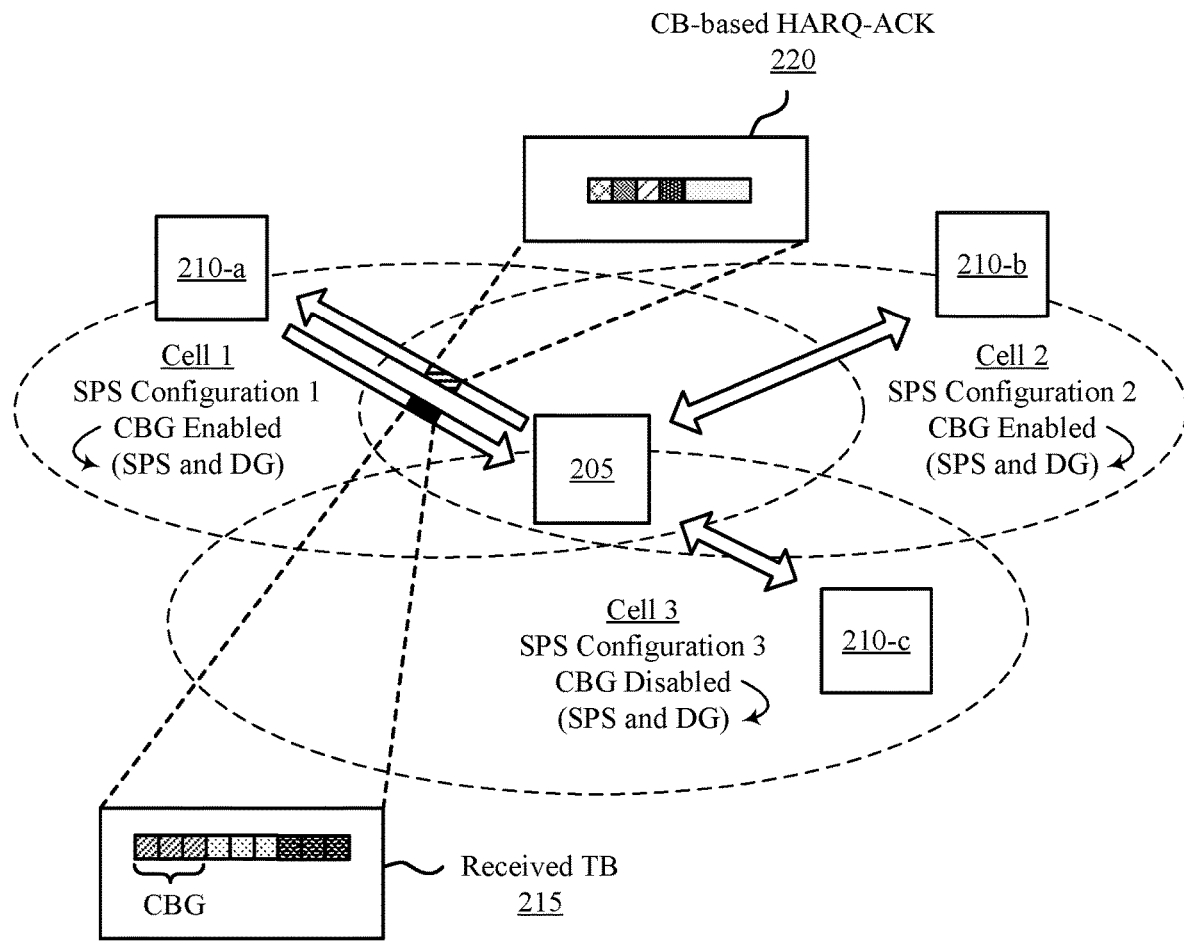

FIG. 2 illustrates an example of a wireless communications system 200 that supports CBG-based retransmission and feedback for SPS communications in accordance with one or more aspects of the present disclosure. For example, wireless communications system 200 may illustrate communications between a first device 205 and second devices 210-a, 210-b, and 210-c, which may be examples of devices (e.g., UEs, network entities) described herein. In some examples, the first device 205 may be an example of a UE and the second devices 210 may be an example of network entities. In some other examples, the first device 205 and the second devices 210 may be examples of sidelink devices (e.g., sidelink UEs). Communications described herein may be examples of both uplink and downlink communications and sidelink communications.

In some wireless communications systems (e.g., 5G/NR) systems, devices (e.g., such as UEs or other wireless communications devices, network entities, or a combination thereof) may use HARQ procedures to provide feedback for scheduled transmissions, for example, to provide acknowledgement or non-acknowledgement for downlink data. In some examples, a first device 205 may support transport block (TB)-based feedback for downlink transmissions (e.g., received TB 215), where the first device 205 uses one bit to report feedback for a TB 215. In some other examples, the first device 205 may support code block-based HARQ feedback, such that the first device 205 may provide HARQ feedback 220 per-CBG included within the TB 215 (e.g., the UE may provide one bit of HARQ feedback per CBG in the TB). Such CBG-based feedback 220 may implement dynamically scheduled communications, where scheduling information (that the first device 205 may use to transmit feedback) is included in a downlink grant provided to the first device 205 by a second device 210-a or 210-b. In some cases, however, the first device 205 may be configured for SPS communications rather than dynamically scheduled communications, and may implement periodically scheduled resources to communicate with the second device 210 or with a network entity. For example, the SPS communications may be periodic and latency sensitive to support communications with low latency targets, because the SPS communications may allow a first device 205 to receive communications without first receiving a grant for each received communication. The first device 205 may implement a number of different techniques to determine how or where to send CBG-based feedback 220 for the SPS communications.

The first device 205 implements a number of different techniques to support CBG-based HARQ-ACK feedback for SPS communications. For example, the first device 205 may be configured to send the HARQ-ACK feedback 220 based on how many bits to send per SPS communication configuration, how many CBGs to report feedback for, how to construct a HARQ-ACK codebook for SPS PDSCH, and so on, using various techniques described herein. In some examples, CBG-based HARQ-ACK feedback and retransmission may be configured for each SPS PDSCH configuration separately. In some other examples if the dynamic PDSCH is configured with CBG-based reporting, then the SPS communications configurations on the same cell will also be configured. For example, the first device 205 may support communications on a number of different cells (e.g., cell 1, cell 2, and cell 3), which may each support different SPS communications configurations and each of which may have CBG-based feedback enabled or disabled. In some examples, the first device 205 may determine a threshold (e.g., maximum) number of CBGs for reporting SPS PDSCH which may be equal to the number of dynamically scheduled PDSCHs on the same serving cell, or different than the number of dynamically scheduled PDSCHs based on separate SPS communications configurations. In such cases, by configuring CBG-based HARQ-ACK for each SPS configuration separately, the CBG-based feedback may be flexibly configured for different SPS communication configurations supported by different devices.

For the CBG-based reporting, the UE may determine how to generate a HARQ-ACK codebook 220 for the SPS PDSCH communications by concatenating or combining the HARQ-ACK information bits for different SPS PDSCH communications according to downlink serving cell index (e.g., serving cell indices corresponding to cells 225-a and 225-b, which may be the same index or different indices), SPS communication configuration index, or downlink slot index in which the SPS PDSCH ends. Then in cases where the first device 205 is configured with a first number of cells (e.g., cell 1) with CBG enabled, and a second number of cells (e.g., cell 3) with CBG disabled, the first device 205 may generate a first HARQ-ACK sub-codebook for the communications on the first number of cells and a second HARQ-ACK sub-codebook for communications on the second number of cells and may concatenate the two HARQ-ACK sub-codebooks together to provide HARQ-ACK feedback for the first and second number of cells. For a single SPS PDSCH, the first device 205 may generate the HARQ-ACK information based on the actual number of CBGs in the SPS PDSCH, based on the threshold (e.g., maximum) number of CBGs for the associated SPS communications configuration, based on the threshold (e.g., maximum) number of CBGs across all SPS communications configurations in the same serving cell, or based on the threshold (e.g., maximum) number of CBGs across all SPS communication configurations and dynamic grant configurations in the same serving cell.

In some other examples, the first device 205 may construct a type-1 HARQ codebook 220 for CBG-based SPS communications feedback. For type-1 HARQ-ACK codebook generation, the first device 205 may multiplex HARQ-ACK information corresponding to both SPS communications (e.g., PDSCHs) and dynamically scheduled communications (e.g., dynamic grant PDSCHs). For example, the first device 205 may generate a number of HARQ-ACK information bits for an SPS PDSCH according to the threshold (e.g., maximum) number of CBGs configured for dynamic grant PDSCHs, or the threshold (e.g., maximum) number of CBGs configured for SPS communications in the same serving cell. In some other examples, the first device 205 may construct a type-2 HARQ codebook for CBG-based SPS communications feedback. The first device 205 may generate the Type-2 HARQ-ACK codebook for dynamic grant PDSCHs and SPS PDSCHs by concatenating or combining separate sub-codebooks for the dynamic grant and SPS PDSCHs.

In some other implementations, CBG-based retransmissions may be based on activation or deactivation of different SPS communication configurations. For example, one or more SPS communication configurations may be activated using different control information formats (e.g., a DCI format supporting CBG based retransmission, all DCI formats, sidelink control information formats).

Figure 3A:
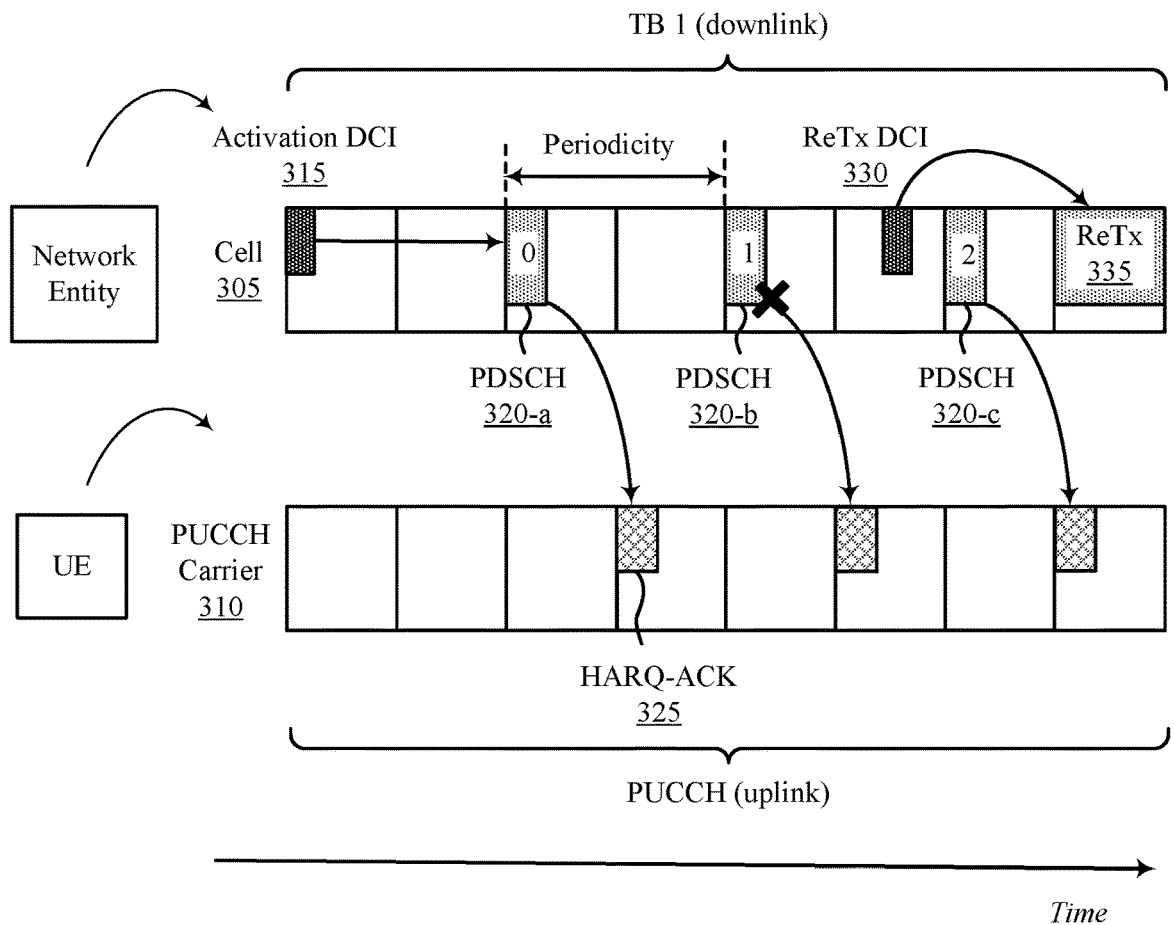
FIGS. 3A and 3B illustrate examples of an SPS communication configuration and a CBG-based feedback configuration that support CBG-based retransmission and feedback for SPS in accordance with one or more aspects of the present disclosure.
Figure 3B:
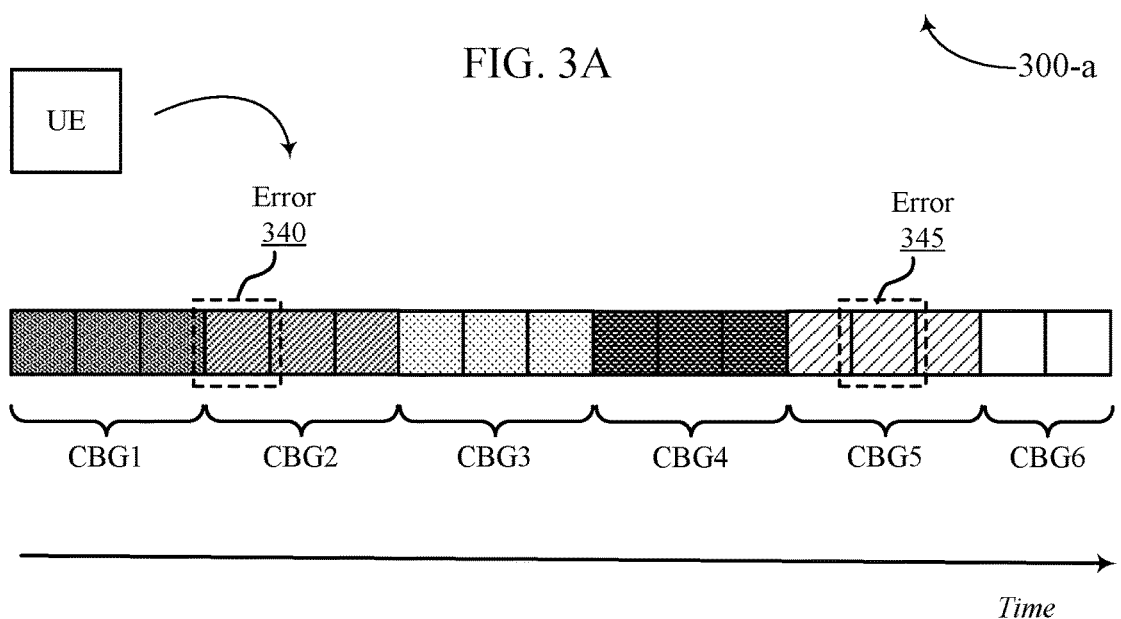

FIGS. 3A and 3B illustrates examples of an SPS communication configuration 300-a and a CBG-based feedback configuration 300-b that support CBG-based retransmission and feedback for SPS communications in accordance with one or more aspects of the present disclosure. For example, the grant-free SPS communication configuration 300-a and the CBG-based feedback configuration 300-b may be implemented at or by devices (e.g., UEs, network entities, sidelink devices) described herein.

FIG. 3A may illustrate a grant-free SPS communications configuration 300-a that supports low-latency communications using dynamic scheduling. For example, a device such as a UE may receive control signaling (e.g., RRC signaling, DCI, SCI) which may indicate a configuration for scheduling communications on cell 305 and uplink PUCCH carrier 310. The UE may receive an activation DCI 315 which activates the configuration, and may identify locations to receive PDSCHs 320 (e.g., 320-a, 320-b, and 320-c) from the network. The UE may also be configured to transmit HARQ-ACK information to acknowledge or negatively acknowledge receipt of the PDSCH on the uplink PUCCH carrier 310. For example, in some cases the PDSCH may be unsuccessfully received by the UE (e.g., PDSCH 320-b) and the UE may transmit a NACK to indicate the unsuccessful reception. In some examples, based on the NACK, the network may indicate a retransmission 335 of PDSCH 320-b using retransmission DCI 330.

FIG. 3B illustrates a CBG-based feedback configuration 300-b. In some implementations, a UE may provide a single bit of HARQ-ACK feedback 325 per CBG when CBG-based HARQ is configured. For example, a UE may transmit a positive acknowledgement (e.g., ACK) if all CBs in the CBG are correctly decoded, or a negative acknowledgement (e.g., NACK) if one or more CBs in the CBG are incorrectly decoded (e.g., error 340, error 345, or both). For example, CBG-based feedback configuration 300-b may include a transport block with six CBGs (e.g., CBG1, CBG2, CBG3, CBG4, CBG5, and CBG6), and may incorrectly receive one CB 335 in CBG 2 and one CB 340 in CBG 5. In such cases, the UE may provide an ACK for CBGs 1, 3, 4, and 6, and will provide a NACK for CBGs 2 and 5 (e.g., the UE may provide a bit string that includes Ack,Nack,Ack,Ack,Nack, Ack for the six CBGs). In such cases, the network may retransmit the CBGs that are in error from the previous downlink transmission as indicated by the UE.

In some implementations, the UE may receive an RRC parameter (e.g., codeBlockGroupTransmission), which may enable or disable CBG-based feedback reporting in a downlink serving cells. Additionally or alternatively, the RRC parameter may configure CBG-based feedback reporting for one or more bandwidth parts of the serving cell used by the UE. In some examples of CBG-based HARQ-ACK reporting, the number of HARQ-ACK bits the UE reports per TB is equal to a total number (or a maximum number) of CBGs in the TB. For example, the UE may report up to four CBGs per TB in a multi-TB case (e.g., when the number of spatial layers are larger than 4) or up to eight CBGs in a single-TB case.

In addition, the DCI containing the initial downlink grant and retransmission downlink grants may contain a CBG transmission information (CBGTI) field that has a bit width equal to the maximum number of CBGs per TB (e.g., to indicate which CBGs are retransmitted by the network), and a CBG flushing indicator to indicate whether a previous CBG is to be flushed by a retransmission (e.g., to indicate whether previous transmission is invalid).

Figure 4A:
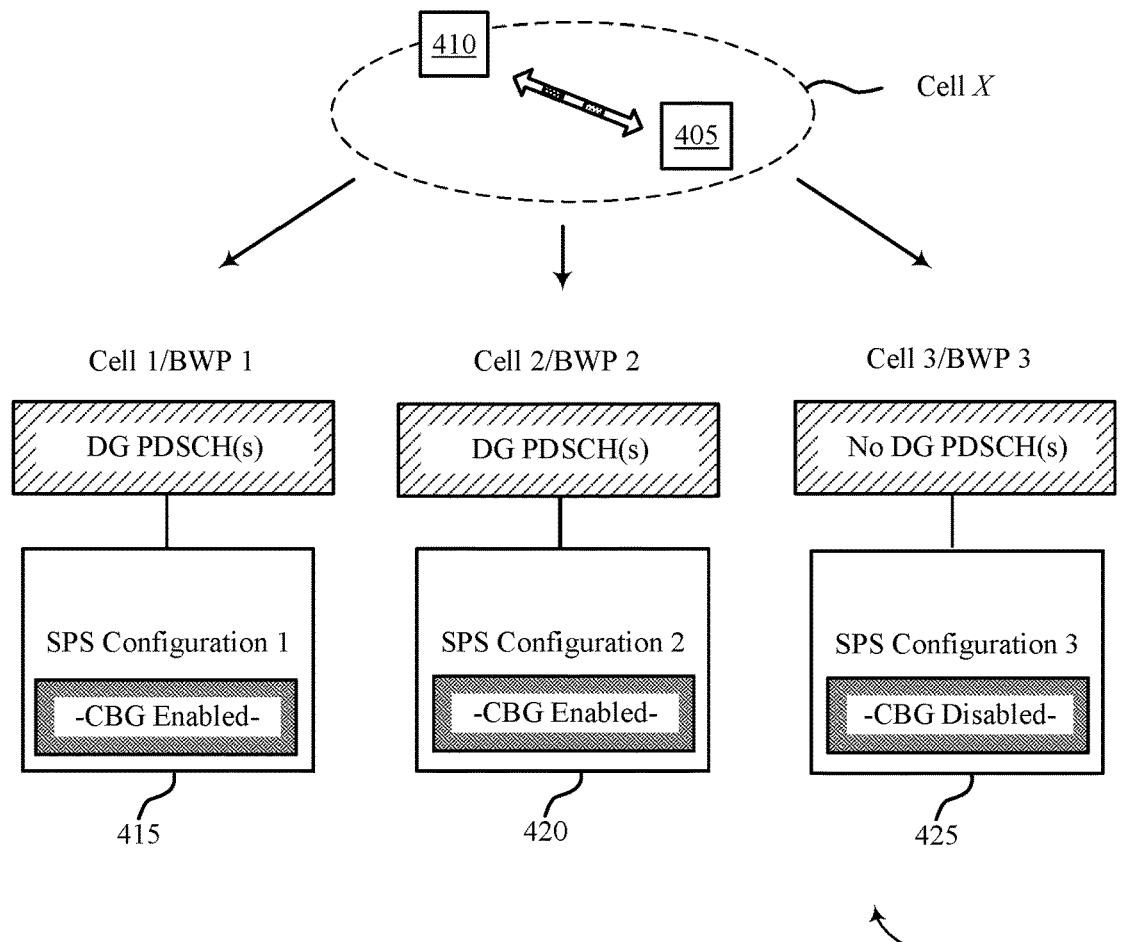
FIGS. 4A and 4B illustrate examples of downlink cell configurations that support CBG-based retransmission and feedback for SPS in accordance with one or more aspects of the present disclosure.
Figure 4B:
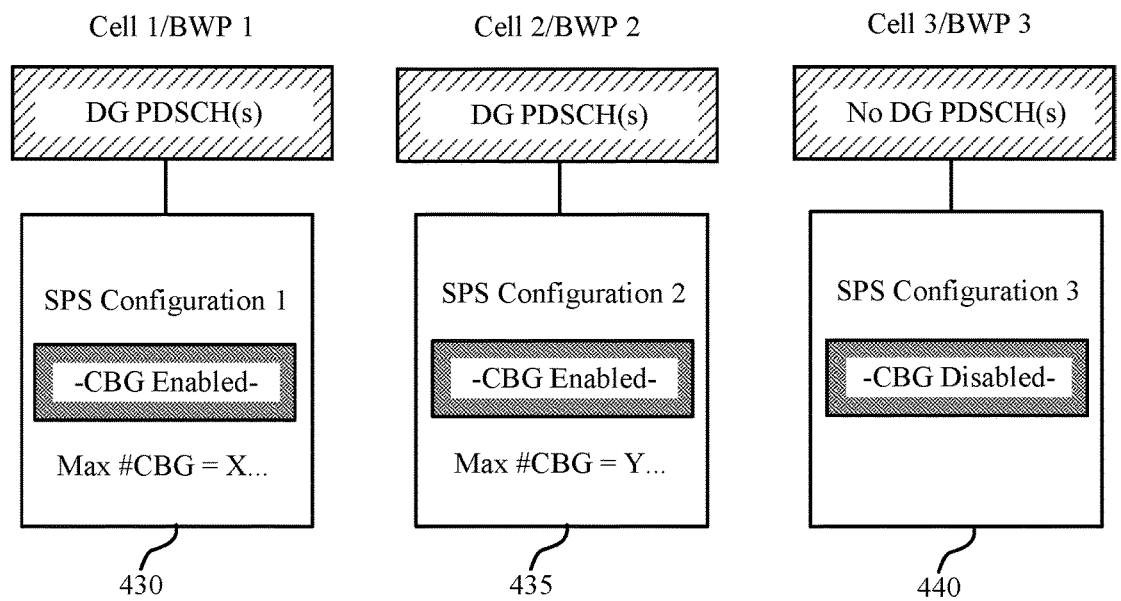

FIGS. 4A and 4B illustrate examples of downlink cell configurations 400-a and 400-b that support CBG-based retransmission and feedback for SPS communications in accordance with one or more aspects of the present disclosure. For example, the downlink cell configurations 400-a and 400-b may be implemented at or by devices such as a first device 405 and a second device 410, which may be examples of corresponding devices (e.g., UEs, network entities, sidelink devices) described herein. In some examples, the first device 405 may be an example of a UE, and the second device 410 may be an example of a network entity.

In some implementations, for example, for downlink cell configurations 400-a (e.g., cell X configurations) illustrated in FIG. 4A, the network may configure CBG-based HARQ-ACK feedback and retransmission separately for each SPS PDSCH configuration. For example, CBG-based HARQ-ACK feedback and retransmission may be configured in the bandwidth part or the one or more downlink serving cells X that are configured with CBG transmission for dynamic PDSCH (e.g., dynamic-grant (DG) PDSCH). The network device 410 may communicate a CBG parameter to the UE 405 which may indicate whether CBG-based HARQ-ACK feedback and retransmission is configured for one or more downlink serving cells. In such examples, if dynamic-grant PDSCH is configured with CBG-based HARQ-ACK feedback and retransmission, then the SPS communication configurations on the same cell may also be configured with CBG-based HARQ-ACK feedback and retransmission. For example, the enabling or disabling the CBG-based feedback configuration may be indicated by the presence or absence of the CBG parameter. Additionally or alternatively, if dynamic-grant PDSCH is not configured with CBG-based HARQ-ACK feedback and retransmission, then CBG-based HARQ-ACK feedback and retransmission may be disabled for the SPS communication configurations on the same cell.

For downlink cell configurations 400-a, a first cell 415 (e.g., cell 1) may be configured with CBG transmission for DG PDSCH, which may indicate that CBG-based feedback is enabled for SPS communication configuration 1 on the first cell 415. In addition, the activation of CBG-based HARQ-ACK feedback on a second cell 420 (e.g., cell 2) may be separately indicated from the first cell 405. For example, the second cell 420 may be configured with CBG transmission for DG PDSCH, which may indicate that CBG-based feedback is enabled for SPS communication configuration 2 on the second cell 420. Additionally or alternatively, the deactivation or absence of CBG-based HARQ-ACK feedback on a third cell 425 (e.g., cell 3) may be separately indicated from the first cell 415 and the second cell 420. For example, the third cell 425 may not be configured with CBG transmission for DG PDSCH, which may indicate that CBG-based feedback is disabled for SPS communication configuration 3 on the third cell 425.

In some other implementations illustrated in FIG. 4B, for example, for downlink cell configurations 400-b, the network may indicate a threshold number (e.g., a maximum number) of CBGs per TB for SPS PDSCH in a control parameter that enables or disables the CBG configuration. In some examples, the maximum number of CBGs may be the same as the number of dynamically scheduled PDSCHs on the same downlink BWP or serving cell. In such examples, the configuration of the CBG parameter may indicate whether CBG-based feedback is enabled (e.g., "enable") or disabled (e.g., "disable") for each SPS communication configuration.

For downlink cell configurations 400-b, a first cell or BWP 430 (e.g., cell 1/BWP1) may be configured with CBG transmission for DG PDSCH, which may indicate that CBG-based feedback is enabled for SPS communication configuration 1 on the first cell for a maximum number of CBGs equal to X CBGs. In addition, the activation of CBG-based HARQ-ACK feedback on a second cell or BWP 435 (e.g., cell 2/BWP2) may be separately indicated from the first cell or BWP 420. For example, the second cell or BWP 435 may be configured with CBG transmission for DG PDSCH, which may indicate that CBG-based feedback is enabled for SPS communication configuration 2 on the second cell or BWP 435 for a maximum number of CBGs equal to Y CBGs. Additionally or alternatively, the deactivation or absence of CBG-based HARQ-ACK feedback on a third cell or BWP 440 (e.g., cell 3/BWP 3) may be separately indicated from the first cell or BWP 430 and the second cell or BWP 445. For example, the third cell or BWP 440 may not be configured with CBG transmission for DG PDSCH, which may indicate that CBG-based feedback is disabled for SPS communication configuration 3 on the third cell or BWP 440.

In some other examples, the CBG-based HARQ-ACK feedback may be separately configured for each SPS PDSCH configuration, and could be different from a maximum number of CBGs configured for dynamic grant PDSCH on the serving cell. For example, in some cases, the maximum number of CBGs for SPS PDSCH may be less than or equal to the maximum number of CBGs for dynamic grant PDSCH on the same serving cell. In such examples, the DCI that schedules retransmission for SPS PDSCH may have the same format as the DCI for scheduling dynamic grant PDSCH retransmission, and may indicate up to the number of CBGs configured for the dynamic grant PDSCH.

In some other examples, the maximum number of CBGs configured for SPS PDSCH may be greater than the maximum number of CBGs configured for dynamic grant PDSCH. In this case, the bit width of the CBG transmission information (CBGTI) field in the downlink scheduling DCI may be set according to the maximum number of CBGs configured across all SPS PDSCH configurations and dynamic grant PDSCH configurations in the same downlink bandwidth part or downlink serving cell.

In some implementations of downlink cell configurations 400-b, the CBG configurations for SPS communications may be associated with the CBG configuration for dynamic PDSCH on the downlink serving cell that is configured to support SPS communications. In such cases, if the cell is configured with CBG for dynamic PDSCH, then all SPS PDSCHs configured on the DL cell may be configured (e.g., automatically) with CBG-based HARQ-ACK feedback.

In some cases, the UE 405 may receive a joint RRC parameter per cell or per bandwidth part that enables or disables the CBG-based HARQ-ACK configuration for all SPS communication configurations on the cell or BWP. Accordingly, the UE may be configured with two CBG parameters on the cell, including one CBG configuration for dynamic PDSCH and another (e.g., separate) CBG configuration for SPS PDSCH, which applies to all the SPS communication configurations configured on the DL serving cell/BWP. In this case, a same CBG configuration may be used for each SPS communication configuration of the SPS communication configurations on the cell or bandwidth part.

Figure 5A:
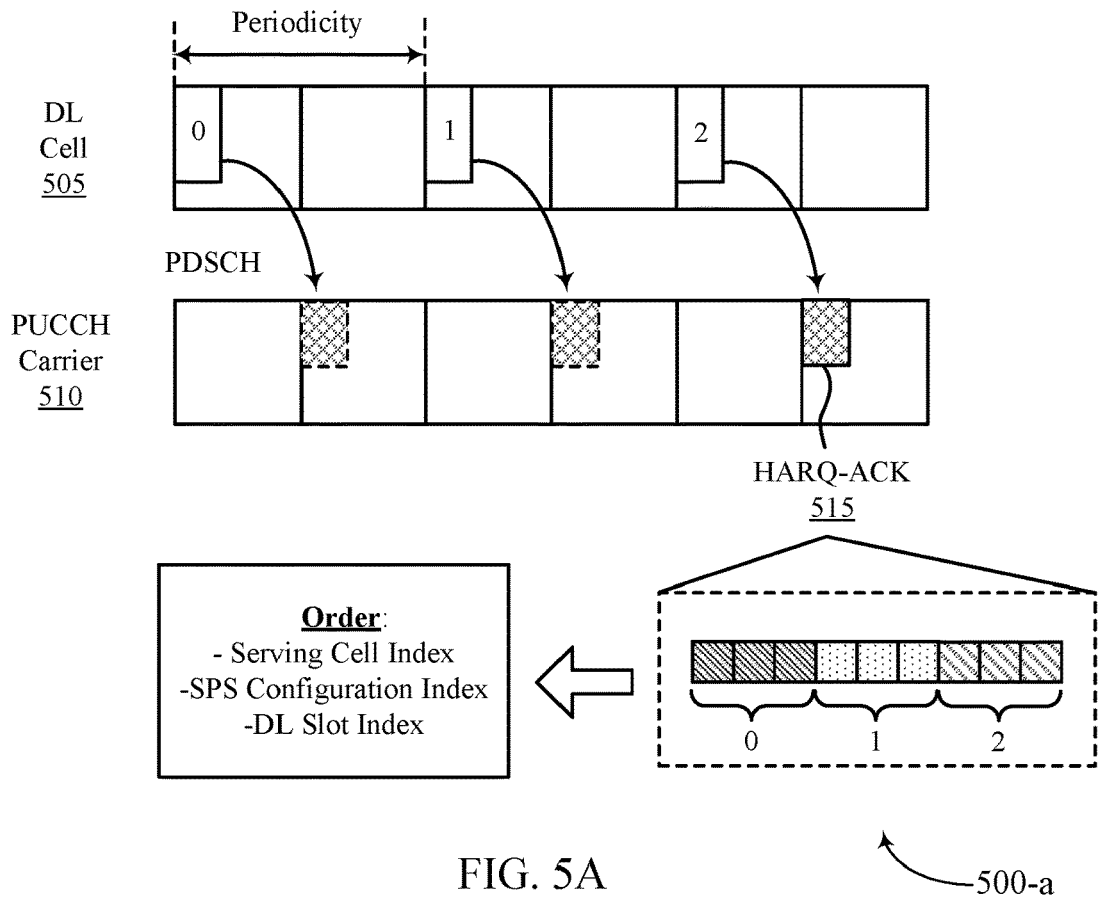
FIGS. 5A and 5B illustrate examples of CBG-based feedback configurations that support CBG-based retransmission and feedback for SPS in accordance with one or more aspects of the present disclosure.
Figure 5B:
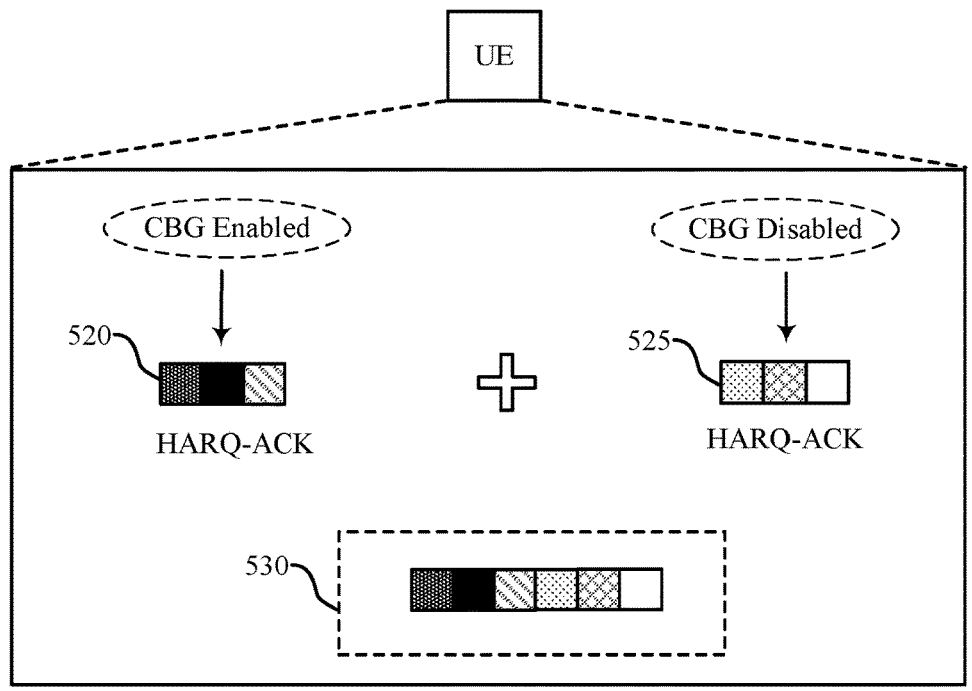

FIGS. 5A and 5B illustrate examples of CBG-based feedback reporting configurations 500-a and 500-b that support CBG-based retransmission and feedback for SPS communications in accordance with one or more aspects of the present disclosure. For example, the CBG-based feedback reporting configurations 500-a and 500-b may be implemented at or by devices (e.g., UEs, network entities, sidelink devices) described herein.

In some implementations, for example, in CBG-based feedback reporting configuration 500-a illustrated in FIG. 5A, UE may receive a number of different SPS PDSCH communications (e.g., SPS PDSCH communications 0, 1, 2) on a downlink cell 505 and may report HARQ-ACK feedback for one or more SPS PDSCH transmissions (including the deferred SPS HARQ-ACK communications) on an uplink PUCCH carrier 510, the UE may generate a HARQ-ACK codebook for the HARQ-ACK 515 by concatenating the HARQ-ACK information bits (e.g., groups 0, 1, and 2) for different SPS PDSCH transmissions (0, 1, and 2) using a configured ordering. For example, the UE may concatenate the bits according to downlink serving cell index, according to SPS communication configuration index (e.g., if downlink serving cell index are the same for two SPS PDSCH communications), and according to the downlink slot index in which the SPS PDSCH ends (e.g., for two SPS PDSCH communications on the same serving cell and same SPS communication configurations).

In some cases, for example, in CBG-based feedback reporting configuration 500-b illustrated in FIG. 5B, the UE may generate the HARQ-ACK codebook for SPS PDSCH communications by concatenating a first set of HARQ-ACK information bits 520 for SPS CBG-based HARQ-ACK feedback enabled, and a second set of HARQ-ACK information bits 525 for SPS communication configurations with CBG-based HARQ-ACK feedback disabled.

Figure 6:
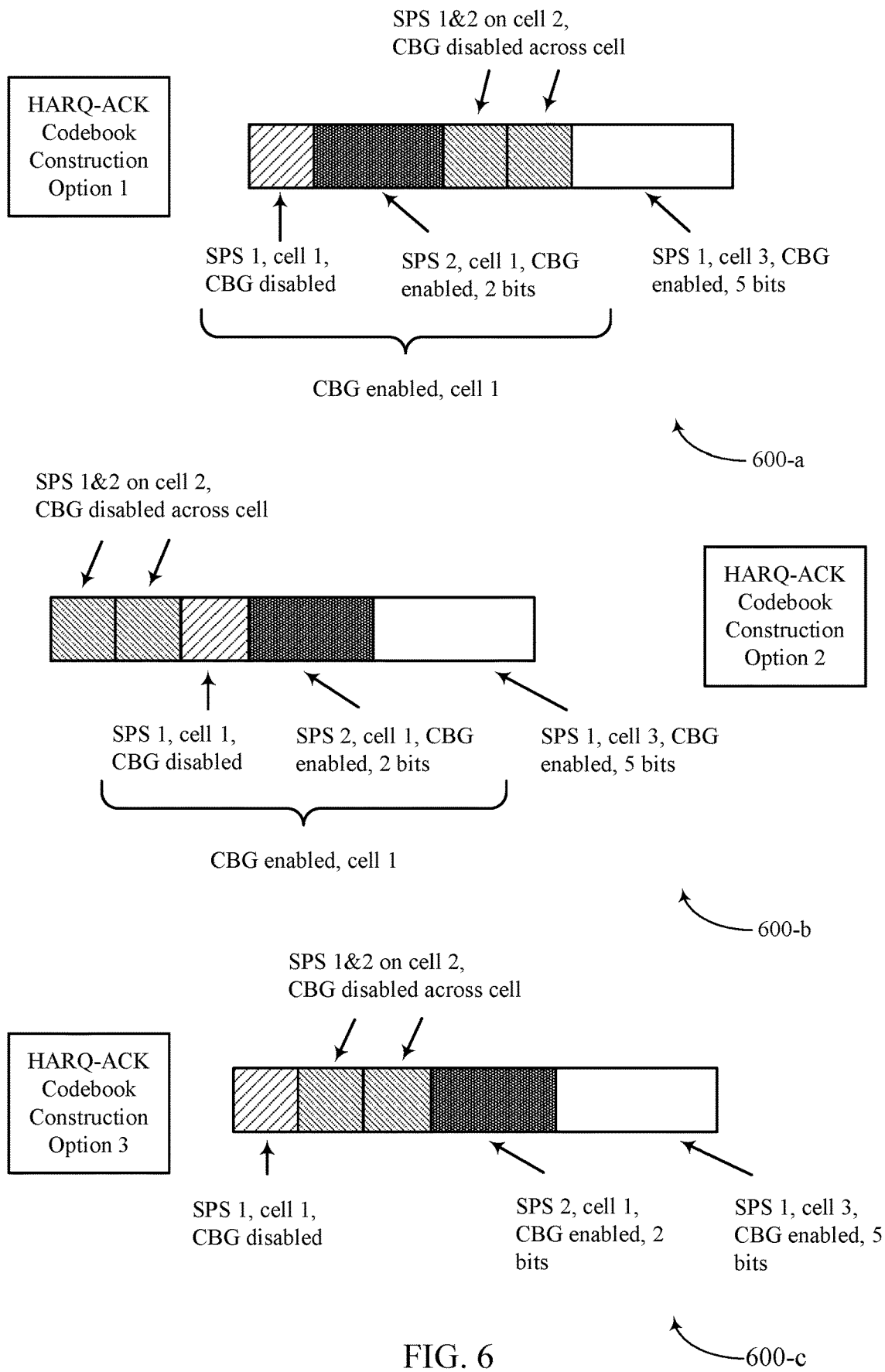

FIG. 6 illustrates an example of feedback generation configuration 600-a, 600-b, and 600-c that support CBG-based retransmission and feedback for SPS communications in accordance with one or more aspects of the present disclosure. For example, the feedback generation configurations 600-a, 600-b, and 600-c may be implemented at or by devices (e.g., UEs, network entities, sidelink devices) described herein.

In some cases where the UE is configured with a first number of cells with CBG-based feedback enabled (e.g., X cells), and a second number of cells with CBG-based feedback disabled (e.g., Y cells), the UE may generate the HARQ-ACK codebook for SPS PDSCH communications by concatenating the HARQ-ACK information bits for different SPS PDSCH communications by applying the configured ordering across the X cells and the Y cells described with reference to FIG. 5. For example, the UE may concatenate the bits according to downlink serving cell index, according to SPS communication configuration index (e.g., if downlink serving cell index are the same for two SPS PDSCH communications), and according to the downlink slot index in which the SPS PDSCH ends (e.g., for two SPS PDSCH communications on the same serving cell and same SPS communication configurations).

For example, in a first configuration 600-a, the UE may generate the HARQ-ACK codebook based on in accordance with cell index (e.g., ordering a first cell, second cell, and third cell), SPS communication configuration index, and downlink slot index. In some examples, for each SPS PDSCH, the UE may generate a number of HARQ-ACK bits according to the CBG configuration (e.g., whether CBG is enabled or disabled or configured or not-configured for this SPS PDSCH configuration). In some cases, for example, in cases that CBG-based HARQ-ACK feedback reporting is configured or enabled, the number of HARQ-ACK bits that the UE generates may be based on the actual number of CBGs included in the SPS PDSCH, the total number of CBGs possible for the SPS PDSCH configuration, or the total number of CBGs across all SPS configurations of a downlink BWP or serving cell. For example, a first SPS communication configuration (SPS 1) on a first cell (cell 1) may be CBG disabled, and a second SPS communication configuration (SPS2) on the first cell (cell 1) may be CBG enabled, and may provide 2 bits of HARQ-ACK information. The first and second SPS communication configurations on cell 2 may have CBG disabled across the cell. Then, the first SPS communication configuration on cell 3 may have CBG enabled, and may provide 5 bits of HARQ-ACK information.

In a second configuration 600-b, the UE may apply the configured ordering across the X cells and the Y cells to generate two HARQ-ACK sub-codebooks. The UE may concatenate the two HARQ-ACK sub-codebooks together, and the HARQ-ACK sub-codebook associated with the Y cells (e.g., CBG disabled) may be placed prior to the HARQ-ACK sub-codebook associated with the X cells (e.g., CBG enabled). For example, the first and second SPS communication configurations on cell 2 may have CBG disabled across the cell. The first SPS communication configuration on cell 1 may be CBG disabled, and the second SPS communication configuration on the cell 1 may be CBG enabled, and may provide 2 bits of HARQ-ACK information. Then, the first SPS communication configuration on cell 3 may have CBG enabled, and may provide 5 bits of HARQ-ACK information.

In a third configuration 600-c, the UE may separately apply the configured ordering across SPS communication configurations that support CBG-based HARQ-ACK feedback, and without CBG-based HARQ-ACK feedback. For example, the UE may generate the HARQ-ACK codebook by concatenating the HARQ-ACK information bits for a first SPS communication configuration (SPS 1) on cell 1 which may be CBG disabled and the first and second SPS communication configurations on cell 2 which may have CBG disabled. The UE may concatenate two bits of HARQ information associated with a second SPS communication configuration (SPS2) on cell 1 with CBG enabled with 5 bits of HARQ information associated with the first SPS communication configuration on cell 3 with CBG enabled. In some examples, the UE may generate two HARQ-ACK sub-codebooks for CBG-disabled and CBG-enabled SPS communication configurations, respectively. In such examples, the UE may determine the ordering of bits in each sub-codebook based on the ordering described with reference to FIG. 5A.

Figure 7:
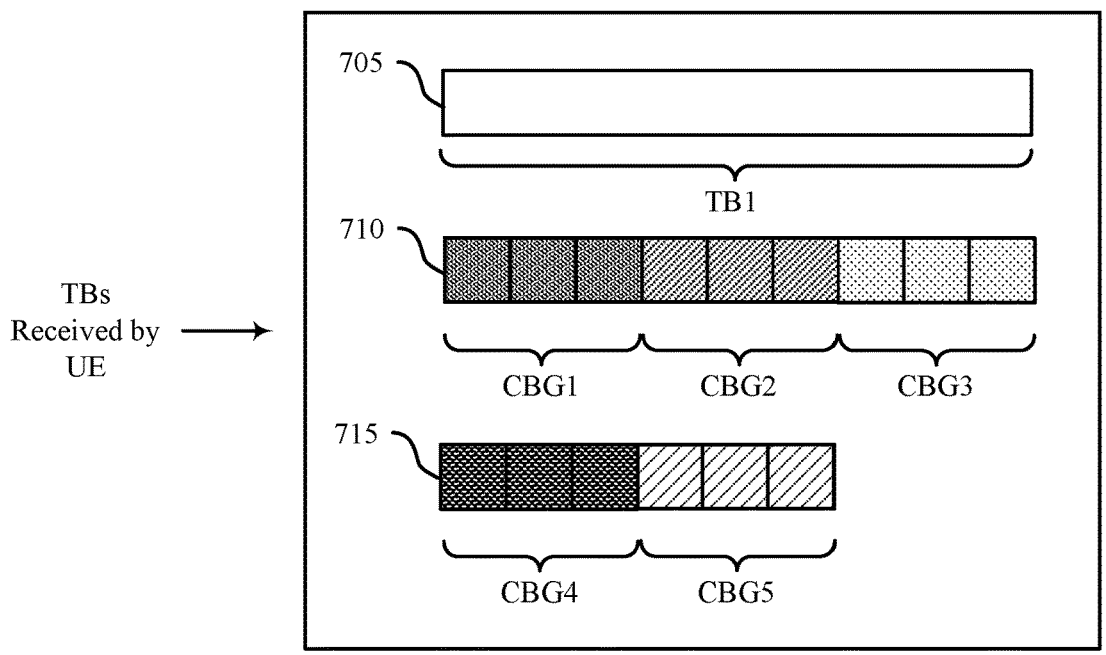
Figure 7:
Figure 7:
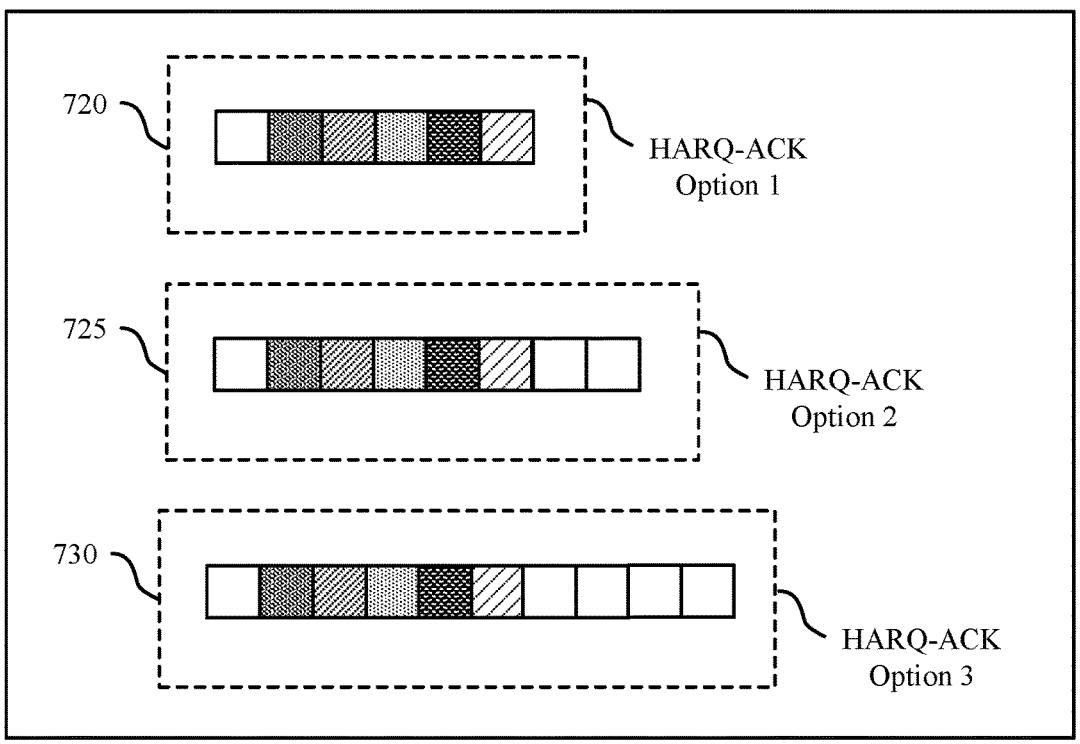

FIG. 7 illustrates an example of a feedback generation configuration 700 that supports CBG-based retransmission and feedback for SPS communications in accordance with one or more aspects of the present disclosure. For example, the feedback generation configuration 700 may be implemented at or by devices (e.g., UEs, network entities, sidelink devices) described herein.

In some implementations, the UE may generate HARQ-ACK information bits for CBG-based HARQ-ACK feedback and retransmission for a single SPS PDSCH communication based on a determined number of CBGs associated with the SPS communication configuration. In a first option (e.g., HARQ-ACK bits 720, option 1) the UE may generate HARQ-ACK information bits based on the actual number of CBGs included in the SPS PDSCH communication. For example, the UE may provide HARQ-ACK information corresponding to 3 SPS PDSCH communications in one PUCCH, the first SPS PDSCH communication has TB-based feedback (e.g., corresponding to one TB 705), and the second SPS PDSCH communication has CBG based feedback (with 3 CBGs per TB, corresponding to TB 710), and the third SPS PDSCH communication has CBG feedback (with 2 CBGs per TB, corresponding to TB 715). In such cases, the UE may generate a HARQ-ACK codebook with 6 bits (e.g., 1+3+2=6 bits), and may order the bits according to the ordering described with reference to FIGS. 5 and 6. Additionally or alternatively, for an SPS communication configuration, the UE may determine the number of HARQ- ACK bits per PDSCH based on activation control signaling (e.g., activation DCI, SCI), which may indicate how many CBGs are communicated or otherwise included in the PDSCH. In some examples, the number of CBGs may be changed to another number after receiving a second activation control signal (e.g., a reactivation DCI, SCI) for the same SPS communication configuration.

In a second option (e.g., HARQ-ACK bits 725, option 2), the UE may generate HARQ-ACK information bits based on the maximum number of CBGs for the associated SPS communication configuration (e.g., which may be different from or the same as the actual number of CBGs in a PDSCH). In a third option (e.g., HARQ-ACK bits 730, option 3), the UE may generate HARQ-ACK information bits based on the maximum number of CBGs across all SPS communication configurations or DG PDSCHs in a same downlink bandwidth part or serving cell. In such examples, if an SPS PDSCH communication is configured with TB-based feedback, the UE may repeat the HARQ-ACK bits to form the set of HARQ-ACK info bits.

For both the second option and the third option, if the actual number of CBGs is smaller than the maximum number of CBGs, the UE may pad the actual HARQ-ACK information bits corresponding to the actual number of CBGs using a number of padding bits (e.g., zero padding bits) or NACK bits to make the total size of the codebook equal to the maximum number of CBGs.

In some other cases, the UE may select the first option if the UE reports HARQ-ACK information for a single SPS PDSCH communication, and the UE may select the second option or the third option if the UE reports HARQ-ACK for multiple (e.g., greater than one) SPS PDSCH communications.

Figure 8A:
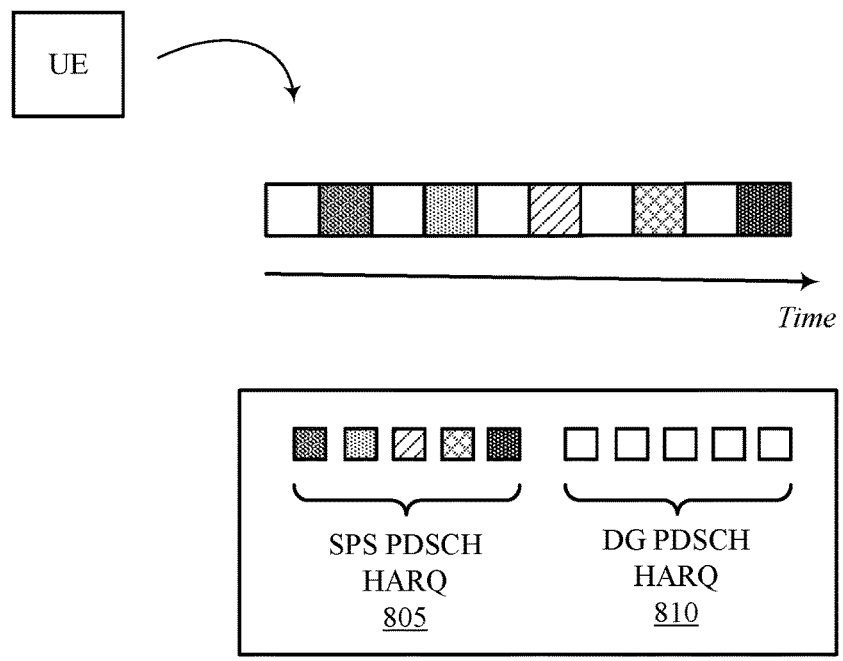
Figure 8B:
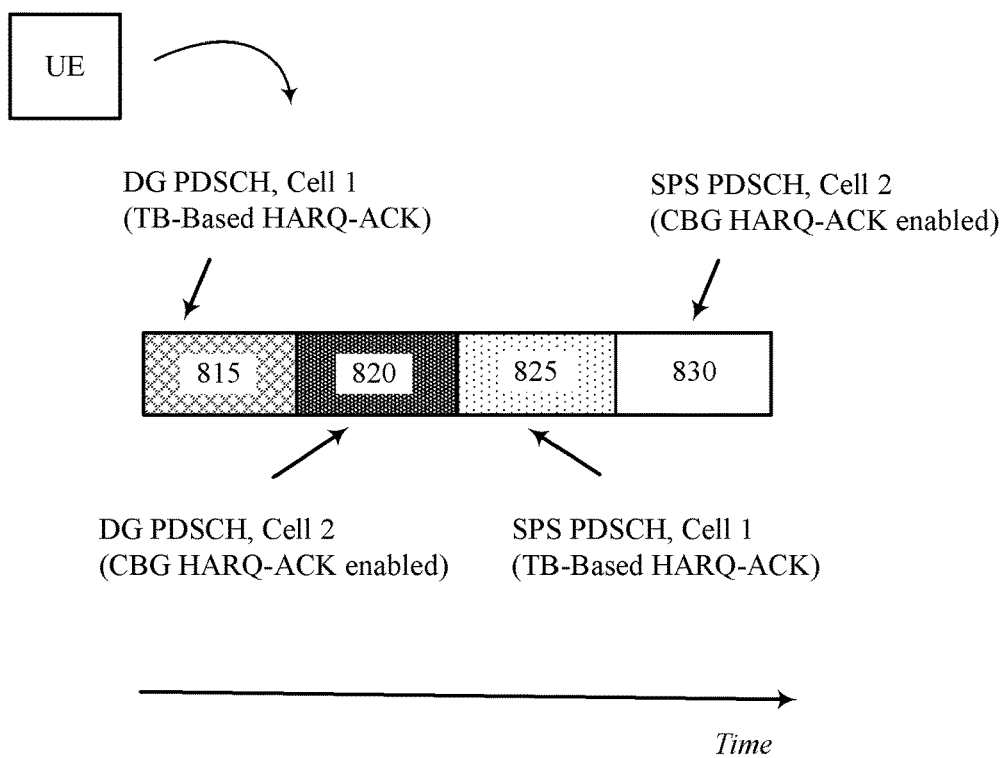

FIGS. 8A & 8B illustrate examples of feedback generation configurations 800-a and 800-b that support CBG-based retransmission and feedback for SPS communications in accordance with one or more aspects of the present disclosure. For example, the feedback generation configurations 800-a and 800-b may be implemented at or by devices (e.g., UEs, network entities, sidelink devices) described herein.

In some implementations, a UE may construct a HARQ-ACK codebook 800-a (e.g., a type 1 HARQ-ACK codebook) for CBG-based HARQ-ACK retransmission, as illustrated in FIG. 8A. For type-1 HARQ-ACK code book generation, if the UE may multiplex HARQ-ACK information corresponding to both SPS PDSCH communications and DG PDSCH communications. In some examples, the UE may generate a number of HARQ-ACK information bits 805 for an SPS PDSCH communication according to the maximum number of CBGs configured for DG PDSCH 810 in the same downlink bandwidth part or serving cell as the SPS PDSCH. In some other examples, the UE may generate a number of HARQ-ACK information bits 805 for an SPS PDSCH communication according to the maximum number of CBGs configured for SPS PDSCH communications (in one or more SPS communication configurations) and DG PDSCH 810 in the same downlink bandwidth part or serving cell as the SPS PDSCH communications. In some examples, the SPS HARQ-ACK bits may be interlaced or interleaved with the DG HARQ-ACK bits (e.g., depending on whether a PDSCH occasion is scheduled according to SPS communications or DG communications).

In some other implementations, a UE may construct a HARQ-ACK codebook 800-b (e.g., a type 2 HARQ-ACK codebook) for CBG-based HARQ-ACK retransmission, as illustrated in FIG. 8B. For type-2 HARQ-ACK codebook generation, the UE may generate a Type-2 HARQ-ACK codebook for DG PDSCHs 815 and 825 and SPS PDSCH communications 820 and 830 separately, and may append the SPS PDSCH HARQ-ACK codebook 815 and 825 to the DG PDSCH HARQ-ACK codebook 820 and 830, where the HARQ-ACK codebook for SPS PDSCH communications are generated according to the configured ordering described with reference to FIGS. 5 through 7.

In cases that the UE is configured with a first number (e.g., X) downlink serving cells with CBG enabled, and a second number (e.g., Y) serving cells with CBG disabled, the UE may separately construct HARQ-ACK codebooks for the first and second sets of serving cells. In some examples, the UE may generate a first HARQ-ACK sub-codebook for the X and Y serving cells by concatenating the dynamic HARQ-ACK codebook 815 and DG HARQ-ACK codebook 820, and may generate a second HARQ-ACK sub-codebook for the X and Y serving cells by concatenating the SPS CBG-based HARQ-ACK codebook 825 and the SPS CBG-based HARQ-ACK codebook 830. In such cases, the final codebook may have four parts, including HARQ-ACK for DG PDSCH 815 in the Y cells with TB-based HARQ-ACK, HARQ-ACK for DG PDSCH communication 820 in the X cells with TB-based HARQ-ACK, HARQ-ACK for SPS PDSCH 825 in the X cells with CBG enabled, and HARQ-ACK for SPS PDSCH communication 830 in the Y cells with CBG-based HARQ-ACK.

In some other examples, the UE may generate a first HARQ-ACK sub-codebook for the Y serving cells by concatenating the dynamic HARQ-ACK codebook 815 and SPS HARQ-ACK codebook 825 (were the SPS HARQ-ACK codebook is TB based), and may generate a second HARQ-ACK sub-codebook for the X serving cells by concatenating the dynamic CBG-based HARQ-ACK codebook 820 and the SPS CBG-based HARQ-ACK codebook 830. In such cases, the final codebook may have four parts, including HARQ-ACK for DG PDSCH 815 in the Y cells with TB-based HARQ-ACK, HARQ-ACK for SPS PDSCH communication 825 in the Y cells with TB-based HARQ-ACK, HARQ-ACK for DG PDSCH 820 in the X cells with CBG enabled, and HARQ-ACK for SPS PDSCH communication 830 in the X cells with CBG-based HARQ-ACK.

Additionally or alternatively, the UE may generate the SPS HARQ-ACK codebook jointly across the first and second sets of cells (e.g., the X and Y cells) using the configured ordering, and then append the SPS HARQ-ACK codebook to the two sub-codebooks associated with DG PDSCH for the Y and X serving cells, respectively. In this case, the HARQ-ACK codebook may have three parts, including HARQ-ACK for DG PDSCH 815 in the Y cells with TB-based HARQ-ACK, HARQ-ACK for DG PDSCH 825 in the X cells with CBG enabled, and HARQ-ACK for SPS PDSCH communications (820 and 830) in the X+Y cells.

Figure 9:
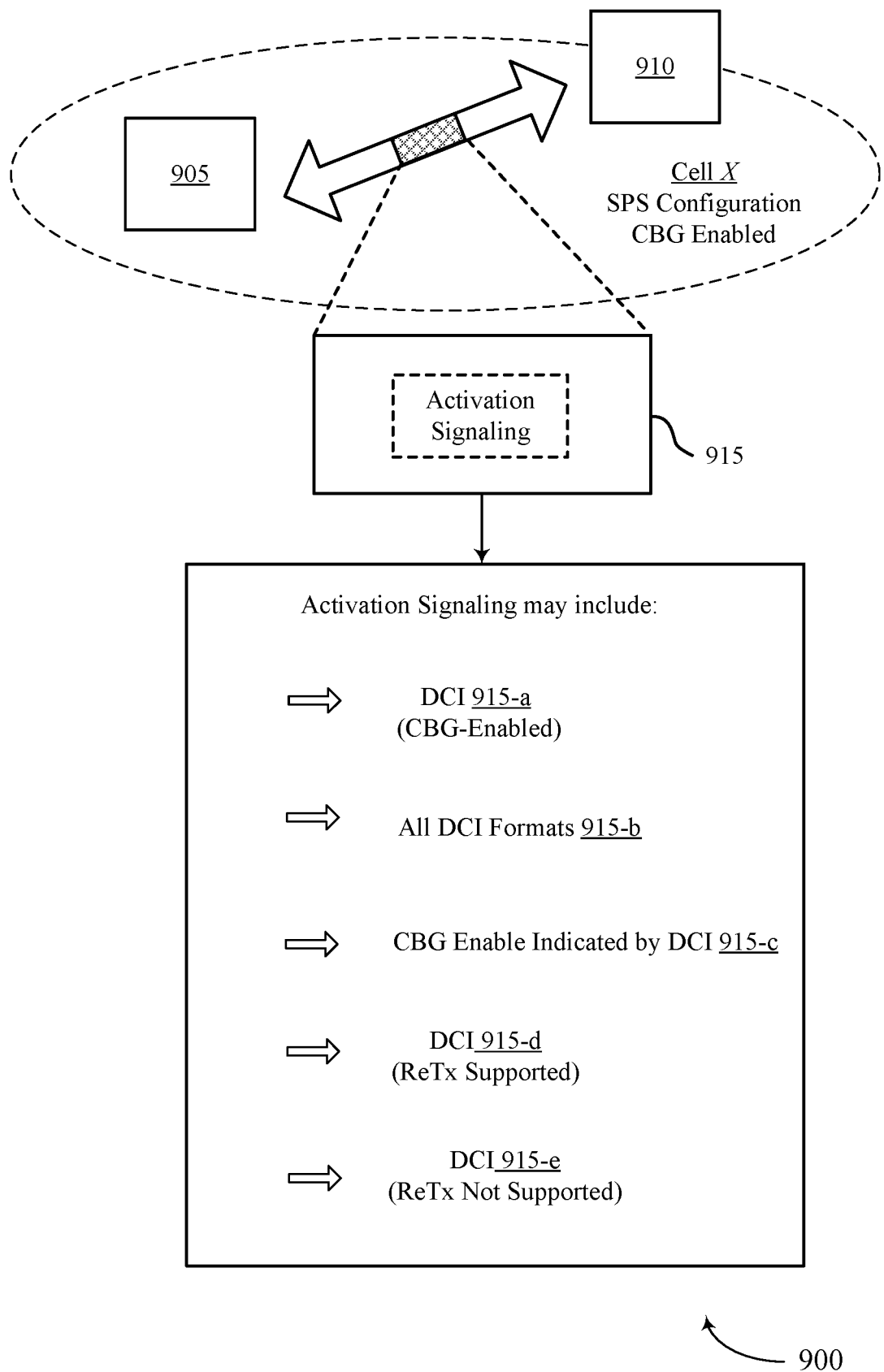
FIG. 9 illustrates an example of a scheduling configuration that supports CBG-based retransmission and feedback for SPS in accordance with one or more aspects of the present disclosure.

FIG. 9 illustrates an example of a scheduling configuration 900 that supports CBG-based retransmission and feedback for SPS communications in accordance with one or more aspects of the present disclosure. For example, the scheduling configuration 900 may be communicated between wireless devices 905 and 910 which may be examples of corresponding devices (e.g., UEs, network entities, sidelink devices) described herein. For example, the first device 905 may be an example of a UE and the second device 910 may be an example of a network entity. In some other cases, both the first device 905 and the second device 910 may be examples of UEs.

Some wireless communications systems may support CBG-based HARQ-ACK feedback and retransmission for various SPS communication configurations. If an SPS communication configuration is configured with CBG-based HARQ-ACK feedback and retransmission, in some examples the SPS communication configuration may be activated by different control signaling such as activation signaling 915 (which may be an example of an activation DCI or sidelink control signaling). Although the following describes techniques involving DCI signaling, the techniques herein may also apply for sidelink control signaling.

In some cases the SPS communication configuration may be activated by a DCI format 915-*a* that supports CBG (e.g., DCI format 1_1). In some other examples, the SPS communication configuration may be activated by all downlink scheduling DCI formats 915-*b*, and the CBG configuration (e.g., for enabling or disabling CBG-based HARQ-ACK feedback) follows the RRC parameter in the SPS communication configuration. In some other examples, the SPS communication configuration may be activated by all downlink scheduling DCI formats 915-*c*. For example, if the SPS communication configuration is activated by a DCI format that supports CBG, then CBG is enabled for this SPS PDSCH communication, otherwise, if the SPS communication configuration is activated by a DCI format that has CBG disabled (e.g., DCI format 1_0, a fallback-DCI, a DCI format 1_2 or a compact-DCI), then CBG is disabled for this SPS communication configuration. In such examples, the CBG enabling or disabling may be indicated by the DCI format (in addition to one or more RRC parameters which enable or disable the CBG configuration for SPS PDSCH communications).

In some other implementations, if an SPS communication configuration is configured with CBG-based retransmission, then the retransmission of an SPS PDSCH communication may be scheduled by a DCI format that supports CBG retransmission (e.g., DCI format 1_1). In such implementations, the network may configure the DCI format to separately indicate the CBG index or CBG indices of a retransmission. In cases that the DCI format has CBG-based feedback disabled (e.g., DCI format 1_0, a fallback-DCI, DCI format 1_2, or a compact-DCI), the retransmission may be TB-based, and the UE may retransmit the entire TB.

In some examples, the DCI 915 may include a number of fields for validating the release and activation of one or more SPS communication configurations. For example, the UE 905 may validate the grant for activating and releasing the SPS communication configuration with CBG-based retransmission and feedback using one or more CBG-related fields in the DCI 915. For example, the DCI 915 may include a CBG transmission information (CBGTI) field, a CBG flushing out information field (CBGFI), or both. When activating or releasing a SPS communication configuration via a DCI format 915, the network may set the CBGTI field, the CBGFI field, or both to a codepoint value (e.g., all zero, or all one, or any other particular codepoint) to indicate SPS communications activation or release. The UE 905 may identify whether these fields are set according to the codepoint value. and if set, the UE 905 may determine that the activation or release DCI 915 is valid. If the fields are not set according to the codepoint value, then the UE 905 may determine that the DCI 915 is invalid, and the UE may discard the information in the DCI 915.

Figure 10:
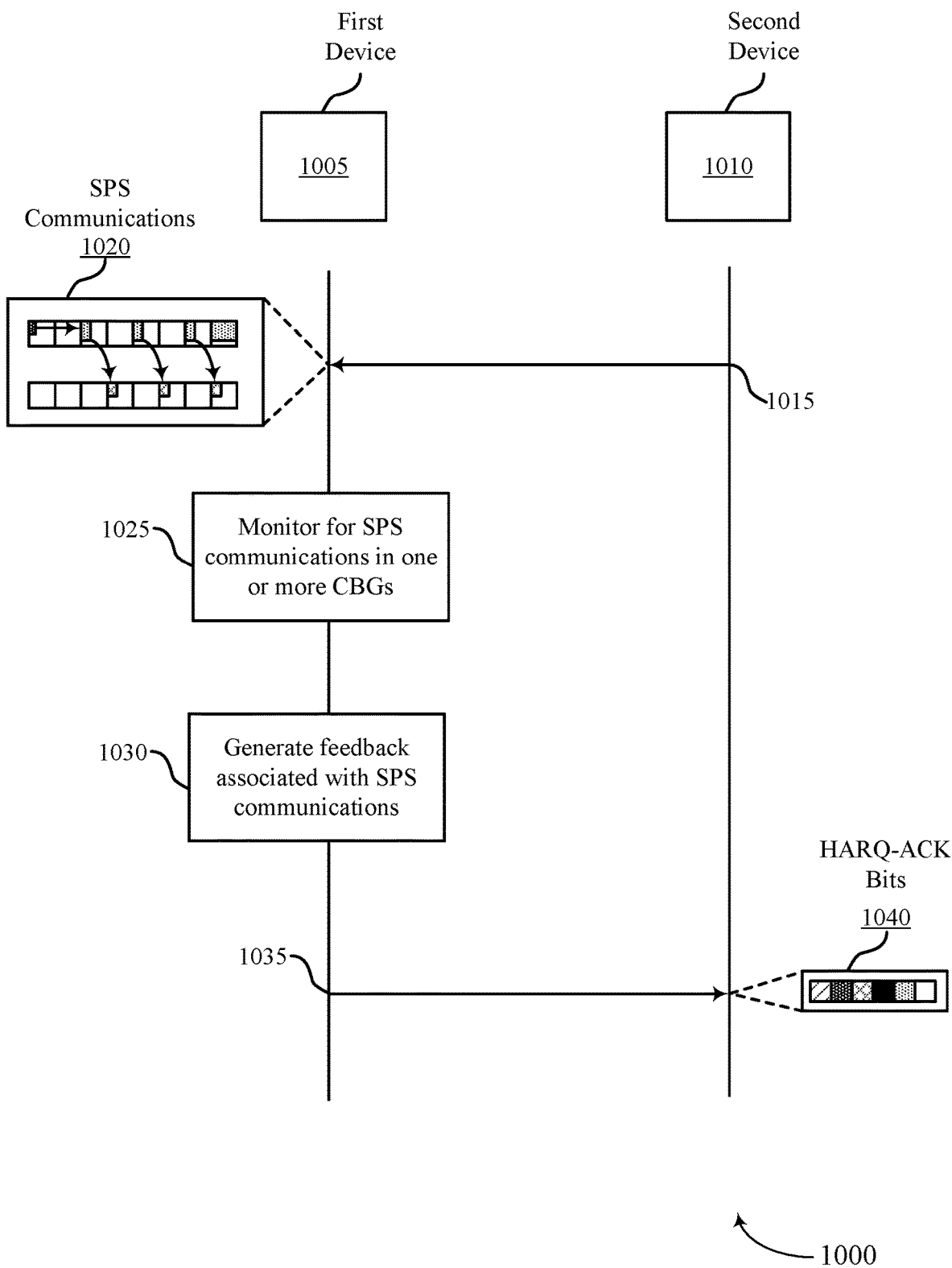
FIG. 10 illustrates an example of a process flow that supports CBG-based retransmission and feedback for SPS in accordance with one or more aspects of the present disclosure.

FIG. 10 illustrates an example of a process flow 1000 that supports CBG-based retransmission and feedback for SPS communications in accordance with one or more aspects of the present disclosure. Process flow 1000 may illustrate communications between a first device 1005 and a second device 1010, which may be examples of devices (e.g., UEs, network entities) described herein. In the following description of the process flow 1000, the operations between the first device 1005 and the second device 1010 may be communicated in a different order than the example order shown, or the operations performed by the first device 1005 and the second device 1010 may be performed in different orders or at different times. Some operations may also be omitted from the process flow 1000, and other operations may be added to the process flow 1000.

In some examples, the first device 1005 may be an example of a UE and the second device 1010 may be an example of a network entity. In some other examples, the first device 1005 and the second device 1010 may be examples of sidelink devices (e.g., sidelink UEs). Communications described herein may be examples of both uplink and downlink communications and sidelink communications.

At 1015, the first device 1005 may obtain information indicative of a configuration 1015 for the first device to provide CBG-based feedback for one or more SPS communications (e.g., downlink SPS communications, sidelink SPS communications) scheduled for the first device 1005. In some examples, the configuration may be a parameter (e.g., an RRC parameter) for activating each SPS communication configuration of the one or more SPS communication configurations (e.g., downlink SPS communication configurations, sidelink SPS communication configurations). In some examples, the first device 1005 the configuration may indicate a threshold number of CBGs (e.g., a maximum number CBGs) per transport block that are configured for communicating CBG-based feedback. In some cases, the threshold number of CBGs may be equal to or different from a number of CBGs configured for communicating CBG-based feedback scheduled by one or more dynamic grants associated with a same serving cell as the one or more SPS communications. In some cases, a bit width of a field in control information scheduling one or more retransmissions corresponding to the CBG-based feedback may be based on the threshold number of CBGs being greater than the number of CBGs configured for communications of CBG-based feedback.

In some examples, the first device 1005 may determine an activation of the configuration to provide CBG-based feedback for the one or more SPS communications based on a format of a DCI message. In some cases, the control information message may have a first scheduling format which indicates that CBG-based feedback is enabled or disabled for one or more SPS communications.

At 1020, the first device 1005 may monitor for the one or more SPS communications in one or more CBGs of a transport block in accordance with one or more SPS communication configurations. In some examples, the different SPS communication configurations may be configured on different serving cells which have CBG-based feedback enabled or disabled for dynamically granted PDSCH.

At 1025, the first device 1005 may generate one or more feedback bits 1040 associated with the one or more SPS communications based on the monitoring. In some examples, the first device 1005 may determine separate configurations for providing CBG-based feedback for respective SPS communication configurations. The first device 1005 may then generate the one or more feedback bits for the respective SPS communication configurations based on the separate configurations for providing CBG-based feedback.

In some examples, the first device 1005 may generate the one or more feedback bits 1040 by determining an ordering for concatenating the one or more feedback bits based on a serving cell index, an SPS communications index, a slot index in which the one or more SPS communications terminate, or any combination thereof. The first device 1005 may then concatenate the one or more feedback bits to generate a HARQ-ACK codebook for the one or more SPS communications in accordance with the ordering. In some examples, the first device 1010 may concatenate the one or more feedback bits to generate the HARQ-ACK codebook for different serving cells (e.g., serving cells which have a first set of cells with CBG-based feedback enabled and a second set of cells with CBG-based feedback disabled). In some examples, the first device 1005 may concatenate the one or more feedback bits jointly across the different serving cells.

In some examples (e.g., at 1030), the first device 1005 may generate the one or more feedback bits 1040 by concatenating the one or more feedback bits 1040 separately for the different serving cells in accordance with a cell index. The first device 1005 may concatenate the one or more feedback bits 1040 by ordering of a first HARQ-ACK sub-codebook associated with the first set of cells after a second HARQ-ACK sub-codebook associated with the second set of cells. In some cases, the first device 1005 may concatenate a first set of the one or more feedback bits 1040 for the one or more SPS communication configurations that have CBG-based feedback enabled then may concatenate a second set of the one or more feedback bits 1040 for the one or more SPS communication configurations that have CBG-based feedback disabled.

In some other examples, the first device 1005 may generate the one or more feedback bits 1040 based on a number of CBGs used for the one or more SPS communications, or based on a maximum number of CBGs associated with a SPS communication configuration of the one or more SPS communication configurations. In some cases, the first device 1005 may on a maximum number of CBGs associated with each of the one or more SPS communication configurations, one or more dynamic grant communications, or both. In some examples, the first device 1005 may generate one or more repetitions of the one or more feedback bits 1040 based on the one or more SPS communication configurations being configured for providing CBG-based feedback.

In some examples, the first device 1005 may generate the one or more feedback bits 1040 based on a maximum number of CBGs associated with each of the one or more SPS communication configurations, one or more dynamic grant communications, or both, in a serving cell. The first device 1005 may then multiplex the one or more feedback bits associated with the one or more SPS communications and the one or more dynamic grant communications.

The first device 1005 may, in some cases, concatenate the one or more feedback bits 1040 to generate a dynamic HARQ-ACK codebook using a combination of a first HARQ-ACK sub-codebook associated with one or more dynamic grant communications and a second HARQ-ACK sub-codebook associated with the one or more SPS communications. In some other cases, the first device 1005 may concatenate the one or more feedback bits to generate the dynamic HARQ-ACK codebook for different serving cells including a first set of cells that have CBG-based feedback enabled for the one or more dynamic grant communications and a second set of cells that have CBG-based feedback disabled for the one or more SPS communications.

At 1035, the first device 1005 may communicate the one or more feedback bits 1040 associated with the one or more SPS communications with a second device 1010 in accordance with the configuration 1010. In some examples, the first device 1005 may provide CBG-based feedback for the one or more SPS communications on different serving cells configured for CBG-based feedback corresponding one or more dynamic grants.

In some cases, the first device 1005 may obtain a DCI message that schedules one or more retransmissions for the one or more SPS communications, and the DCI message may be indicative of whether CBG-based feedback is enabled or disabled for one or more SPS communications. The first device 1005 may then communicate the one or more retransmissions of the one or more SPS communications in the one or more CBGs in accordance with the scheduling of the DCI message. In some examples, the DCI message includes one or more CBG indices indicative of the one or more CBGs that are scheduled for retransmission. In some examples, the first device 1005 may validate an activation or a deactivation of the one or more SPS communication configurations for providing CBG-based feedback based at least in part on one or more fields in the DCI (e.g., based on a CBG transmission information field, a CBG flushing out information field, or both).

Figure 11:
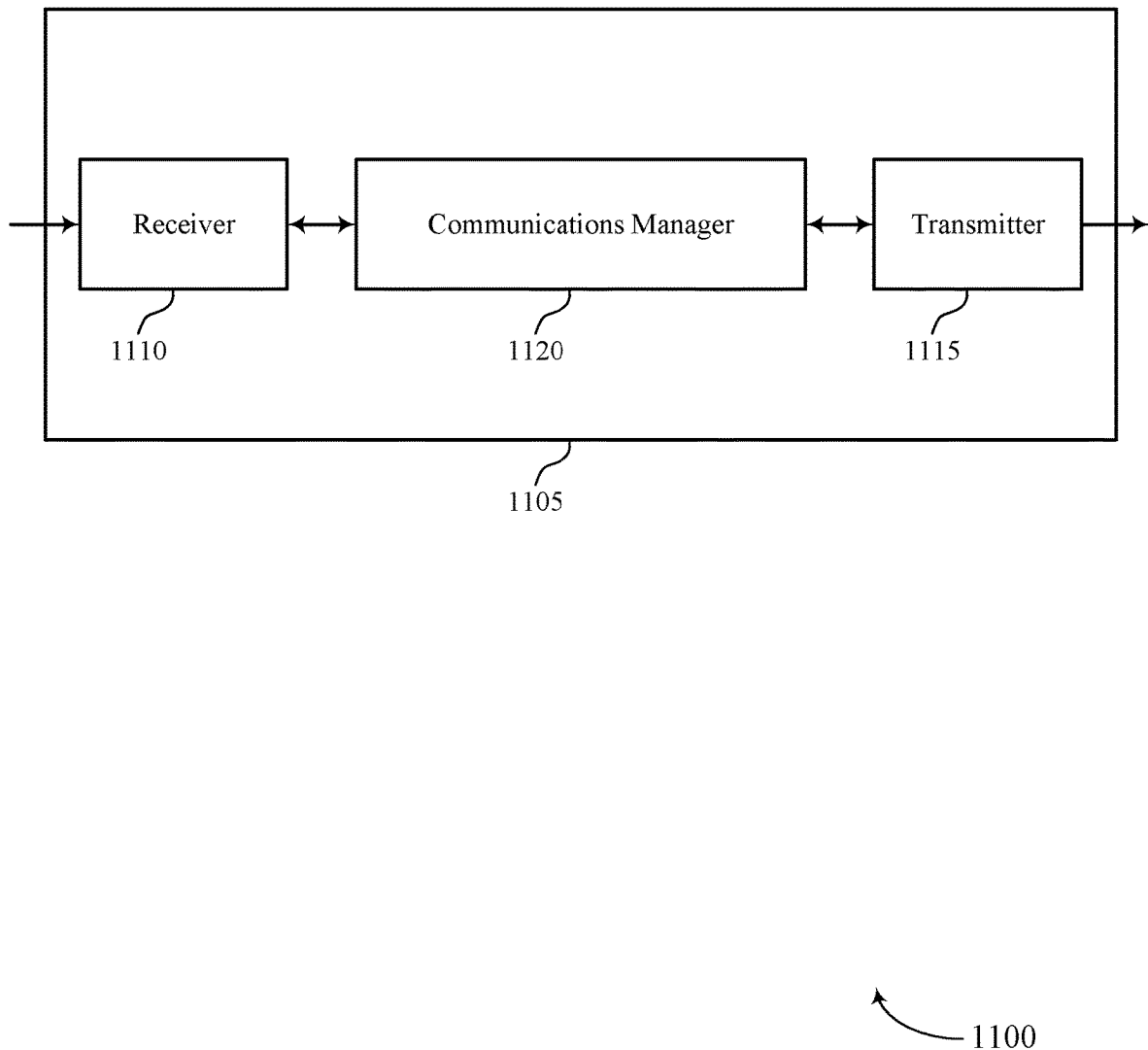
FIGS. 11 and 12 show block diagrams of devices that support CBG-based retransmission and feedback for SPS in accordance with one or more aspects of the present disclosure.

FIG. 11 shows a block diagram 1100 of a device 1105 that supports CBG-based retransmission and feedback for SPS communications in accordance with one or more aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to CBG-based retransmission and feedback for SPS communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to CBG-based retransmission and feedback for SPS communications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of CBG-based retransmission and feedback for SPS communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a first device in accordance with examples as disclosed herein. For example, the communications manager 1120 may be configured as or otherwise support a means for obtaining information indicative of a configuration for the first device to provide CBG-based feedback for one or more SPS communications scheduled for the first device. The communications manager 1120 may be configured as or otherwise support a means for monitoring for the one or more SPS communications in one or more CBGs of a transport block in accordance with one or more SPS communication configurations. The communications manager 1120 may be configured as or otherwise support a means for generating one or more feedback bits associated with the one or more SPS communications based on the monitoring. The communications manager 1120 may be configured as or otherwise support a means for communicating, with a second device, the one or more feedback bits associated with the one or more SPS communications in accordance with the configuration for the first device to provide CBG-based feedback.

Additionally, or alternatively, the communications manager 1120 may support wireless communication at a second device in accordance with examples as disclosed herein. For example, the communications manager 1120 may be configured as or otherwise support a means for communicating, with a first device, information indicative of a configuration for the first device to provide CBG-based feedback for one or more SPS communications scheduled for the first device. The communications manager 1120 may be configured as or otherwise support a means for communicating, with the first device, one or more SPS communications in one or more CBGs of a transport block in accordance with one or more SPS communication configurations. The communications manager 1120 may be configured as or otherwise support a means for obtaining, from the first device, one or more feedback bits associated with the one or more SPS communications in accordance with the configuration for the first device to provide CBG-based feedback.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, and more efficient utilization of communication resources.

Figure 12:
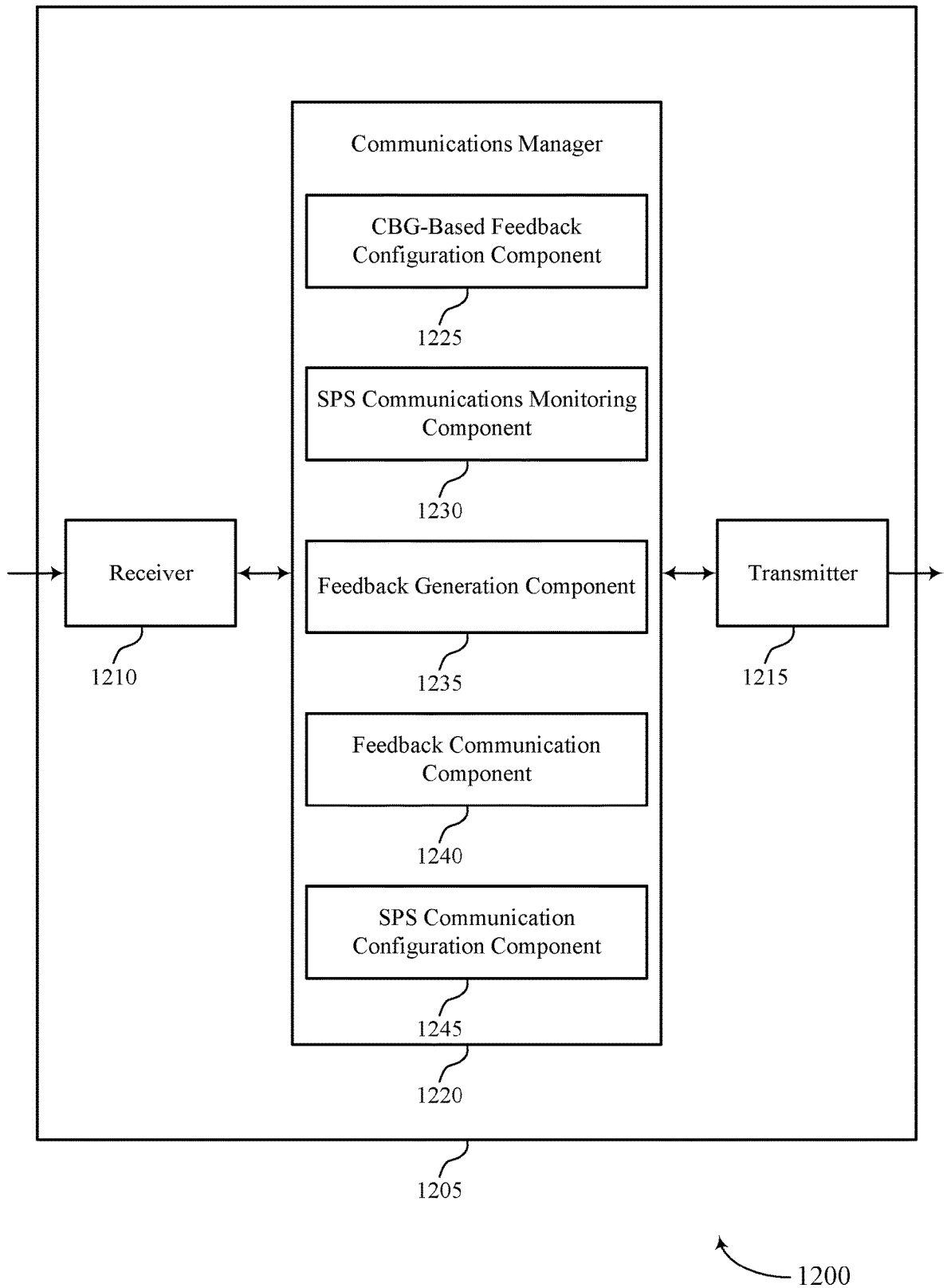

FIG. 12 shows a block diagram 1200 of a device 1205 that supports CBG-based retransmission and feedback for SPS communications in accordance with one or more aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to CBG-based retransmission and feedback for SPS communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to CBG-based retransmission and feedback for SPS communications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of CBG-based retransmission and feedback for SPS communications as described herein. For example, the communications manager 1220 may include a CBG-based feedback configuration component 1225, an SPS communications monitoring component 1230, a feedback generation component 1235, a feedback communication component 1240, an SPS communication configuration communication component 1245, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a first device in accordance with examples as disclosed herein. The CBG-based feedback configuration component 1225 may be configured as or otherwise support a means for obtaining information indicative of a configuration for the first device to provide CBG-based feedback for one or more SPS communications scheduled for the first device. The SPS communications monitoring component 1230 may be configured as or otherwise support a means for monitoring for the one or more SPS communications in one or more CBGs of a transport block in accordance with one or more SPS communication configurations. The feedback generation component 1235 may be configured as or otherwise support a means for generating one or more feedback bits associated with the one or more SPS communications based on the monitoring. The feedback communication component 1240 may be configured as or otherwise support a means for communicating, with a second device, the one or more feedback bits associated with the one or more SPS communications in accordance with the configuration for the first device to provide CBG-based feedback.

Additionally, or alternatively, the communications manager 1220 may support wireless communication at a second device in accordance with examples as disclosed herein. The CBG-based feedback configuration component 1225 may be configured as or otherwise support a means for communicating, with a first device, information indicative of a configuration for the first device to provide CBG-based feedback for one or more communications scheduled for the first device. The SPS communication configuration component 1245 may be configured as or otherwise support a means for communicating, with the first device, one or more SPS communications in one or more CBGs of a transport block in accordance with one or more SPS communication configurations. The feedback communication component 1240 may be configured as or otherwise support a means for obtaining, from the first device, one or more feedback bits associated with the one or more SPS communications in accordance with the configuration for the first device to provide CBG-based feedback.

Figure 13:
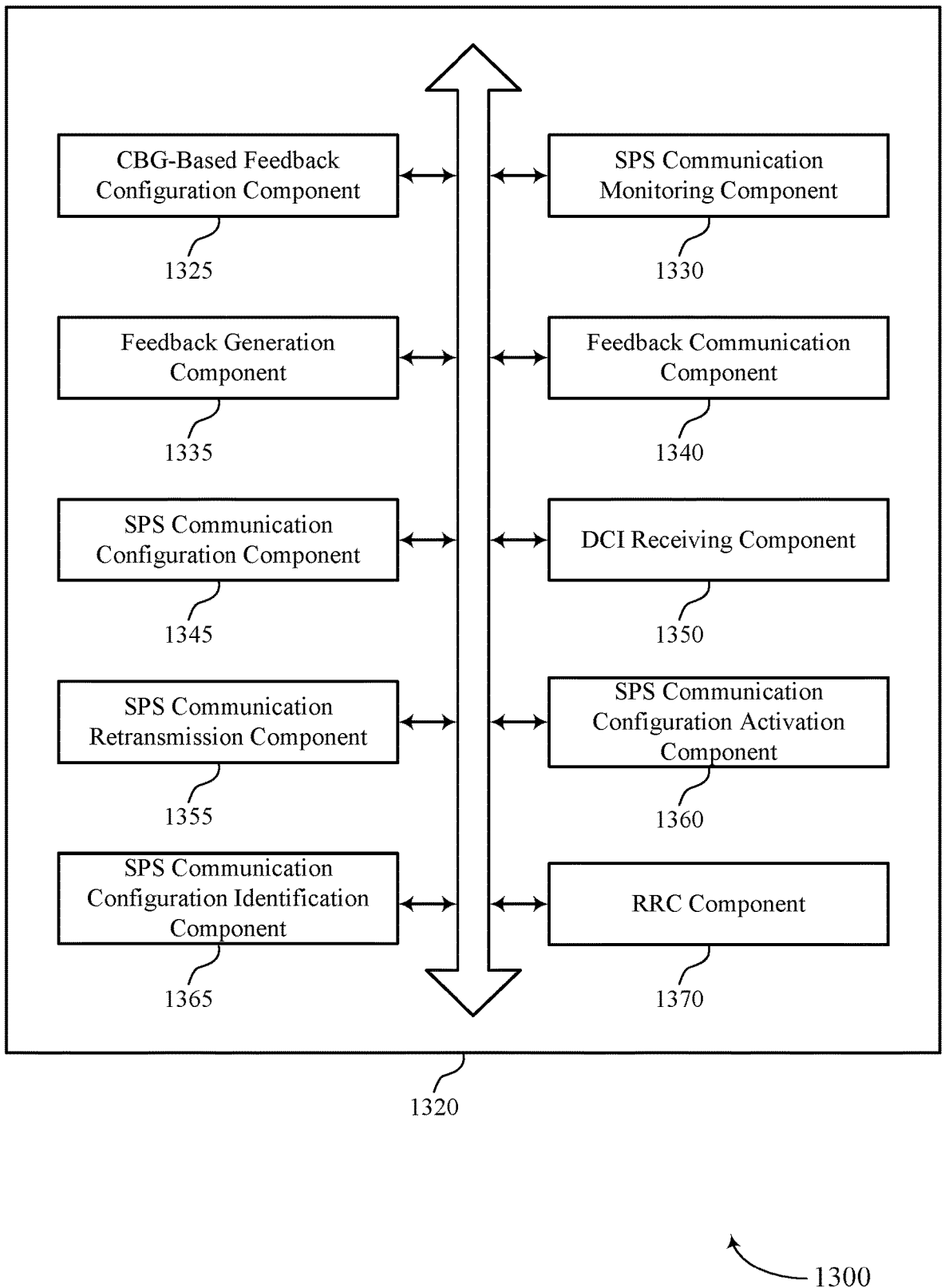
FIG. 13 shows a block diagram of a communications manager that supports CBG-based retransmission and feedback for SPS in accordance with one or more aspects of the present disclosure.

FIG. 13 shows a block diagram 1300 of a communications manager 1320 that supports CBG-based retransmission and feedback for SPS communications in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of CBG-based retransmission and feedback for SPS communications as described herein. For example, the communications manager 1320 may include a CBG-based feedback configuration component 1325, an SPS communications monitoring component 1330, a feedback generation component 1335, a feedback communication component 1340, an SPS communication configuration component 1345, a DCI receiving component 1350, an SPS communications retransmission component 1355, an SPS communication configuration activation component 1360, an SPS communication configuration identification component 1365, an RRC component 1370, or any combination thereof. Each of these components may communicate, directly or indirectly, with one another (e.g., via one or more buses).

The communications manager 1320 may support wireless communication at a first device in accordance with examples as disclosed herein. The CBG-based feedback configuration component 1325 may be configured as or otherwise support a means for obtaining information indicative of a configuration for the first device to provide CBG-based feedback for one or more SPS communications scheduled for the first device. The SPS communications monitoring component 1330 may be configured as or otherwise support a means for monitoring for the one or more SPS communications in one or more CBGs of a transport block in accordance with one or more SPS communication configurations. The feedback generation component 1335 may be configured as or otherwise support a means for generating one or more feedback bits associated with the one or more SPS communications based on the monitoring. The feedback communication component 1340 may be configured as or otherwise support a means for communicating, with a second device, the one or more feedback bits associated with the one or more SPS communications in accordance with the configuration for the first device to provide CBG-based feedback.

In some examples, the feedback generation component 1335 may be configured as or otherwise support a means for determining separate configurations for providing CBG-based feedback for respective SPS communication configurations of the one or more SPS communication configurations; and generating the one or more feedback bits for the respective SPS communication configurations based on the separate configurations for providing CBG-based feedback.

In some examples, the SPS communication configuration identification component 1365 may be configured as or otherwise support a means for identifying, from the one or more SPS communication configurations, different SPS communications configurations on different serving cells configured for CBG-based feedback corresponding to one or more dynamic grants. In some examples, the feedback communication component 1340 may be configured as or otherwise support a means for providing CBG-based feedback for the one or more SPS communications on the different serving cells configured for CBG-based feedback corresponding to the one or more dynamic grants.

In some examples, the RRC component 1370 may be configured as or otherwise support a means for identifying a parameter for activating each SPS communication configuration of the one or more SPS communication configurations. In some examples, the SPS communication configuration activation component 1360 may be configured as or otherwise support a means for activating each of the SPS communication configurations in accordance with the parameter.

In some examples, the feedback generation component 1335 may be configured as or otherwise support a means for determining a threshold number of CBGs of the one or more CBGs per transport block that are configured for communicating CBG-based feedback based on the configuration for the first device to provide CBG-based feedback for the one or more SPS communications.

In some examples, the threshold number of CBGs is equal to a number of CBGs configured for communicating CBG-based feedback scheduled by one or more dynamic grants associated with a same serving cell as the one or more SPS communications.

In some examples, the threshold number of CBGs is different from a number of CBGs configured for communications of CBG-based feedback scheduled by one or more dynamic grants associated with a same serving cell as the one or more SPS communications.

In some examples, a bit width of a field in DCI scheduling one or more retransmissions corresponding to the CBG-based feedback is based on a threshold number of CBGs being greater than the number of CBGs configured for communications of CBG-based feedback scheduled by the one or more dynamic grants.

In some examples, the feedback generation component 1335 may be configured as or otherwise support a means for determining an ordering for concatenating the one or more feedback bits based on a serving cell index, a SPS communications index, a slot index in which the one or more SPS communications terminate, or any combination thereof. In some examples, the feedback generation component 1335 may be configured as or otherwise support a means for concatenating the one or more feedback bits to generate a HARQ codebook for the one or more SPS communications in accordance with the ordering.

In some examples, the feedback generation component 1335 may be configured as or otherwise support a means for concatenating the one or more feedback bits to generate the HARQ codebook for different serving cells, the different serving cells including at least a first set of cells that have CBG-based feedback enabled and a second set of cells that have CBG-based feedback disabled.

In some examples, the feedback generation component 1335 may be configured as or otherwise support a means for concatenating the one or more feedback bits jointly across the different serving cells.

In some examples, the feedback generation component 1335 may be configured as or otherwise support a means for concatenating the one or more feedback bits separately for the different serving cells in accordance with a cell index, the concatenating including ordering of a first HARQ sub-codebook associated with the first set of cells after a second HARQ sub-codebook associated with the second set of cells.

In some examples, the feedback generation component 1335 may be configured as or otherwise support a means for concatenating a first set of the one or more feedback bits for the one or more SPS communication configurations having CBG-based feedback enabled. In some examples, the feedback generation component 1335 may be configured as or otherwise support a means for concatenating a second set of the one or more feedback bits for the one or more SPS communication configurations having CBG-based feedback disabled.

In some examples, the feedback generation component 1335 may be configured as or otherwise support a means for generating the one or more feedback bits based on a number of CBGs used for the one or more SPS communications.

In some examples, the feedback generation component 1335 may be configured as or otherwise support a means for generating the one or more feedback bits based on a maximum number of CBGs associated with a SPS communication configuration of the one or more SPS communication configurations.

In some examples, the feedback generation component 1335 may be configured as or otherwise support a means for generating the one or more feedback bits based on a maximum number of CBGs associated with each of the one or more SPS communication configurations, one or more dynamic grant communications, or both.

In some examples, the feedback generation component 1335 may be configured as or otherwise support a means for generating one or more repetitions of the one or more feedback bits based on the one or more SPS communication configurations being configured for providing CBG-based feedback.

In some examples, the feedback generation component 1335 may be configured as or otherwise support a means for generating the one or more feedback bits based on a maximum number of CBGs associated with each of the one or more SPS communication configurations, one or more dynamic grant communications, or both, in a serving cell. In some examples, the feedback communication component 1340 may be configured as or otherwise support a means for multiplexing the one or more feedback bits associated with the one or more SPS communications and the one or more dynamic grant communications in accordance with the generating.

In some examples, the feedback generation component 1335 may be configured as or otherwise support a means for concatenating the one or more feedback bits to generate a dynamic HARQ codebook, the concatenating including a combination of a first HARQ sub-codebook associated with one or more dynamic grant communications and a second HARQ sub-codebook associated with the one or more SPS communications.

In some examples, the feedback generation component 1335 may be configured as or otherwise support a means for concatenating the one or more feedback bits to generate the dynamic HARQ codebook for different serving cells, the different serving cells including at least a first set of cells that have CBG-based feedback enabled for the one or more dynamic grant communications and a second set of cells that have CBG-based feedback disabled for the one or more SPS communications.

In some examples, the CBG-based feedback configuration component 1325 may be configured as or otherwise support a means for determining an activation of the configuration for the first device to provide CBG-based feedback for the one or more SPS communications based on a format of a DCI message.

In some examples, the DCI message has a first scheduling format which indicates that CBG-based feedback is enabled or disabled for one or more SPS communications.

In some examples, the DCI receiving component 1350 may be configured as or otherwise support a means for obtaining a DCI message scheduling one or more retransmissions for the one or more SPS communications, the DCI message indicative of whether CBG-based feedback is enabled or disabled for one or more SPS communications. In some examples, the SPS retransmission component 1355 may be configured as or otherwise support a means for communicating the one or more retransmissions of the one or more SPS communications in the one or more CBGs in accordance with the scheduling.

In some examples, the DCI message further includes one or more CBG indices indicative of the one or more CBGs that are scheduled for retransmission.

In some examples, the DCI receiving component 1350 may be configured as or otherwise support a means for obtaining a DCI message scheduling the one or more SPS communications. In some examples, the SPS communication configuration activation component 1360 may be configured as or otherwise support a means for validating an activation or a deactivation of the one or more SPS communication configurations for providing CBG-based feedback based on one or more fields in the DCI.

In some examples, the one or more fields include a CBG transmission information field, a CBG flushing out information field, or both.

In some examples, the one or more SPS communication configurations include one or more downlink SPS communication configurations, one or more sidelink SPS communication configurations, or both.

In some examples, the first device is a UE and the second device is a sidelink UE or a network entity.

Additionally, or alternatively, the communications manager 1320 may support wireless communication at a second device in accordance with examples as disclosed herein. In some examples, the CBG-based feedback configuration component 1325 may be configured as or otherwise support a means for communicating, with a first device, information indicative of a configuration for the first device to provide CBG-based feedback for one or more SPS communications scheduled for the first device. The SPS communication configuration communication component 1345 may be configured as or otherwise support a means for communicating, with the first device, one or more SPS communications in one or more CBGs of a transport block in accordance with one or more SPS communication configurations. In some examples, the feedback communication component 1340 may be configured as or otherwise support a means for obtaining, from the first device, one or more feedback bits associated with the one or more SPS communications in accordance with the configuration for the first device to provide CBG-based feedback.

Figure 14:
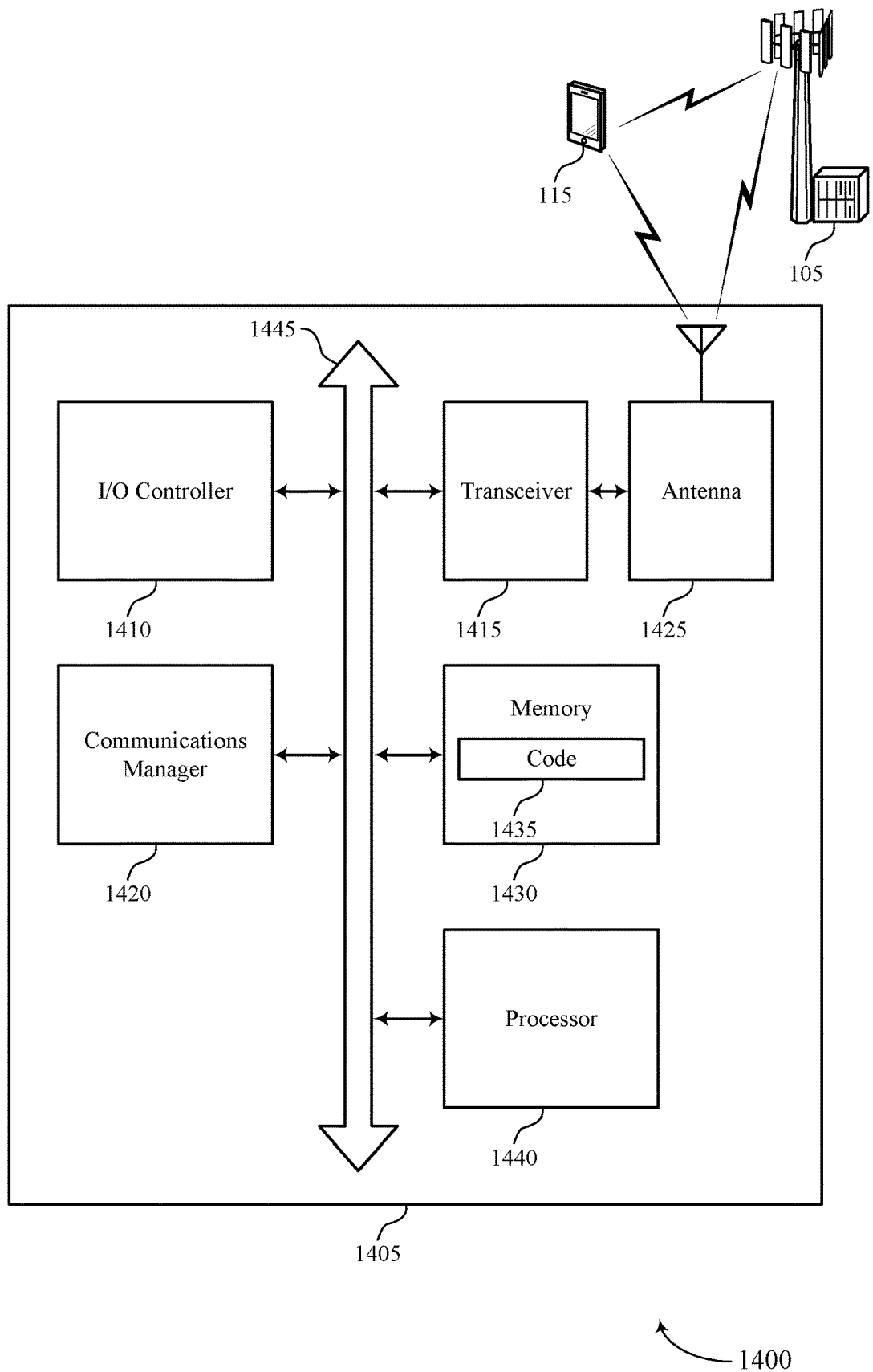
FIG. 14 shows a diagram of a system including a device that supports CBG-based retransmission and feedback for SPS in accordance with one or more aspects of the present disclosure.

FIG. 14 shows a diagram of a system 1400 including a device 1405 that supports CBG-based retransmission and feedback for SPS communications in accordance with one or more aspects of the present disclosure. The device 1405 may be an example of or include the components of a device 1105, a device 1205, or a UE 115 as described herein. The device 1405 may communicate (e.g., wirelessly) with one or more network entities 105, one or more UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting CBG-based retransmission and feedback for SPS communications). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communication at a first device in accordance with examples as disclosed herein. For example, the communications manager 1420 may be configured as or otherwise support a means for obtaining information indicative of a configuration for the first device to provide CBG-based feedback for one or more SPS communications scheduled for the first device. The communications manager 1420 may be configured as or otherwise support a means for monitoring for the one or more SPS communications in one or more CBGs of a transport block in accordance with one or more SPS communication configurations. The communications manager 1420 may be configured as or otherwise support a means for generating one or more feedback bits associated with the one or more SPS communications based on the monitoring. The communications manager 1420 may be configured as or otherwise support a means for communicating, with a second device, the one or more feedback bits associated with the one or more SPS communications in accordance with the configuration for the first device to provide CBG-based feedback.

Additionally, or alternatively, the communications manager 1420 may support wireless communication at a second device in accordance with examples as disclosed herein. For example, the communications manager 1420 may be configured as or otherwise support a means for communicating, with a first device, information indicative of a configuration for the first device to provide CBG-based feedback for one or more SPS communications scheduled for the first device. The communications manager 1420 may be configured as or otherwise support a means for communicating, with the first device, one or more SPS communications in one or more CBGs of a transport block in accordance with one or more SPS communication configurations. The communications manager 1420 may be configured as or otherwise support a means for obtaining, from the first device, one or more feedback bits associated with the one or more SPS communications in accordance with the configuration for the first device to provide CBG-based feedback.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, improved utilization of processing capability, reduced latency, and increased communications reliability for SPS communications.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of CBG-based retransmission and feedback for SPS communications as described herein, or the processor 1440 and the memory 1430 may be otherwise configured to perform or support such operations.

Figure 15:
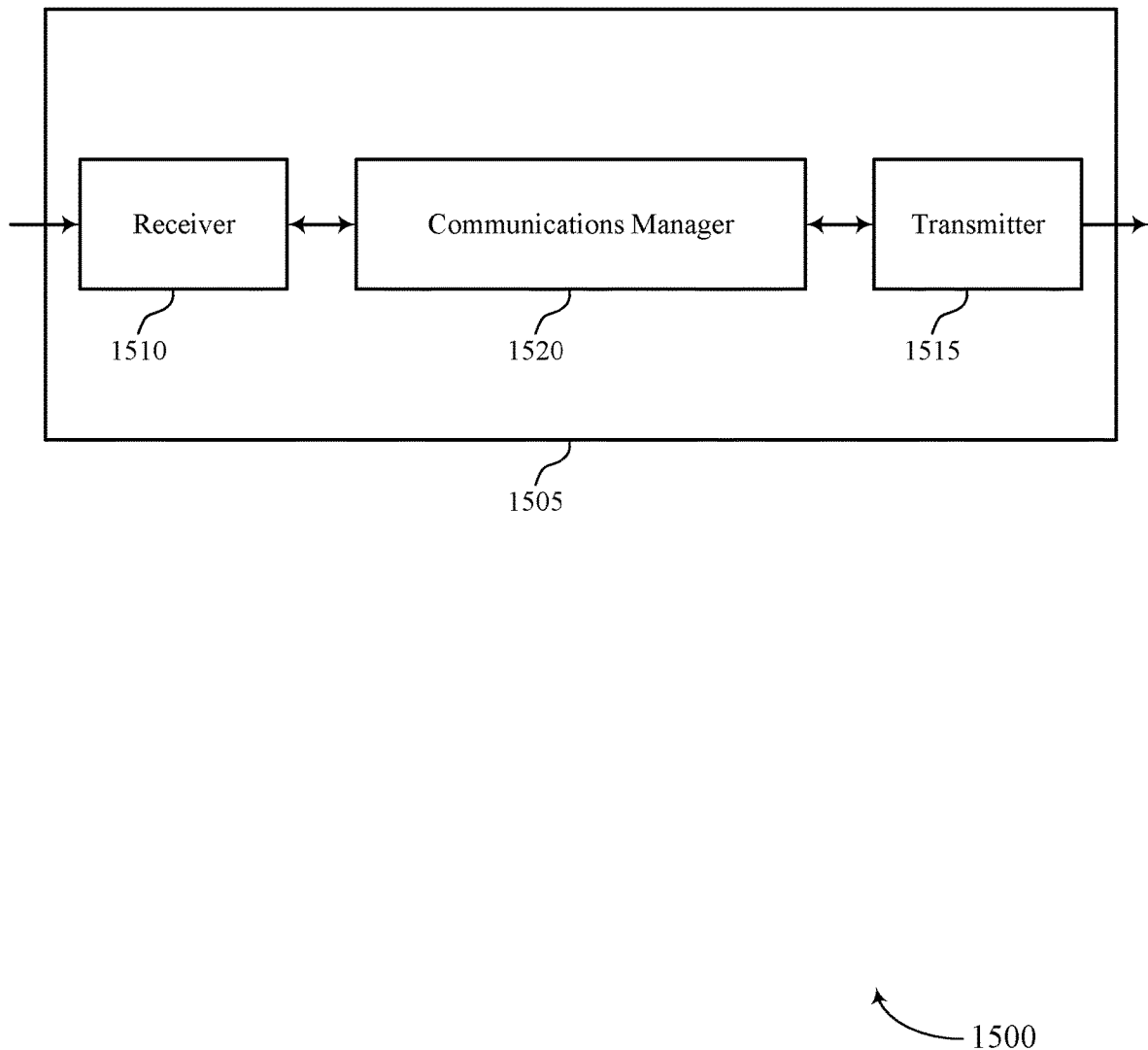
FIGS. 15 and 16 show block diagrams of devices that support CBG-based retransmission and feedback for SPS in accordance with one or more aspects of the present disclosure.

FIG. 15 shows a block diagram 1500 of a device 1505 that supports CBG-based retransmission and feedback for SPS communications in accordance with one or more aspects of the present disclosure. The device 1505 may be an example of aspects of a network entity 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The communications manager 1520, the receiver 1510, the transmitter 1515, or various combinations thereof or various components thereof may be examples of means for performing various aspects of CBG-based retransmission and feedback for SPS communications as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1520 may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communication at a second device in accordance with examples as disclosed herein. For example, the communications manager 1520 may be configured as or otherwise support a means for communicating, with a first device, information indicative of a configuration for the first device to provide CBG-based feedback for one or more SPS communications scheduled for the first device. The communications manager 1520 may be configured as or otherwise support a means for communicating, with the first device, one or more SPS communications in one or more CBGs of a transport block in accordance with one or more SPS communication configurations. The communications manager 1520 may be configured as or otherwise support a means for obtaining, from the first device, one or more feedback bits associated with the one or more SPS communications in accordance with the configuration for the first device to provide CBG-based feedback.

By including or configuring the communications manager 1520 in accordance with examples as described herein, the device 1505 (e.g., a processor controlling or otherwise coupled with the receiver 1510, the transmitter 1515, the communications manager 1520, or a combination thereof) may support techniques for reduced processing, reduced power consumption, and more efficient utilization of communication resources.

Figure 16:
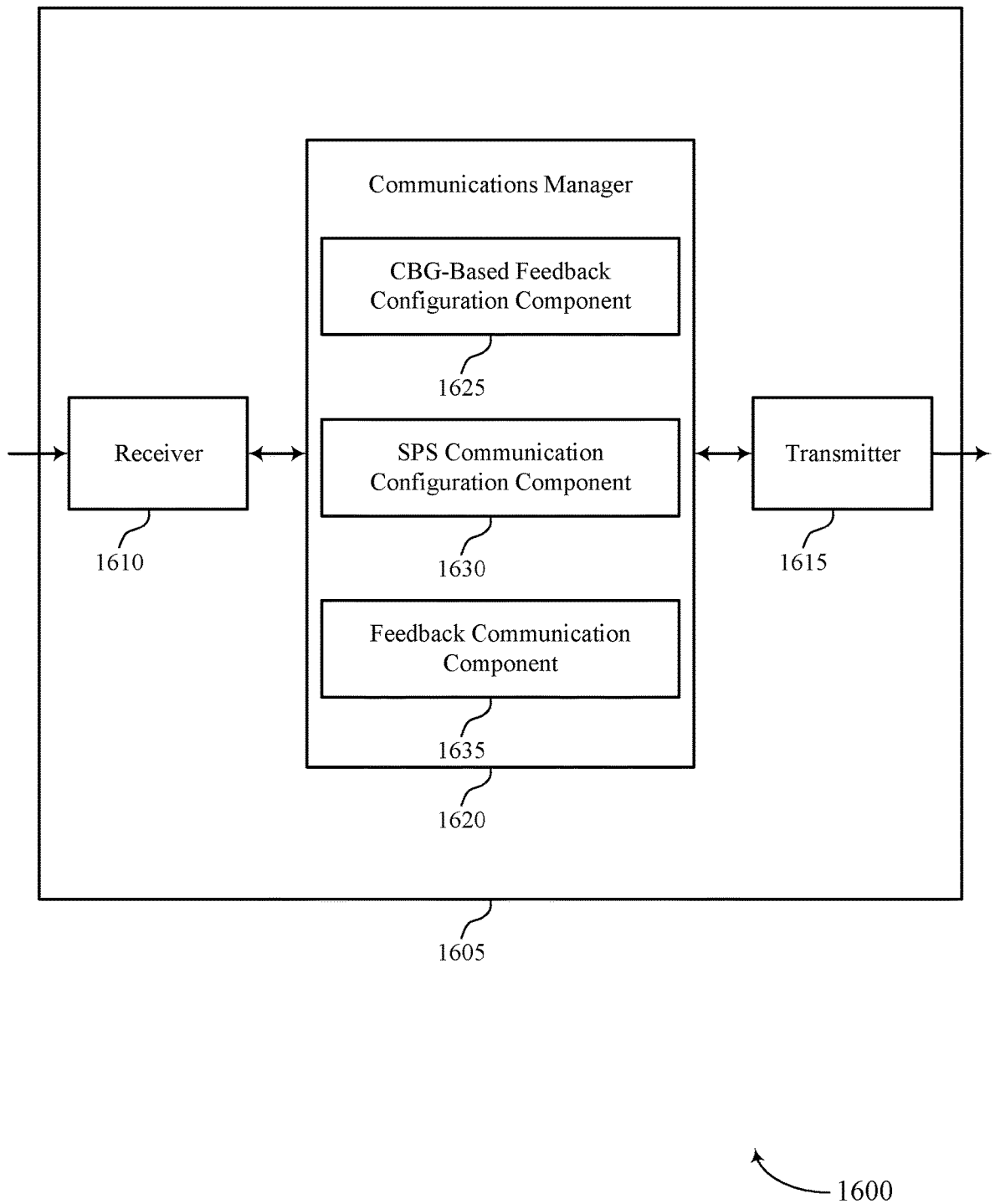

FIG. 16 shows a block diagram 1600 of a device 1605 that supports CBG-based retransmission and feedback for SPS communications in accordance with one or more aspects of the present disclosure. The device 1605 may be an example of aspects of a device 1505 or a network entity 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1605. In some examples, the receiver 1610 may support obtaining information by receiving signals via one or more antennas. Additionally, or alternatively, the receiver 1610 may support obtaining information by receiving signals via one or more wired (e.g., electrical, fiber optic) interfaces, wireless interfaces, or any combination thereof.

The transmitter 1615 may provide a means for outputting (e.g., transmitting, providing, conveying, sending) information generated by other components of the device 1605. For example, the transmitter 1615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1615 may support outputting information by transmitting signals via one or more antennas. Additionally, or alternatively, the transmitter 1615 may support outputting information by transmitting signals via one or more wired (e.g., electrical, fiber optic) interfaces, wireless interfaces, or any combination thereof. In some examples, the transmitter 1615 and the receiver 1610 may be co-located in a transceiver, which may include or be coupled with a modem.

The device 1605, or various components thereof, may be an example of means for performing various aspects of CBG-based retransmission and feedback for SPS communications as described herein. For example, the communications manager 1620 may include a CBG-based feedback configuration component 1625, an SPS communication configuration communication component 1630, a feedback communication component 1635, or any combination thereof. The communications manager 1620 may be an example of aspects of a communications manager 1520 as described herein. In some examples, the communications manager 1620, or various components thereof, may be configured to perform various operations (e.g., receiving, obtaining, monitoring, outputting, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to obtain information, output information, or perform various other operations as described herein.

The communications manager 1620 may support wireless communication at a second device in accordance with examples as disclosed herein. The CBG-based feedback configuration component 1625 may be configured as or otherwise support a means for communicating, with a first device, information indicative of a configuration for the first device to provide CBG-based feedback for one or more SPS communications scheduled for the first device. The SPS communication configuration communication component 1630 may be configured as or otherwise support a means for communicating, with the first device, one or more SPS communications in one or more CBGs of a transport block in accordance with one or more SPS communication configurations. The feedback communication component 1635 may be configured as or otherwise support a means for obtaining, from the first device, one or more feedback bits associated with the one or more SPS communications in accordance with the configuration for the first device to provide CBG-based feedback.

Figure 17:
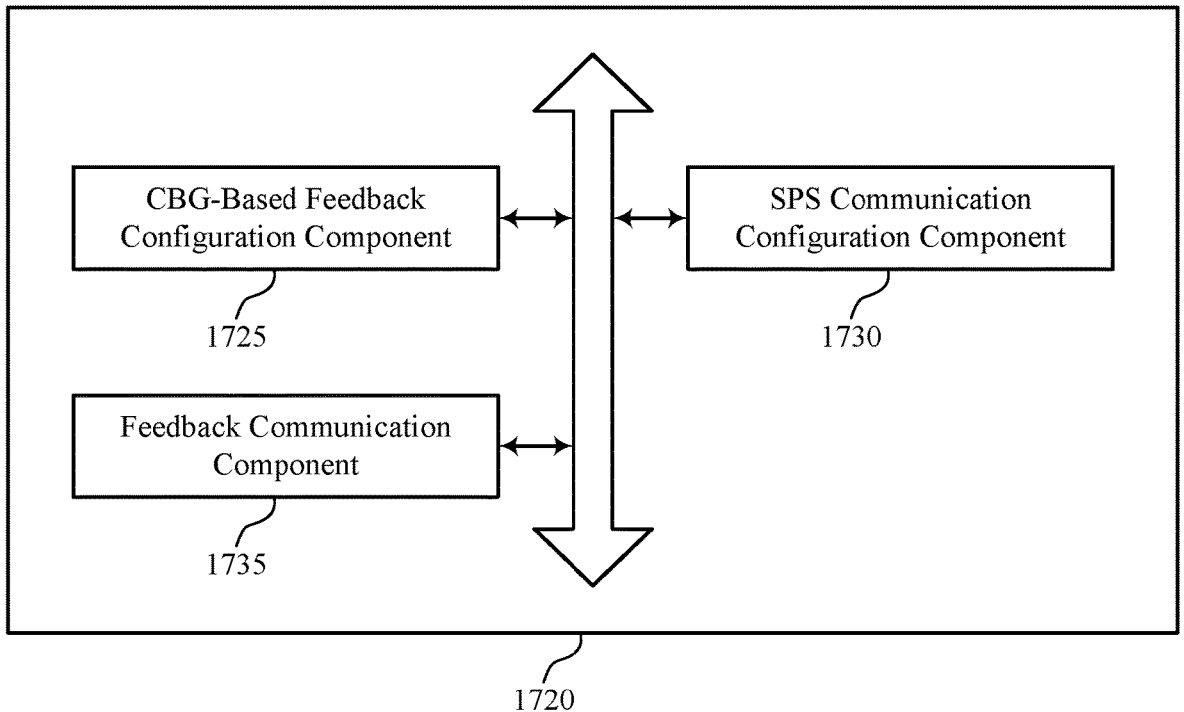
FIG. 17 shows a block diagram of a communications manager that supports CBG-based retransmission and feedback for SPS in accordance with one or more aspects of the present disclosure.

FIG. 17 shows a block diagram 1700 of a communications manager 1720 that supports CBG-based retransmission and feedback for SPS communications in accordance with one or more aspects of the present disclosure. The communications manager 1720 may be an example of aspects of a communications manager 1520, a communications manager 1620, or both, as described herein. The communications manager 1720, or various components thereof, may be an example of means for performing various aspects of CBG-based retransmission and feedback for SPS communications as described herein. For example, the communications manager 1720 may include a CBG-based feedback configuration component 1725, an SPS communication configuration communication component 1730, a feedback communication component 1735, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1720 may support wireless communication at a second device in accordance with examples as disclosed herein. The CBG-based feedback configuration component 1725 may be configured as or otherwise support a means for communicating, with a first device, information indicative of a configuration for the first device to provide CBG-based feedback for one or more SPS communications scheduled for the first device. The SPS communication configuration communication component 1730 may be configured as or otherwise support a means for communicating, with the first device, one or more SPS communications in one or more CBGs of a transport block in accordance with one or more SPS communication configurations. The feedback communication component 1735 may be configured as or otherwise support a means for obtaining, from the first device, one or more feedback bits associated with the one or more SPS communications in accordance with the configuration for the first device to provide CBG-based feedback.

Figure 18:
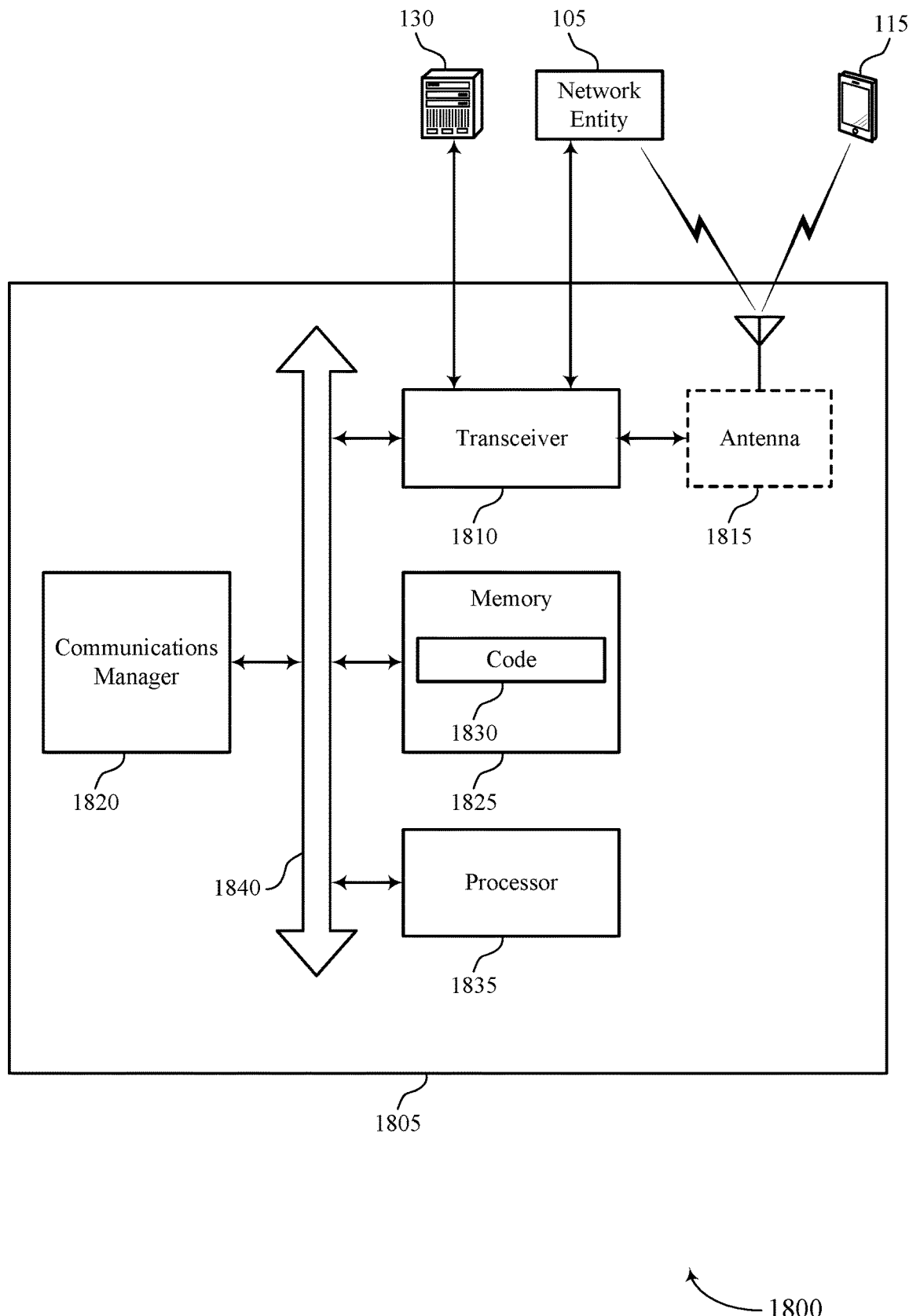
FIG. 18 shows a diagram of a system including a device that supports CBG-based retransmission and feedback for SPS in accordance with one or more aspects of the present disclosure.

FIG. 18 shows a diagram of a system 1800 including a device 1805 that supports CBG-based retransmission and feedback for SPS communications in accordance with one or more aspects of the present disclosure. The device 1805 may be an example of or include the components of a device 1505, a device 1605, or a network entity 105 as described herein. The device 1805 may communicate with one or more network entities 105, one or more UEs 115, or any combination thereof, which may include communications over one or more wired interfaces, over one or more wireless interfaces, or any combination thereof. The device 1805 may include components that support outputting and obtaining communications, such as a communications manager 1820, a transceiver 1810, an antenna 1815, a memory 1825, code 1830, and a processor 1835. These components may be in electronic communication or otherwise coupled (e.g., operatively, communicatively, functionally, electronically, electrically) via one or more buses (e.g., a bus 1840).

The transceiver 1810 may support bi-directional communications via wired links, wireless links, or both as described herein. In some examples, the transceiver 1810 may include a wired transceiver and may communicate bi-directionally with another wired transceiver. Additionally, or alternatively, in some examples, the transceiver 1810 may include a wireless transceiver and may communicate bi-directionally with another wireless transceiver. In some examples, the device 1805 may include one or more antennas 1815, which may be capable of transmitting or receiving wireless transmissions (e.g., concurrently). The transceiver 1810 may also include a modem to modulate signals, to provide the modulated signals for transmission (e.g., by one or more antennas 1815, by a wired transmitter), to receive modulated signals (e.g., from one or more antennas 1815, from a wired receiver), and to demodulate signals. The transceiver 1810, or the transceiver 1810 and one or more antennas 1815 or wired interfaces, where applicable, may be an example of a transmitter 1515, a transmitter 1615, a receiver 1510, a receiver 1610, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1825 may include RAM and ROM. The memory 1825 may store computer-readable, computer-executable code 1830 including instructions that, when executed by the processor 1835, cause the device 1805 to perform various functions described herein. The code 1830 may be stored in a non-transitory computer-readable medium such as system memory or another type of memory. In some cases, the code 1830 may not be directly executable by the processor 1835 but may cause a computer (e.g., when compiled and executed) to perform functions described herein. In some cases, the memory 1825 may contain, among other things, a BIOS which may control basic hardware or software operation such as the interaction with peripheral components or devices.

The processor 1835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1835 may be configured to operate a memory array using a memory controller. In some other cases, a memory controller may be integrated into the processor 1835. The processor 1835 may be configured to execute computer-readable instructions stored in a memory (e.g., the memory 1825) to cause the device 1805 to perform various functions (e.g., functions or tasks supporting CBG-based retransmission and feedback for SPS communications). For example, the device 1805 or a component of the device 1805 may include a processor 1835 and memory 1825 coupled with the processor 1835, the processor 1835 and memory 1825 configured to perform various functions described herein. The processor 1835 may be an example of a cloud-computing platform (e.g., one or more physical nodes and supporting software such as operating systems, virtual machines, or container instances) that may host the functions (e.g., by executing code 1830) to perform the functions of the device 1805.

In some examples, a bus 1840 may support communications of (e.g., within) a protocol layer of a protocol stack. In some examples, a bus 1840 may support communications associated with a logical channel of a protocol stack (e.g., between protocol layers of a protocol stack), which may include communications performed within a component of the device 1805, or between different components of the device 1805 that may be co-located or located in different locations (e.g., where the device 1805 may refer to a system in which one or more of the communications manager 1820, the transceiver 1810, the memory 1825, the code 1830, and the processor 1835 may be located in one of the different components or divided between different components).

In some examples, the communications manager 1820 may manage aspects of communications with a core network 130 (e.g., via one or more wired or wireless backhaul links). For example, the communications manager 1820 may manage the transfer of data communications for client devices, such as one or more UEs 115. In some examples, the communications manager 1820 may manage communications with other network entities 105, and may include a controller or scheduler for controlling communications with UEs 115 in cooperation with other network entities 105. In some examples, the communications manager 1820 may support an X2 interface within an LTE/LTE-A wireless communications network technology to provide communication between network entities 105.

The communications manager 1820 may support wireless communication at a second device in accordance with examples as disclosed herein. For example, the communications manager 1820 may be configured as or otherwise support a means for communicating, with a first device, information indicative of a configuration for the first device to provide CBG-based feedback for one or more SPS communications scheduled for the first device. The communications manager 1820 may be configured as or otherwise support a means for communicating, with the first device, one or more SPS communications in one or more CBGs of a transport block in accordance with one or more SPS communication configurations. The communications manager 1820 may be configured as or otherwise support a means for obtaining, from the first device, one or more feedback bits associated with the one or more SPS communications in accordance with the configuration for the first device to provide CBG-based feedback.

By including or configuring the communications manager 1820 in accordance with examples as described herein, the device 1805 may support techniques for improved communication reliability, reduced latency, improved user experience related to reduced processing, reduced power consumption, more efficient utilization of communication resources, improved coordination between devices, longer battery life, improved utilization of processing capability, reduced latency, and increased communications reliability for SPS communications.

In some examples, the communications manager 1820 may be configured to perform various operations (e.g., receiving, obtaining, monitoring, outputting, transmitting) using or otherwise in cooperation with the transceiver 1810, the one or more antennas 1815 (e.g., where applicable), or any combination thereof. Although the communications manager 1820 is illustrated as a separate component, in some examples, one or more functions described with reference to the communications manager 1820 may be supported by or performed by the processor 1835, the memory 1825, the code 1830, the transceiver 1810, or any combination thereof. For example, the code 1830 may include instructions executable by the processor 1835 to cause the device 1805 to perform various aspects of CBG-based retransmission and feedback for SPS communications as described herein, or the processor 1835 and the memory 1825 may be otherwise configured to perform or support such operations.

Figure 19:
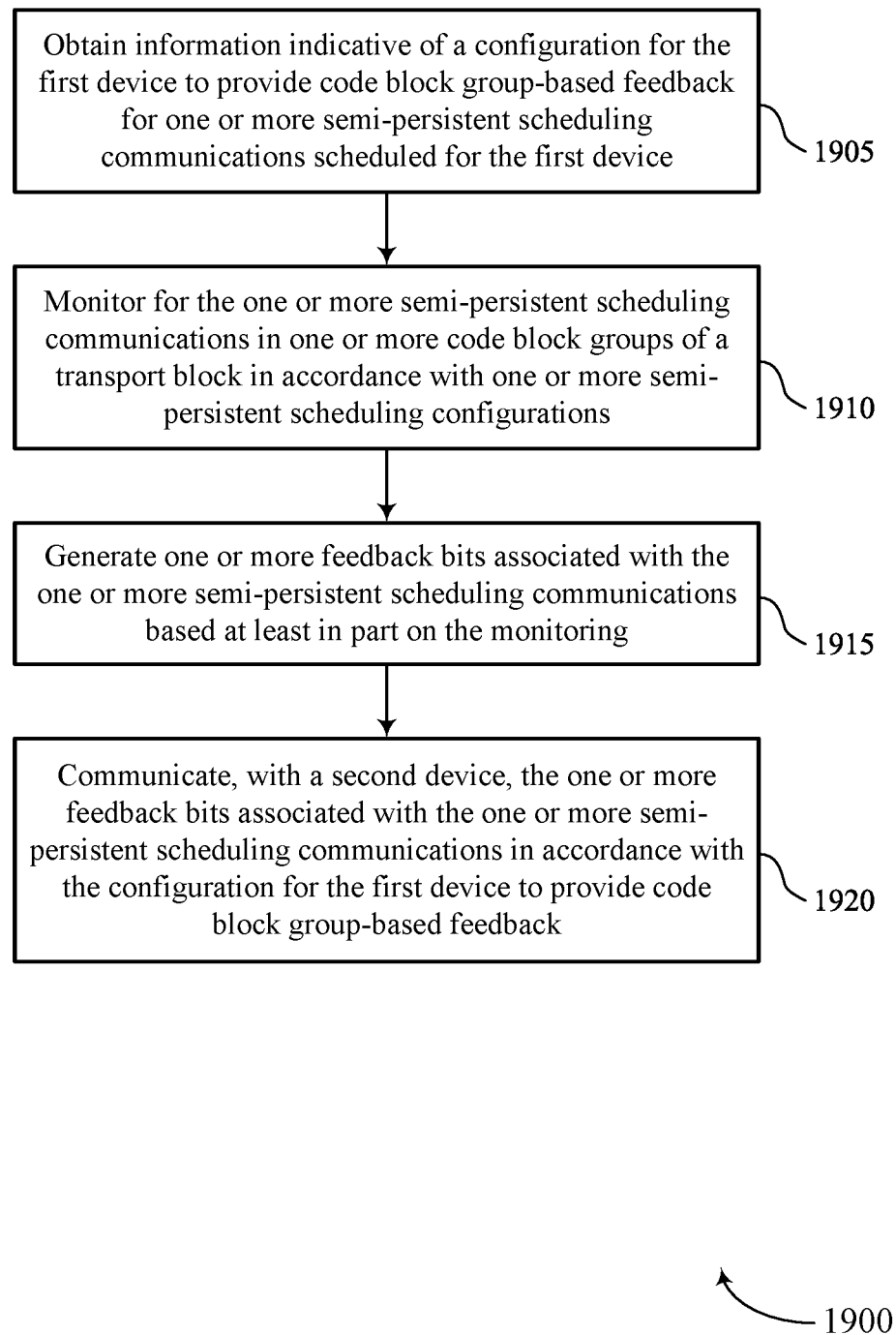
FIGS. 19 through 25 show flowcharts illustrating methods that support CBG-based retransmission and feedback for SPS in accordance with one or more aspects of the present disclosure.

FIG. 19 shows a flowchart illustrating a method 1900 that supports CBG-based retransmission and feedback for SPS communications in accordance with one or more aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1905, the method may include obtaining information indicative of a configuration for the first device to provide CBG-based feedback for one or more SPS communications scheduled for the first device. The operations of 1905 may be performed in accordance with examples as disclosed herein. In some examples, aspects of the operations of 1905 may be performed by a CBG-based feedback configuration component 1325 as described with reference to FIG. 13.

At 1910, the method may include monitoring for the one or more SPS communications in one or more CBGs of a transport block in accordance with one or more SPS communication configurations. The operations of 1910 may be performed in accordance with examples as disclosed herein. In some examples, aspects of the operations of 1910 may be performed by an SPS communications monitoring component 1330 as described with reference to FIG. 13.

At 1915, the method may include generating one or more feedback bits associated with the one or more SPS communications based on the monitoring. The operations of 1915 may be performed in accordance with examples as disclosed herein. In some examples, aspects of the operations of 1915 may be performed by a feedback generation component 1335 as described with reference to FIG. 13.

At 1920, the method may include communicating, with a second device, the one or more feedback bits associated with the one or more SPS communications in accordance with the configuration for the first device to provide CBG-based feedback. The operations of 1920 may be performed in accordance with examples as disclosed herein. In some examples, aspects of the operations of 1920 may be performed by a feedback communication component 1340 as described with reference to FIG. 13.

Figure 20:
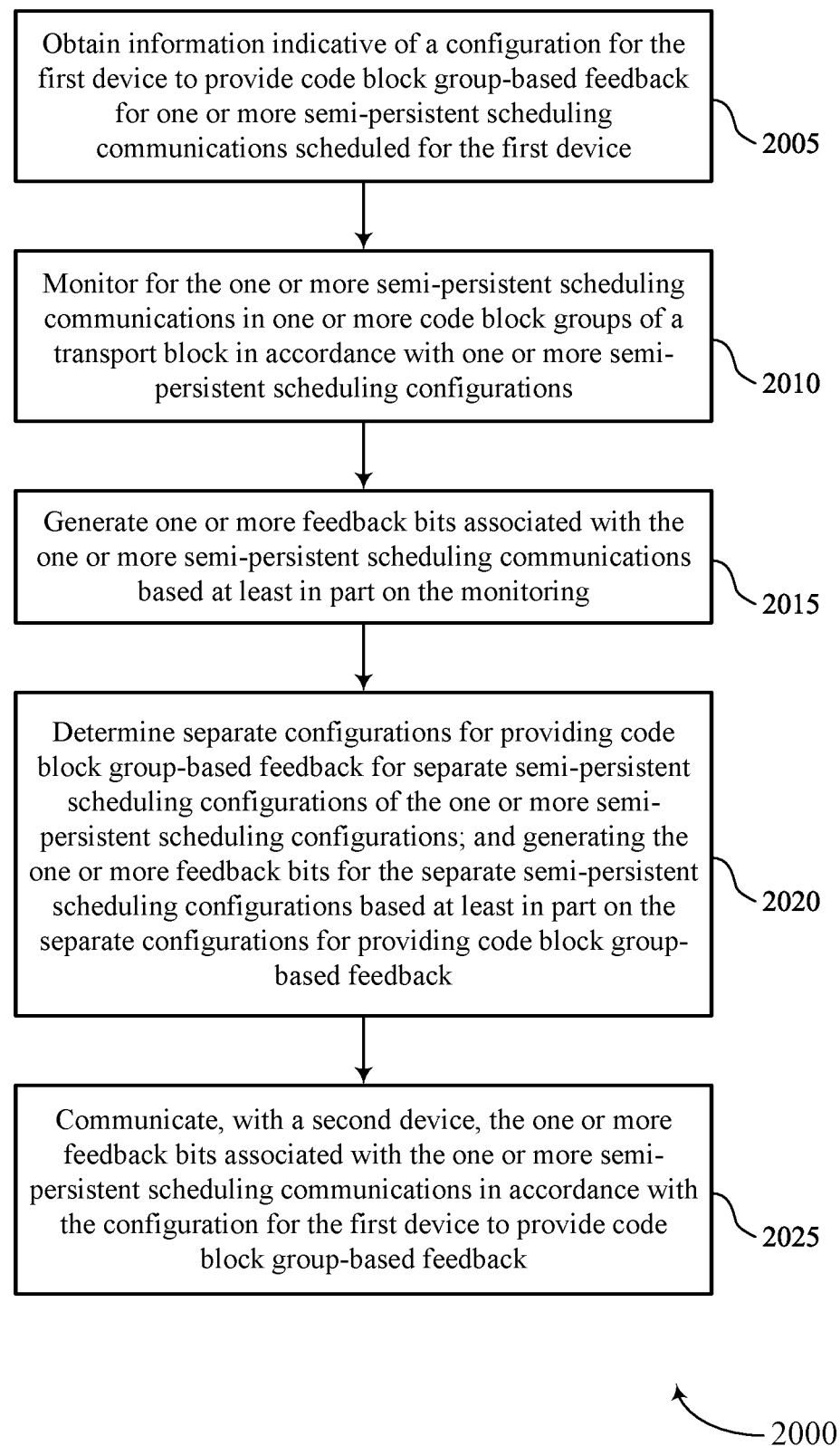

FIG. 20 shows a flowchart illustrating a method 2000 that supports CBG-based retransmission and feedback for SPS communications in accordance with one or more aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2005, the method may include obtaining information indicative of a configuration for the first device to provide CBG-based feedback for one or more SPS communications scheduled for the first device. The operations of 2005 may be performed in accordance with examples as disclosed herein. In some examples, aspects of the operations of 2005 may be performed by a CBG-based feedback configuration component 1325 as described with reference to FIG. 13.

At 2010, the method may include monitoring for the one or more SPS communications in one or more CBGs of a transport block in accordance with one or more SPS communication configurations. The operations of 2010 may be performed in accordance with examples as disclosed herein. In some examples, aspects of the operations of 2010 may be performed by an SPS communications monitoring component 1330 as described with reference to FIG. 13.

At 2015, the method may include generating one or more feedback bits associated with the one or more SPS communications based on the monitoring. The operations of 2015 may be performed in accordance with examples as disclosed herein. In some examples, aspects of the operations of 2015 may be performed by a feedback generation component 1335 as described with reference to FIG. 13.

At 2020, the method may include determining separate configurations for providing CBG-based feedback for respective SPS communication configurations of the one or more SPS communication configurations; and generating the one or more feedback bits for the respective SPS communication configurations based on the separate configurations for providing CBG-based feedback. The operations of 2020 may be performed in accordance with examples as disclosed herein. In some examples, aspects of the operations of 2020 may be performed by a feedback generation component 1335 as described with reference to FIG. 13.

At 2025, the method may include communicating, with a second device, the one or more feedback bits associated with the one or more SPS communications in accordance with the configuration for the first device to provide CBG-based feedback. The operations of 2025 may be performed in accordance with examples as disclosed herein. In some examples, aspects of the operations of 2025 may be performed by a feedback communication component 1340 as described with reference to FIG. 13.

Figure 21:
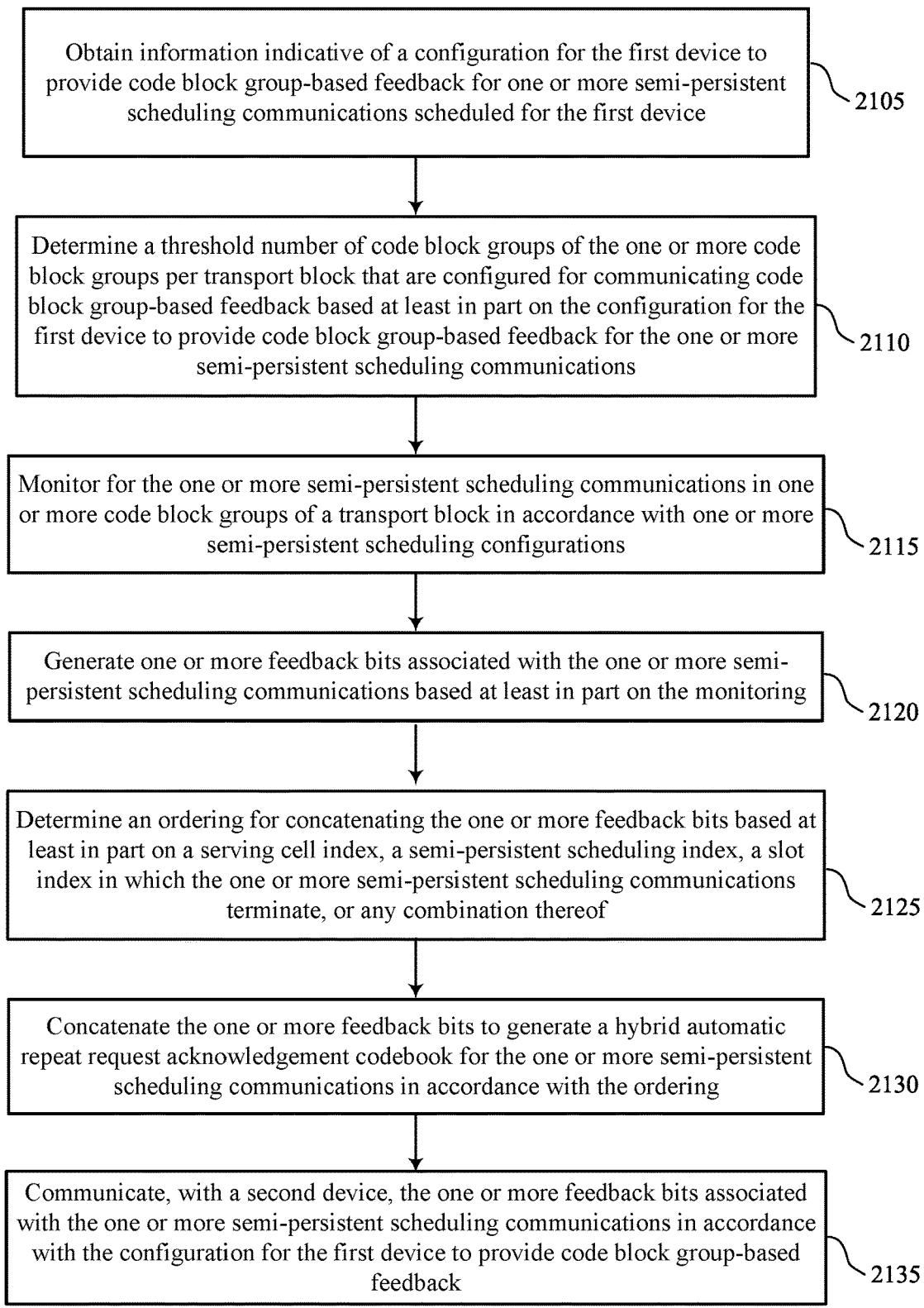

FIG. 21 shows a flowchart illustrating a method 2100 that supports CBG-based retransmission and feedback for SPS communications in accordance with one or more aspects of the present disclosure. The operations of the method 2100 may be implemented by a UE or its components as described herein. For example, the operations of the method 2100 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2105, the method may include obtaining information indicative of a configuration for the first device to provide CBG-based feedback for one or more SPS communications scheduled for the first device. The operations of 2105 may be performed in accordance with examples as disclosed herein. In some examples, aspects of the operations of 2105 may be performed by a CBG-based feedback configuration component 1325 as described with reference to FIG. 13.

At 2110, the method may include determining a threshold number of CBGs of the one or more CBGs per transport block that are configured for communicating CBG-based feedback based on the configuration for the first device to provide CBG-based feedback for the one or more SPS communications. The operations of 2110 may be performed in accordance with examples as disclosed herein. In some examples, aspects of the operations of 2110 may be performed by a feedback generation component 1335 as described with reference to FIG. 13.

At 2115, the method may include monitoring for the one or more SPS communications in one or more CBGs of a transport block in accordance with one or more SPS communication configurations. The operations of 2115 may be performed in accordance with examples as disclosed herein. In some examples, aspects of the operations of 2115 may be performed by an SPS communications monitoring component 1330 as described with reference to FIG. 13.

At 2120, the method may include generating one or more feedback bits associated with the one or more SPS communications based on the monitoring. The operations of 2120 may be performed in accordance with examples as disclosed herein. In some examples, aspects of the operations of 2120 may be performed by a feedback generation component 1335 as described with reference to FIG. 13.

At 2125, the method may include determining an ordering for concatenating the one or more feedback bits based on a serving cell index, a SPS communications index, a slot index in which the one or more SPS communications terminate, or any combination thereof. The operations of 2125 may be performed in accordance with examples as disclosed herein. In some examples, aspects of the operations of 2125 may be performed by a feedback generation component 1335 as described with reference to FIG. 13.

At 2130, the method may include concatenating the one or more feedback bits to generate a HARQ codebook for the one or more SPS communications in accordance with the ordering. The operations of 2130 may be performed in accordance with examples as disclosed herein. In some examples, aspects of the operations of 2130 may be performed by a feedback generation component 1335 as described with reference to FIG. 13.

At 2135, the method may include communicating, with a second device, the one or more feedback bits associated with the one or more SPS communications in accordance with the configuration for the first device to provide CBG-based feedback. The operations of 2135 may be performed in accordance with examples as disclosed herein. In some examples, aspects of the operations of 2135 may be performed by a feedback communication component 1340 as described with reference to FIG. 13.

Figure 22:
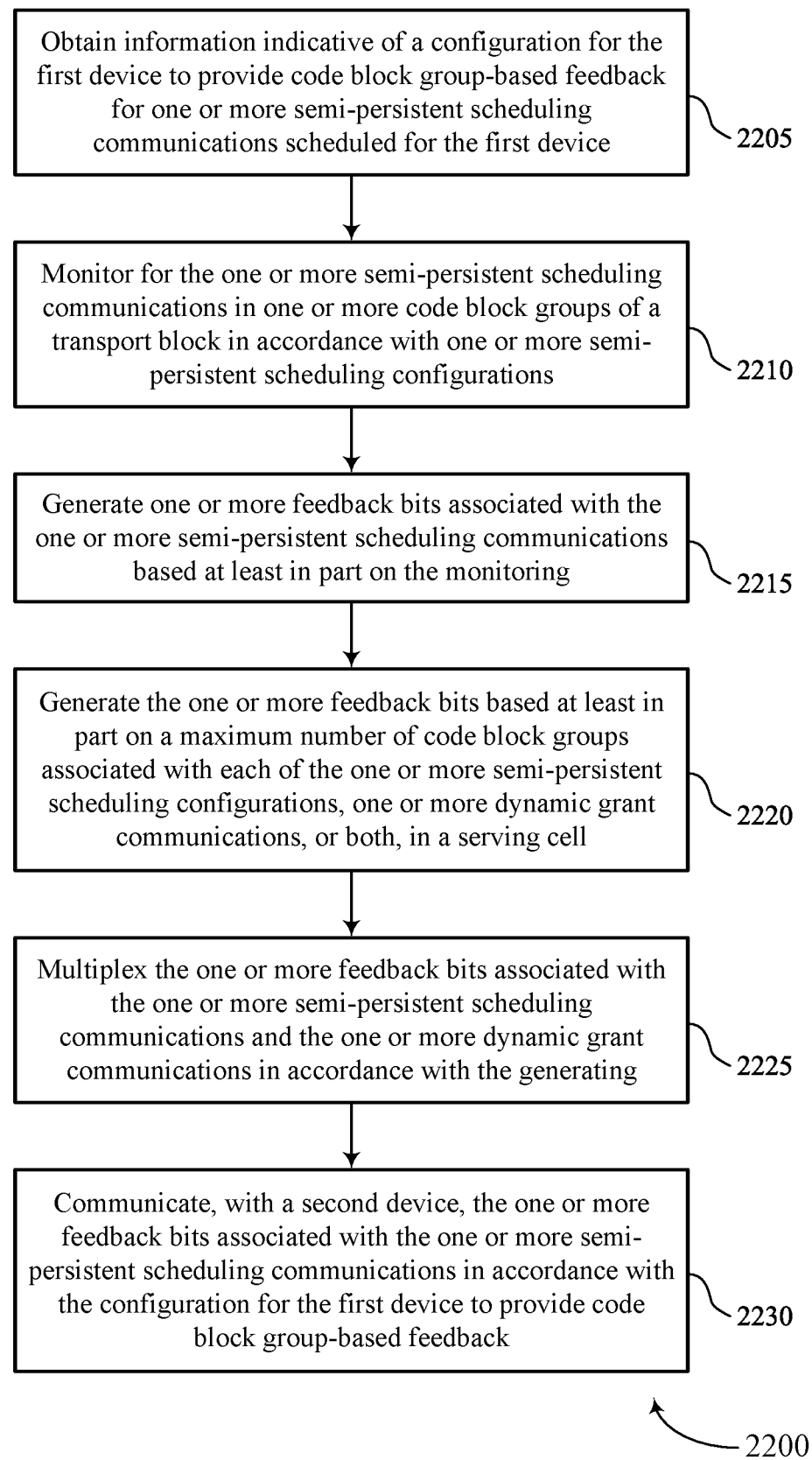

FIG. 22 shows a flowchart illustrating a method 2200 that supports CBG-based retransmission and feedback for SPS communications in accordance with one or more aspects of the present disclosure. The operations of the method 2200 may be implemented by a UE or its components as described herein. For example, the operations of the method 2200 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2205, the method may include obtaining information indicative of a configuration for the first device to provide CBG-based feedback for one or more SPS communications scheduled for the first device. The operations of 2205 may be performed in accordance with examples as disclosed herein. In some examples, aspects of the operations of 2205 may be performed by a CBG-based feedback configuration component 1325 as described with reference to FIG. 13.

At 2210, the method may include monitoring for the one or more SPS communications in one or more CBGs of a transport block in accordance with one or more SPS communication configurations. The operations of 2210 may be performed in accordance with examples as disclosed herein. In some examples, aspects of the operations of 2210 may be performed by an SPS communications monitoring component 1330 as described with reference to FIG. 13.

At 2215, the method may include generating one or more feedback bits associated with the one or more SPS communications based on the monitoring. The operations of 2215 may be performed in accordance with examples as disclosed herein. In some examples, aspects of the operations of 2215 may be performed by a feedback generation component 1335 as described with reference to FIG. 13.

At 2220, the method may include generating the one or more feedback bits based on a maximum number of CBGs associated with each of the one or more SPS communication configurations, one or more dynamic grant communications, or both, in a serving cell. The operations of 2220 may be performed in accordance with examples as disclosed herein. In some examples, aspects of the operations of 2220 may be performed by a feedback generation component 1335 as described with reference to FIG. 13.

At 2225, the method may include multiplexing the one or more feedback bits associated with the one or more SPS communications and the one or more dynamic grant communications in accordance with the generating. The operations of 2225 may be performed in accordance with examples as disclosed herein. In some examples, aspects of the operations of 2225 may be performed by a feedback communication component 1340 as described with reference to FIG. 13.

At 2230, the method may include communicating, with a second device, the one or more feedback bits associated with the one or more SPS communications in accordance with the configuration for the first device to provide CBG-based feedback. The operations of 2230 may be performed in accordance with examples as disclosed herein. In some examples, aspects of the operations of 2230 may be performed by a feedback communication component 1340 as described with reference to FIG. 13.

Figure 23:
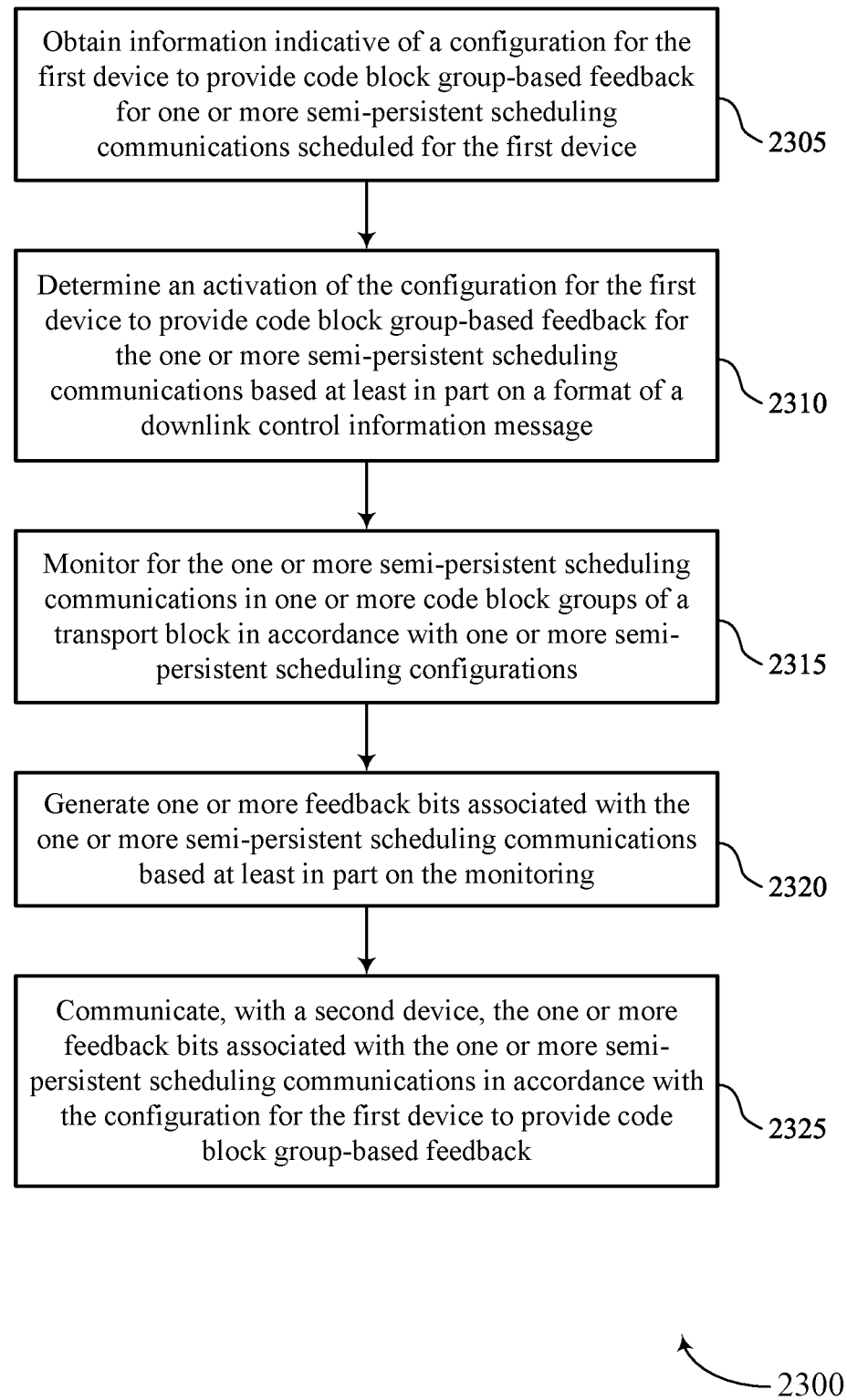

FIG. 23 shows a flowchart illustrating a method 2300 that supports CBG-based retransmission and feedback for SPS communications in accordance with one or more aspects of the present disclosure. The operations of the method 2300 may be implemented by a UE or its components as described herein. For example, the operations of the method 2300 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2305, the method may include obtaining information indicative of a configuration for the first device to provide CBG-based feedback for one or more SPS communications scheduled for the first device. The operations of 2305 may be performed in accordance with examples as disclosed herein. In some examples, aspects of the operations of 2305 may be performed by a CBG-based feedback configuration component 1325 as described with reference to FIG. 13.

At 2310, the method may include determining an activation of the configuration for the first device to provide CBG-based feedback for the one or more SPS communications based on a format of a DCI message. The operations of 2310 may be performed in accordance with examples as disclosed herein. In some examples, aspects of the operations of 2310 may be performed by a CBG-based feedback configuration component 1325 as described with reference to FIG. 13.

At 2315, the method may include monitoring for the one or more SPS communications in one or more CBGs of a transport block in accordance with one or more SPS communication configurations. The operations of 2315 may be performed in accordance with examples as disclosed herein. In some examples, aspects of the operations of 2315 may be performed by an SPS communications monitoring component 1330 as described with reference to FIG. 13.

At 2320, the method may include generating one or more feedback bits associated with the one or more SPS communications based on the monitoring. The operations of 2320 may be performed in accordance with examples as disclosed herein. In some examples, aspects of the operations of 2320 may be performed by a feedback generation component 1335 as described with reference to FIG. 13.

At 2325, the method may include communicating, with a second device, the one or more feedback bits associated with the one or more SPS communications in accordance with the configuration for the first device to provide CBG-based feedback. The operations of 2325 may be performed in accordance with examples as disclosed herein. In some examples, aspects of the operations of 2325 may be performed by a feedback communication component 1340 as described with reference to FIG. 13.

Figure 24:
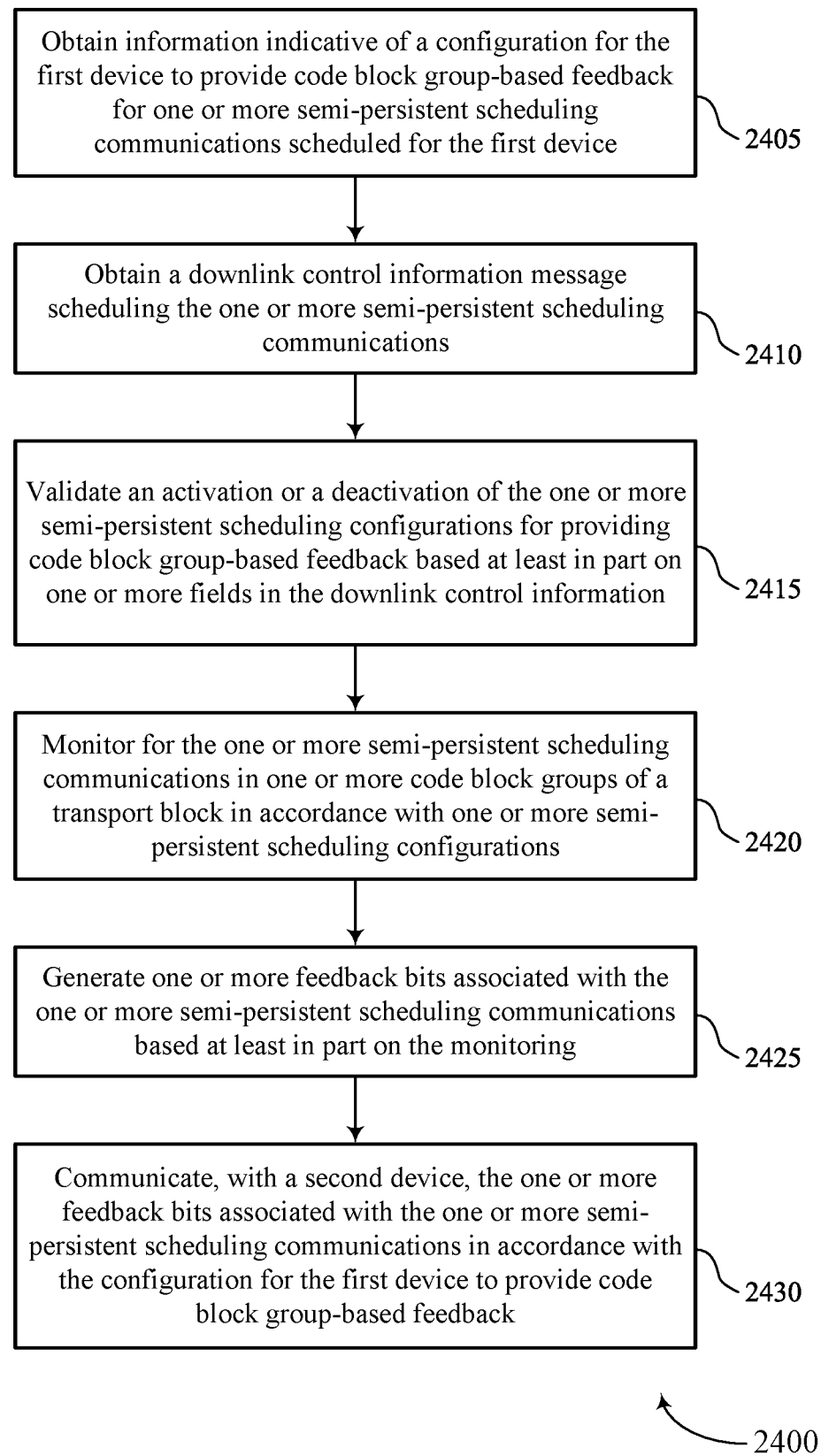

FIG. 24 shows a flowchart illustrating a method 2400 that supports CBG-based retransmission and feedback for SPS communications in accordance with one or more aspects of the present disclosure. The operations of the method 2400 may be implemented by a UE or its components as described herein. For example, the operations of the method 2400 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2405, the method may include obtaining information indicative of a configuration for the first device to provide CBG-based feedback for one or more SPS communications scheduled for the first device. The operations of 2405 may be performed in accordance with examples as disclosed herein. In some examples, aspects of the operations of 2405 may be performed by a CBG-based feedback configuration component 1325 as described with reference to FIG. 13.

At 2410, the method may include obtaining a DCI message scheduling the one or more SPS communications. The operations of 2410 may be performed in accordance with examples as disclosed herein. In some examples, aspects of the operations of 2410 may be performed by a DCI receiving component 1350 as described with reference to FIG. 13.

At 2415, the method may include validating an activation or a deactivation of the one or more SPS communication configurations for providing CBG-based feedback based on one or more fields in the DCI. The operations of 2415 may be performed in accordance with examples as disclosed herein. In some examples, aspects of the operations of 2415 may be performed by an SPS communication configuration activation component 1360 as described with reference to FIG. 13.

At 2420, the method may include monitoring for the one or more SPS communications in one or more CBGs of a transport block in accordance with one or more SPS communication configurations. The operations of 2420 may be performed in accordance with examples as disclosed herein. In some examples, aspects of the operations of 2420 may be performed by an SPS communications monitoring component 1330 as described with reference to FIG. 13.

At 2425, the method may include generating one or more feedback bits associated with the one or more SPS communications based on the monitoring. The operations of 2425 may be performed in accordance with examples as disclosed herein. In some examples, aspects of the operations of 2425 may be performed by a feedback generation component 1335 as described with reference to FIG. 13.

At 2430, the method may include communicating, with a second device, the one or more feedback bits associated with the one or more SPS communications in accordance with the configuration for the first device to provide CBG-based feedback. The operations of 2430 may be performed in accordance with examples as disclosed herein. In some examples, aspects of the operations of 2430 may be performed by a feedback communication component 1340 as described with reference to FIG. 13.

Figure 25:
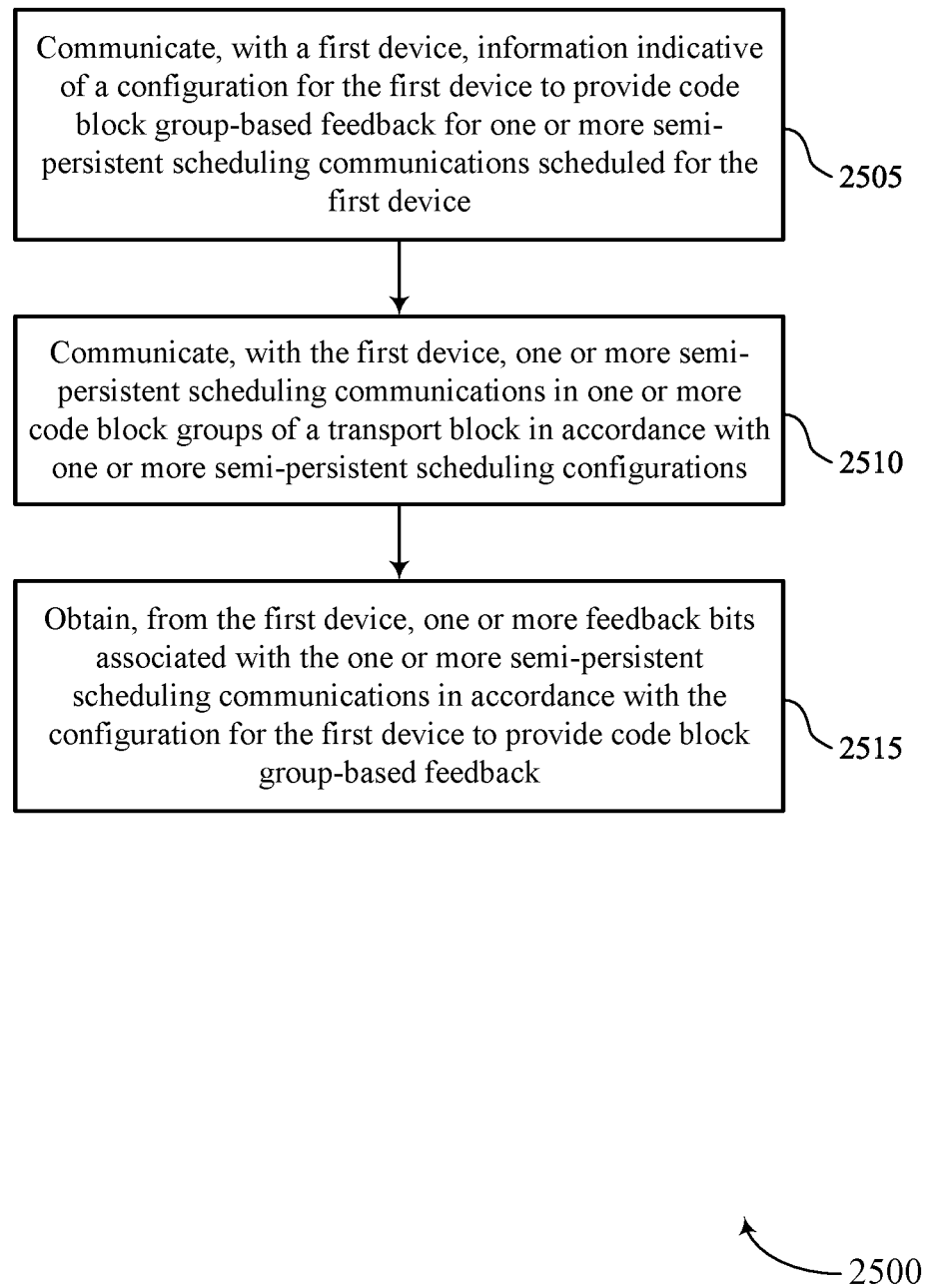

FIG. 25 shows a flowchart illustrating a method 2500 that supports CBG-based retransmission and feedback for SPS communications in accordance with one or more aspects of the present disclosure. The operations of the method 2500 may be implemented by a UE or a network entity or its components as described herein. For example, the operations of the method 2500 may be performed by a UE 115 as described with reference to FIGS. 1 through 14 or a network entity as described with reference to FIGS. 1 through 10 and 15 through 18. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 2505, the method may include communicating, with a first device, information indicative of a configuration for the first device to provide CBG-based feedback for one or more SPS communications scheduled for the first device. The operations of 2505 may be performed in accordance with examples as disclosed herein. In some examples, aspects of the operations of 2505 may be performed by a CBG-based feedback configuration component 1325 or a CBG-based feedback configuration component 1725 as described with reference to FIGS. 13 and 17.

At 2510, the method may include communicating, with the first device, one or more SPS communications in one or more CBGs of a transport block in accordance with one or more SPS communication configurations. The operations of 2510 may be performed in accordance with examples as disclosed herein. In some examples, aspects of the operations of 2510 may be performed by an SPS communication configuration communication component 1345 or an SPS communication configuration communication component 1730 as described with reference to FIGS. 13 and 17.

At 2515, the method may include obtaining, from the first device, one or more feedback bits associated with the one or more SPS communications in accordance with the configuration for the first device to provide CBG-based feedback. The operations of 2515 may be performed in accordance with examples as disclosed herein. In some examples, aspects of the operations of 2515 may be performed by a feedback communication component 1340 or a feedback communication component 1735 as described with reference to FIGS. 13 and 17.

The following provides an overview of aspects of the present disclosure:

Aspect 1: A method for wireless communications at a first device, comprising: obtaining information indicative of a configuration for the first device to provide CBG-based feedback for one or more SPS communications scheduled for the first device; monitoring for the one or more SPS communications in one or more CBGs of a transport block in accordance with one or more SPS configurations; generating one or more feedback bits associated with the one or more SPS communications based at least in part on the monitoring; and communicating, with a second device, the one or more feedback bits associated with the one or more SPS communications in accordance with the configuration for the first device to provide CBG-based feedback.

Aspect 2: The method of aspect 1, wherein generating the one or more feedback bits further comprises: determining separate configurations for CBG-based feedback for respective SPS configurations of the one or more SPS configurations; and generating the one or more feedback bits for the separate SPS configurations based at least in part on the separate configurations for providing CBG-based feedback.

Aspect 3: The method of aspect 2, further comprising: identifying, from the one or more SPS configurations, different SPS configurations on different serving cells, the different SPS configurations configured for CBG-based feedback corresponding to one or more dynamic grants; and providing CBG-based feedback for the one or more SPS communications on the different serving cells configured for CBG-based feedback corresponding to the one or more dynamic grants.

Aspect 4: The method of any of aspects 2 through 3, further comprising: identifying one or more parameters for activating each SPS configuration of the one or more SPS configurations; and activating each of the one or more SPS configurations in accordance with the one or more parameters.

Aspect 5: The method of any of aspects 1 through 4, further comprising: determining a threshold number of CBGs of the one or more CBGs per transport block that are configured to communicate CBG-based feedback based at least in part on the information indicative of the configuration for the first device to provide CBG-based feedback for the one or more SPS communications.

Aspect 6: The method of aspect 5, wherein the threshold number of CBGs is equal to a number of CBGs configured to communicate CBG-based feedback scheduled by one or more dynamic grants associated with a same serving cell as the one or more SPS communications.

Aspect 7: The method of any of aspects 1 through 6, wherein generating the one or more feedback bits further comprises: determining an ordering for concatenating the one or more feedback bits based at least in part on a serving cell index, a SPS index, a slot index in which the one or more SPS communications terminate, or any combination thereof; and concatenating the one or more feedback bits to generate a HARQ codebook for the one or more SPS communications in accordance with the ordering.

Aspect 8: The method of aspect 7, further comprising: concatenating the one or more feedback bits to generate the HARQ codebook for different serving cells, the different serving cells comprising at least a first set of cells that have CBG-based feedback enabled and a second set of cells that have CBG-based feedback disabled.

Aspect 9: The method of aspect 8, further comprising: concatenating the one or more feedback bits jointly across the different serving cells.

Aspect 10: The method of any of aspects 8 through 9, further comprising: concatenating the one or more feedback bits separately for the different serving cells in accordance with a cell index, wherein the concatenation orders a first HARQ sub-codebook associated with the first set of cells after a second HARQ sub-codebook associated with the second set of cells.

Aspect 11: The method of any of aspects 7 through 10, further comprising: concatenating a first set of the one or more feedback bits for the one or more SPS configurations having CBG-based feedback enabled; and concatenating a second set of the one or more feedback bits for the one or more SPS configurations having CBG-based feedback disabled.

Aspect 12: The method of any of aspects 1 through 11, further comprising: generating the one or more feedback bits based at least in part on a number of CBGs used for the one or more SPS communications.

Aspect 13: The method of any of aspects 1 through 12, further comprising: generating the one or more feedback bits based at least in part on a maximum number of CBGs associated with a SPS configuration of the one or more SPS configurations.

Aspect 14: The method of any of aspects 1 through 13, further comprising: generating the one or more feedback bits based at least in part on a maximum number of CBGs associated with each of the one or more SPS configurations, one or more dynamic grant communications, or both.

Aspect 15: The method of any of aspects 1 through 14, further comprising: generating one or more repetitions of the one or more feedback bits based at least in part on the one or more SPS configurations being configured for providing CBG-based feedback.

Aspect 16: The method of any of aspects 1 through 15, further comprising: generating the one or more feedback bits based at least in part on a maximum number of CBGs associated with each of the one or more SPS configurations, one or more dynamic grant communications, or both, in a serving cell; and multiplexing the one or more feedback bits associated with the one or more SPS communications and the one or more dynamic grant communications in accordance with the generating.

Aspect 17: The method of any of aspects 1 through 16, further comprising: concatenating the one or more feedback bits to generate a dynamic HARQ codebook, wherein the concatenation combines a first HARQ sub-codebook associated with one or more dynamic grant communications and a second HARQ sub-codebook associated with the one or more SPS communications.

Aspect 18: The method of aspect 17, further comprising: concatenating the one or more feedback bits to generate the dynamic HARQ codebook for different serving cells, the different serving cells comprising at least a first set of cells that have CBG-based feedback enabled for the one or more dynamic grant communications and a second set of cells that have CBG-based feedback disabled for the one or more SPS communications.

Aspect 19: The method of any of aspects 1 through 18, further comprising: determining an activation of the configuration for the first device to provide CBG-based feedback for the one or more SPS communications based at least in part on a format of a control information message.

Aspect 20: The method of aspect 19, wherein the control information message has a first scheduling format which indicates that CBG-based feedback is enabled or disabled for one or more SPS communications.

Aspect 21: The method of any of aspects 1 through 20, further comprising: obtaining a control information message scheduling one or more retransmissions for the one or more SPS communications, the control information message indicative of whether CBG-based feedback is enabled or disabled for one or more SPS communications; and communicating the one or more retransmissions of the one or more SPS communications in the one or more CBGs in accordance with the scheduling.

Aspect 22: The method of aspect 21, wherein the control information message further comprises one or more CBG indices indicative of the one or more CBGs that are scheduled for retransmission.

Aspect 23: The method of any of aspects 1 through 22, further comprising: obtaining a control information message scheduling the one or more SPS communications; and validating an activation or a deactivation of the one or more SPS configurations for providing CBG-based feedback based at least in part on one or more fields in the control information message, the one or more fields comprising a CBG transmission information field, a CBG flushing out information field, or both.

Aspect 24: The method of any of aspects 1 through 23, wherein the one or more SPS configurations comprise one or more downlink SPS configurations, one or more sidelink SPS configurations, or both.

Aspect 25: The method of any of aspects 1 through 24, wherein the information indicative of the configuration for the first device to provide CBG-based feedback for the one or more SPS communications comprises downlink control information, sidelink control information, or both.

Aspect 26: The method of any of aspects 1 through 25, wherein the threshold number of CBGs is different from a number of CBGs configured for communications of CBG-based feedback scheduled by one or more dynamic grants associated with a same serving cell as the one or more SPS communications.

Aspect 27: The method of aspect 26, wherein a bit width of a field in control information scheduling one or more retransmissions corresponding to the CBG-based feedback is based at least in part on the threshold number of CBGs being greater than the number of CBGs configured for communications of CBG-based feedback scheduled by the one or more dynamic grants.

Aspect 28: A method for wireless communication at a second device, comprising: communicating information indicative of a configuration for a first device to provide CBG-based feedback for one or more SPS communications scheduled for the first device; communicating one or more SPS communications in one or more CBGs of a transport block in accordance with one or more SPS configurations; and obtaining one or more feedback bits associated with the one or more SPS communications in accordance with the configuration for the first device to provide CBG-based feedback.

Aspect 29: The method of aspect 28, further comprising: communicating one or more feedback bits for the one or more SPS configurations, the one or more feedback bits corresponding to respective CBGs of the one or more CBGs.

Aspect 30: The method of any of aspects 28 through 29, further comprising: communicating one or more control parameters for activating each SPS configuration of the one or more SPS configurations; and obtaining the CBG-based feedback in accordance with the one or more control parameters.

Aspect 31: The method of any of aspects 28 through 30, further comprising: communicating a control information message scheduling one or more retransmissions for the one or more SPS communications, the control information message indicative of whether CBG-based feedback is enabled or disabled for one or more SPS communications; and communicating the one or more retransmissions of the one or more SPS communications in the one or more CBGs in accordance with the scheduling.

Aspect 32: The method of any of aspects 28 through 31, further comprising: communicating a control information message scheduling the one or more SPS communications, one or more fields in the control information message indicative of an activation or a deactivation of the one or more SPS configurations for providing CBG-based feedback based feedback, the one or more fields comprising a CBG transmission information field, a CBG flushing out information field, or both.

Aspect 33: The method of any of aspects 28 through 32, wherein the second device includes an antenna, an antenna panel, or both.

Aspect 34: An apparatus for wireless communications at a first device, comprising a processor; memory coupled with the processor; and instructions stored in the memory and executable by the processor to cause the apparatus to perform a method of any of aspects 1 through 25.

Aspect 35: An apparatus for wireless communications at a first device, comprising at least one means for performing a method of any of aspects 1 through 25.

Aspect 36: A non-transitory computer-readable medium storing code for wireless communications at a first device, the code comprising instructions executable by a processor to perform a method of any of aspects 1 through 25.

Aspect 37: An apparatus comprising a processor; memory coupled with the processor; and instructions stored in the memory and executable by the processor to cause the apparatus to perform a method of any of aspects 26 through 27.

Aspect 38: An apparatus comprising at least one means for performing a method of any of aspects 26 through 27.

Aspect 39: A non-transitory computer-readable medium storing code the code comprising instructions executable by a processor to perform a method of any of aspects 26 through 27.

Aspect 40: An apparatus for wireless communication at a second device, comprising a processor; memory coupled with the processor; and instructions stored in the memory and executable by the processor to cause the apparatus to perform a method of any of aspects 28 through 33.

Aspect 41: An apparatus for wireless communication at a second device, comprising at least one means for performing a method of any of aspects 28 through 33.

Aspect 42: A non-transitory computer-readable medium storing code for wireless communication at a second device, the code comprising instructions executable by a processor to perform a method of any of aspects 28 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first device, comprising:
a processor; and
memory coupled with the processor, the processor configured to:
obtain information indicative of a configuration for the first device to provide code block group-based feedback for one or more semi-persistent scheduling communications scheduled for the first device;
monitor for the one or more semi-persistent scheduling communications in one or more code block groups of a transport block in accordance with one or more semi-persistent scheduling configurations;
determine a threshold number of code block groups of the one or more code block groups per transport block that are configured to communicate code block group-based feedback based at least in part on the information indicative of the configuration for the first device to provide code block group-based feedback for the one or more semi-persistent scheduling communications;
generate one or more feedback bits associated with the one or more semi-persistent scheduling communications based at least in part on the monitoring; and
communicate, with a second device, the one or more feedback bits associated with the one or more semi-persistent scheduling communications in accordance with the configuration for the first device to provide code block group-based feedback and the threshold number of code block groups.

2. The apparatus of claim 1, wherein, to generate the one or more feedback bits, the processor is further configured to:
determine separate configurations for code block group-based feedback for respective semi-persistent scheduling configurations of the one or more semi-persistent scheduling configurations; and
generate the one or more feedback bits for the separate semi-persistent scheduling configurations based at least in part on the separate configurations for providing code block group-based feedback.

3. The apparatus of claim 2, wherein the processor is further configured to:
identify, from the one or more semi-persistent scheduling configurations, different semi-persistent scheduling configurations on different serving cells, the different semi-persistent scheduling configurations configured for code block group-based feedback corresponding to one or more dynamic grants; and
provide code block group-based feedback for the one or more semi-persistent scheduling communications on the different serving cells configured for code block group-based feedback corresponding to the one or more dynamic grants.

4. The apparatus of claim 2, wherein the processor is further configured to:
identify one or more parameters for activating each semi-persistent scheduling configuration of the one or more semi-persistent scheduling configurations; and
activate each of the one or more semi-persistent scheduling configurations in accordance with the one or more parameters.

5. The apparatus of claim 1, the threshold number of code block groups being equal to a number of code block groups configured to communicate code block group-based feedback scheduled by one or more dynamic grants associated with a same serving cell as the one or more semi-persistent scheduling communications.

6. The apparatus of claim 1, the threshold number of code block groups being different from a number of code block groups configured for communications of code block group-based feedback scheduled by one or more dynamic grants associated with a same serving cell as the one or more semi-persistent scheduling communications.

7. The apparatus of claim 5, wherein a bit width of a field in control information scheduling one or more retransmissions corresponding to the code block group-based feedback is based at least in part on the threshold number of code block groups being greater than the number of code block groups configured for communications of code block group-based feedback scheduled by the one or more dynamic grants.

8. The apparatus of claim 1, wherein, to generate the one or more feedback bits, the processor is further configured to:
determine an ordering for concatenating the one or more feedback bits based at least in part on a serving cell index, a semi-persistent scheduling index, a slot index in which the one or more semi-persistent scheduling communications terminate, or any combination thereof; and
concatenate the one or more feedback bits to generate a hybrid automatic repeat request acknowledgement codebook for the one or more semi-persistent scheduling communications in accordance with the ordering.

9. The apparatus of claim 8, wherein the processor is further configured to:
concatenate the one or more feedback bits to generate the hybrid automatic repeat request acknowledgement codebook for different serving cells, the different serving cells comprising at least a first set of cells that have code block group-based feedback enabled and a second set of cells that have code block group-based feedback disabled.

10. The apparatus of claim 9, wherein the processor is further configured to:
concatenate the one or more feedback bits jointly across the different serving cells.

11. The apparatus of claim 9, wherein the processor is further configured to:
concatenate the one or more feedback bits separately for the different serving cells in accordance with a cell index, wherein the concatenation orders a first hybrid automatic repeat request acknowledgement sub-codebook associated with the first set of cells after a second hybrid automatic repeat request acknowledgement sub-codebook associated with the second set of cells.

12. The apparatus of claim 8, wherein the processor is further configured to:

concatenate a first set of the one or more feedback bits for the one or more semi-persistent scheduling configurations having code block group-based feedback enabled; and concatenate a second set of the one or more feedback bits for the one or more semi-persistent scheduling configurations having code block group-based feedback disabled.

13. The apparatus of claim 1, wherein the processor is further configured to:

generate the one or more feedback bits based at least in part on a maximum number of code block groups associated with a semi-persistent scheduling configuration of the one or more semi-persistent scheduling configurations, a maximum number of code block groups associated with the one or more semi-persistent scheduling configurations, one or more dynamic grant communications, or any combination thereof.

14. The apparatus of claim 1, wherein the processor is further configured to:

generate the one or more feedback bits based at least in part on a maximum number of code block groups associated with each of the one or more semi-persistent scheduling configurations, one or more dynamic grant communications, or both, in a serving cell; and multiplex the one or more feedback bits associated with the one or more semi-persistent scheduling communications and the one or more dynamic grant communications in accordance with the generating.

15. The apparatus of claim 1, wherein the processor is further configured to:

concatenate the one or more feedback bits to generate a dynamic hybrid automatic repeat request acknowledgement codebook, wherein the concatenation combines a first hybrid automatic repeat request acknowledgement sub-codebook associated with one or more dynamic grant communications and a second hybrid automatic repeat request acknowledgement sub-codebook associated with the one or more semi-persistent scheduling communications.

16. The apparatus of claim 15, wherein the processor is further configured to:

concatenate the one or more feedback bits to generate the dynamic hybrid automatic repeat request acknowledgement codebook for different serving cells, the different serving cells comprising at least a first set of cells that have code block group-based feedback enabled for the one or more dynamic grant communications and a second set of cells that have code block group-based feedback disabled for the one or more semi-persistent scheduling communications.

17. The apparatus of claim 1, wherein the processor is further configured to:

determine an activation of the configuration for the first device to provide code block group-based feedback for the one or more semi-persistent scheduling communications based at least in part on a format of a control information message, the control information message having a first scheduling format which indicates that code block group-based feedback is enabled or disabled for one or more semi-persistent scheduling communications.

18. The apparatus of claim 1, wherein the processor is further configured to:

obtain a control information message scheduling one or more retransmissions for the one or more semi-persistent scheduling communications, the control information message indicative of whether code block group-based feedback is enabled or disabled for one or more semi-persistent scheduling communications, and the control information further comprising one or more code block group indices indicative of the one or more code block groups that are scheduled for retransmission; and communicate the one or more retransmissions of the one or more semi-persistent scheduling communications in the one or more code block groups in accordance with the scheduling.

19. The apparatus of claim 1, wherein the processor is further configured to:

obtain a control information message scheduling the one or more semi-persistent scheduling communications; and validate an activation or a deactivation of the one or more semi-persistent scheduling configurations for providing code block group-based feedback based at least in part on one or more fields in the control information message, the one or more fields comprising a code block group transmission information field, a code block group flushing out information field, or both.

20. The apparatus of claim 1, the one or more semi-persistent scheduling configurations comprising one or more downlink semi-persistent scheduling configurations, one or more sidelink semi-persistent scheduling configurations, or both.

21. The apparatus of claim 1, wherein the information indicative of the configuration for the first device to provide code block group-based feedback for the one or more semi-persistent scheduling communications comprises downlink control information, sidelink control information, or both.

22. An apparatus for wireless communication at a second device, comprising:

a processor; and memory coupled with the processor, the processor configured to:

communicate information indicative of a configuration for a first device to provide code block group-based feedback for one or more semi-persistent scheduling communications scheduled for the first device;

communicate one or more semi-persistent scheduling communications in one or more code block groups of a transport block in accordance with one or more semi-persistent scheduling configurations;

determine a threshold number of code block groups of the one or more code block groups per transport block that are configured to communicate code block group-based feedback based at least in part on the information indicative of the configuration for the first device to provide code block group-based feedback for the one or more semi-persistent scheduling communications; and obtain one or more feedback bits associated with the one or more semi-persistent scheduling communications in accordance with the configuration for the first device to provide code block group-based feedback and the threshold number of code block groups.

23. The apparatus of claim 22, wherein the processor is further configured to:

communicate one or more feedback bits for the one or more semi-persistent scheduling configurations, the one or more feedback bits corresponding to respective code block groups of the one or more code block groups.

24. The apparatus of claim 22, wherein the processor is further configured to:
- communicate one or more control parameters for activating each semi-persistent scheduling configuration of the one or more semi-persistent scheduling configurations; and
- obtain the code block group-based feedback in accordance with the one or more control parameters.

25. The apparatus of claim 22, wherein the processor is further configured to:
- communicate a control information message scheduling one or more retransmissions for the one or more semi-persistent scheduling communications, the control information message indicative of whether code block group-based feedback is enabled or disabled for one or more semi-persistent scheduling communications; and
- communicate the one or more retransmissions of the one or more semi-persistent scheduling communications in the one or more code block groups in accordance with the scheduling.

26. The apparatus of claim 22, wherein the processor is further configured to:
- communicate a control information message scheduling the one or more semi-persistent scheduling communications, one or more fields in the control information message indicative of an activation or a deactivation of the one or more semi-persistent scheduling configurations for providing code block group-based feedback based feedback, the one or more fields comprising a code block group transmission information field, a code block group flushing out information field, or both.

27. The apparatus of claim 22, wherein the apparatus further comprises:
- an antenna, an antenna panel, or both.

28. A method for wireless communication at a first device, comprising:
- obtaining information indicative of a configuration for the first device to provide code block group-based feedback for one or more semi-persistent scheduling communications scheduled for the first device;
- monitoring for the one or more semi-persistent scheduling communications in one or more code block groups of a transport block in accordance with one or more semi-persistent scheduling configurations;
- determining a threshold number of code block groups of the one or more code block groups per transport block that are configured to communicate code block group-based feedback based at least in part on the information indicative of the configuration for the first device to provide code block group-based feedback for the one or more semi-persistent scheduling communications;
- generating one or more feedback bits associated with the one or more semi-persistent scheduling communications based at least in part on the monitoring; and
- communicating, with a second device, the one or more feedback bits associated with the one or more semi-persistent scheduling communications in accordance with the configuration for the first device to provide code block group-based feedback and the threshold number of code block groups.

29. A method for wireless communication at a second device, comprising:
- communicating information indicative of a configuration for a first device to provide code block group-based feedback for one or more semi-persistent scheduling communications scheduled for the first device;
- communicating one or more semi-persistent scheduling communications in one or more code block groups of a transport block in accordance with one or more semi-persistent scheduling configurations;
- determining a threshold number of code block groups of the one or more code block groups per transport block that are configured to communicate code block group-based feedback based at least in part on the information indicative of the configuration for the first device to provide code block group-based feedback for the one or more semi-persistent scheduling communications; and
- obtaining one or more feedback bits associated with the one or more semi-persistent scheduling communications in accordance with the configuration for the first device to provide code block group-based feedback and the threshold number of code block groups.

* * * * *